US006418556B1

(12) United States Patent
Bennington et al.

(10) Patent No.: US 6,418,556 B1
(45) Date of Patent: Jul. 9, 2002

(54) ELECTRONIC TELEVISION PROGRAM GUIDE SCHEDULE SYSTEM AND METHOD

(75) Inventors: Gerard E. Bennington, Englewood; George Backer, Highlands Ranch; Shawn Green; Bill Cooper, both of Littleton; Dave Spell, Denver; Rosetta Rogers, Aurora; Bruce Davis, Greenwood Village, all of CO (US)

(73) Assignee: United Video Properties, Inc., Tulsa, OK (US)

( * ) Notice: Subject to any disclaimer, the term of this patent is extended or adjusted under 35 U.S.C. 154(b) by 0 days.

(21) Appl. No.: 08/119,367

(22) Filed: Sep. 9, 1993

(51) Int. Cl.[7] .............................. H04N 7/14; H04N 5/50
(52) U.S. Cl. ........................ 725/40; 725/39; 348/569; 348/906
(58) Field of Search .............................. 348/906, 460, 348/461, 463, 464, 465, 466, 467, 468, 731, 732, 734, 6, 7, 8, 10, 12, 13, 563, 569, 570, 473, 474; 455/186.1, 186.2; 725/39, 40, 43; H04N 7/087, 7/04, 7/08, 5/50, 5/44, 7/14

(56) References Cited

U.S. PATENT DOCUMENTS 3,440,427 A   4/1969   Kammer
3,493,674 A   2/1970   Houghton (List continued on next page.)

FOREIGN PATENT DOCUMENTS

| DE | 2918846 | 11/1980 |
|---|---|---|
| DE | 3246225 | 6/1984 |
| DE | 3337204 | 4/1985 |
| DE | 3621263 | 7/1988 |
| EP | 00337336 | 10/1989 |

(List continued on next page.)

OTHER PUBLICATIONS

Stavros Christodoulakis and Stephen Graham, "Browsing Within Time–Driven Multimedia Documents," publication of the Institute for Computer Research, University of Waterloo, Waterloo, Ontario, Canada, Jul. 1988, pp. 219–227.

(List continued on next page.)

Primary Examiner—Michael Lee
(74) Attorney, Agent, or Firm—Fish & Neave; James M. Glass

(57) ABSTRACT

An electronic program schedule system which includes a receiver for receiving broadcast, satellite or cablecast television programs for a plurality of television channels and a tuner for tuning a television receiver to a selected one of the plurality of channels. A data processor receives and stores in a memory television program schedule information for a plurality of television programs to appear on the plurality of television channels. A user control apparatus, such as a remote controller, is utilized by a viewer to choose user control commands and transmit signals in response to the data processor which receives the signals in response to user control commands. A television receiver is used to display the television programs and television program schedule information. A video display generator receives video control commands from the data processor and program schedule information from the memory and displays a portion of the program schedule information in overlaying relationship with a television program appearing on a television channel in at least one mode of operation of the television programming guide. The data processor controls the video display generator with video control commands, issued in response to the user control commands, to display program schedule information for any chosen one of the plurality of television programs in overlaying relationship with at least one television program then appearing on any chosen one of the plurality of channels on the television receiver.

48 Claims, 42 Drawing Sheets

U.S. PATENT DOCUMENTS

| | | |
|---|---|---|
| 3,833,757 A | 9/1974 | Kirk, Jr. et al. |
| 3,891,792 A | 6/1975 | Kimura |
| 3,936,868 A | 2/1976 | Thorpe |
| 3,996,583 A | 12/1976 | Hutt et al. |
| 4,004,085 A | 1/1977 | Makino et al. |
| 4,016,361 A | 4/1977 | Pandey |
| 4,026,555 A | 5/1977 | Kirschner et al. |
| 4,031,548 A | 6/1977 | Kato et al. |
| 4,052,719 A | 10/1977 | Hutt et al. |
| 4,079,419 A | 3/1978 | Siegle |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,261,006 A | 4/1981 | Weintraub et al. |
| 4,264,924 A | 4/1981 | Freeman |
| 4,270,145 A | 5/1981 | Farina |
| 4,283,787 A | 8/1981 | Chambers |
| 4,288,809 A | 9/1981 | Yabe |
| 4,305,101 A | 12/1981 | Yarbrough et al. |
| 4,329,684 A | 5/1982 | Monteath et al. |
| 4,337,480 A | 6/1982 | Bourasssin et al. |
| 4,337,483 A | 6/1982 | Guillou |
| 4,344,090 A | 8/1982 | Belisomi |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,581 A | 1/1984 | Schweppe |
| 4,429,385 A | 1/1984 | Cichelli et al. |
| 4,449,249 A | 5/1984 | Price |
| 4,456,925 A | 6/1984 | Skerlos |
| 4,477,830 A | 10/1984 | Lindman et al. |
| 4,488,179 A | 12/1984 | Kruger et al. |
| 4,495,654 A | 1/1985 | Deiss |
| 4,496,976 A | 1/1985 | Swanson et al. |
| 4,510,623 A | 4/1985 | Bonneau |
| 4,536,791 A | 8/1985 | Campbell et al. |
| 4,547,804 A | 10/1985 | Greenberg |
| 4,566,034 A | 1/1986 | Harger et al. |
| 4,587,520 A | 5/1986 | Astle |
| 4,595,952 A | 6/1986 | Filliman |
| 4,598,288 A | 7/1986 | Yarbrough et al. |
| 4,620,229 A | 10/1986 | Amano et al. |
| 4,635,121 A | 1/1987 | Hoffman |
| 4,641,205 A | 2/1987 | Beyers, Jr. |
| 4,677,466 A | 6/1987 | Lert, Jr. et al. |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Fröling et al. |
| 4,706,121 A | 11/1987 | Young |
| 4,712,105 A | 12/1987 | Köhler |
| 4,751,578 A | 6/1988 | Reiter et al. |
| 4,754,326 A | 6/1988 | Kram et al. |
| 4,768,228 A | 8/1988 | Clupper et al. |
| 4,775,935 A | 10/1988 | Yourick |
| 4,787,063 A | 11/1988 | Muguet |
| 4,821,102 A | 4/1989 | Ichikawa et al. |
| 4,862,268 A | 8/1989 | Campbell et al. |
| 4,890,321 A | 12/1989 | Seth-Smith |
| 4,894,789 A | 1/1990 | Yee |
| 4,908,707 A | 3/1990 | Kinghorn |
| 4,908,713 A | 3/1990 | Levine ............... 358/335 |
| 4,959,720 A | 9/1990 | Duffield et al. |
| 4,963,994 A | 10/1990 | Levine |
| 4,977,455 A | 12/1990 | Young |
| 5,038,211 A | 8/1991 | Hallenbeck |
| 5,045,947 A | 9/1991 | Beery |
| 5,047,867 A * | 9/1991 | Strubbe et al. ............ 348/569 |
| 5,068,734 A | 11/1991 | Beery |
| 5,103,314 A | 4/1992 | Keenan |
| 5,151,789 A | 9/1992 | Young |
| 5,210,611 A | 5/1993 | Yee et al. |
| 5,214,622 A * | 5/1993 | Hemoto et al. ............ 348/734 |
| 5,223,924 A | 6/1993 | Strubbe |
| 5,231,493 A * | 7/1993 | Apitz ........................ 348/731 |
| 5,235,415 A | 8/1993 | Bonicel et al. |
| 5,237,411 A | 8/1993 | Fink et al. |
| 5,237,417 A | 8/1993 | Hayashi et al. |
| 5,253,066 A | 10/1993 | Vogel |
| 5,353,121 A * | 10/1994 | Young et al. ............... 348/563 |
| 5,357,276 A * | 10/1994 | Banker et al. ............... 348/12 |
| 5,382,983 A | 1/1995 | Kwoh et al. |
| 5,404,393 A * | 4/1995 | Remillard ................... 348/468 |
| 5,410,326 A | 4/1995 | Goldstein ................... 348/134 |
| 5,479,268 A * | 12/1995 | Young et al. ............... 348/734 |
| 5,485,221 A | 1/1996 | Banker et al. ............... 348/563 |
| 5,528,304 A | 6/1996 | Cherrick et al. ............ 348/565 |
| 5,532,754 A * | 7/1996 | Young et al. ............... 348/569 |
| 5,583,560 A | 12/1996 | Florin et al. ................. 348/7 |
| 5,594,509 A | 1/1997 | Florin et al. ............... 348/731 |
| 5,621,456 A | 4/1997 | Florin et al. ................. 348/7 |
| 5,734,853 A | 3/1998 | Hendricks et al. ......... 395/352 |
| 5,798,785 A | 8/1998 | Hendricks et al. ............ 348/1 |
| 5,808,608 A | 9/1998 | Young et al. |
| 5,990,927 A | 11/1999 | Hendricks et al. ............ 348/6 |

FOREIGN PATENT DOCUMENTS

| | | | |
|---|---|---|---|
| EP | 00393555 | 10/1990 | |
| EP | 0401930 | 12/1990 | |
| EP | 0408892 | 1/1991 | |
| EP | 0532322 | 3/1993 | |
| FR | 2662895 | 12/1991 | |
| GB | 2034995 | 6/1980 | |
| GB | 2126002 | 3/1984 | |
| GB | 2185670 | 7/1987 | |
| GB | 2256546 | 12/1992 | |
| JP | S58137334 | 8/1983 | |
| JP | S58196738 | 11/1983 | |
| JP | 6150470 | 8/1984 | |
| JP | 59141878 | 8/1984 | |
| JP | 61-74476 | 4/1986 | ......... H04N/5/445 |
| JP | S6260384 | 3/1987 | |
| WO | GB87/00884 | 6/1988 | |
| WO | WO9015507 | 12/1990 | |
| WO | US91/06367 | 3/1992 | |
| WO | WO9305452 | 3/1993 | |
| WO | WO 93/11639 | 6/1993 | ............ H04N/7/16 |

OTHER PUBLICATIONS

Caitlin Bestler,. "Flexible Data Structures and Interface Rituals for Rapid Development of OSD Applications," 42nd Annual Convention and Exposition of the NCTA, San Francisco, CA, Jul. 6–9, 1993, pp. 223–236.

Brugliera, Vito, "Digital On–Screen Display—A New Technology for the Consumer Interface," Symposium Record Cable Sessions of the 18th International Television Symposium & Technical Exhibition, pp. 571–586.

Mannes, George, "Smart Screens; Development of Personal Navigation Systems for TV Viewers;" Video Magazine, 12/93.

Preview Guide Brochure, Spring 1994.

Sealfon, Peggy, "High Tech TV," Photographic, Dec. 1984.

James, A., "Oracle—Broadcasting the Written Word," Wireless World, 7/73, pp. 314–316.

McKenzie, G.A., "Oracle—An Information Broadcasting Service Using Data Transmission in the Vertical Interval," Journal of the SMPTE, 1/74, pp. 6–10.

Edwardson,S.M., & Gee,A., "CEEFAX: A Proposed New Broadcasting Ser.," Journal of the SMPTE, 1/74, pp. 14–19.

Hedger, J., "Telesoftware: Home Computing Via Broadcast Teletext," IEEE Transactions on Consumer Electronics, vol. CE–25, No.3, 7/79, pp. 279–287.

Carne, E.B., "The Wired Household," IEEE Spectrum, 10/79, pp. 61–66.

Baer, R.H., "Innovative Add–On TV Products," IEEE Tansactions on Consumer Electronics, vol. CE–25, 11/79

Karstad, K., "Microprocessor Control for Color–TV Receivers," IEEE Transactions on Consumer Electronics, vol. CE–26, 5/80, pp. 149–155.

"The New Media and Broadcast Policy: An Investigation & Research Conference Report on Broadcasting Diversification," Japan Ministry of Posts & Telecommunications, 3/82.

"Videotext Programmiert Videorecorder," Rundfunktech Mitteilungen, Nov.–Dec.,1983 Broadcast Engineering Reports Reports, vol. 26, Nov.–Dec., 1982.

Veith, R.H., "Television's Teletext," Elsevier Science Publishing Co., Inc., 1983, pp. 13–20, 41–51.

Damouny, N.G., "Teletext Decoders—Keeping Up With the Latest Advances," IEEE Transactions on Consumer Electronics, vol. CE–30, No.3, 8/84, pp. 429–435.

Lowenstein, R.L., and Aller., H.E., "Technology Review," vol. 88, 10/85, p. 22.

Japan Soc. of Data Comm.,"Development Study and Research Report on New Media Interface Technology: Status & Issues Related to Combining Databases & New Media," 3/86.

CableVision Advertisement for "TV Decisions," 8/86.

Judice, C.N., "Move Over Cable, Here Comes Video Via Voice Lines," Network World, 9/86, p. 26.

Bureau of Science & Technology (Japan), "Computer Network: Current Status and Outlook on Leading Science and Technology," vol. 1, 12/86.

Merrell, "Tac Timer,", 1986 NCTA Technical Papers, pp. 203–206.

K. Sunada et al., "Teletext Color Television Receiver Model C–29M950, C26M940," NEC Home Electronics, NEC Giho, 1987.

Author unknown, "Facsimile Transmission," NHK Research Monthly Report, 12/87.

D.J. Rayers, "Telesoftware by Teletext," 1984 IEE Conf. Papers, vol. 240, p. 323.

Japan, Int'l Society for the Advancement of Image Software, "Technological Examination & Basic Investigative Research Report on Image Data Bases," Japan, 3/88.

Bensch, U., "VPV Videotext Programs Videorecorder," IEEE Paper, 6/88, pp. 788–792.

Schlender, B.R., "Couch Potatoes! Now It's Smart TV," Fortune, Nov. 20, 1989, pp. 111–116.

Antonofs, M., "Stay Tuned for Smart TV," Popular Science, 11/90, pp. 62–65.

42nd Annual Convention & Exposition of the National Cable Television Association, "Addressable Decoder with Downloadable Operation," Jun. 6–9, 1993, pp. 82–89.

Jerrold Communications Publication, "Cable Television Equipment," dated 1992 and 1993, pp. 8–2.1 to 8–6 and 8–14.1 to 8–14.3.

Various publications of Insight Telecast, 1992 and 1993.

* cited by examiner

Jun 7
HBO is a Premium Service
To order this service press Enter
FLIP
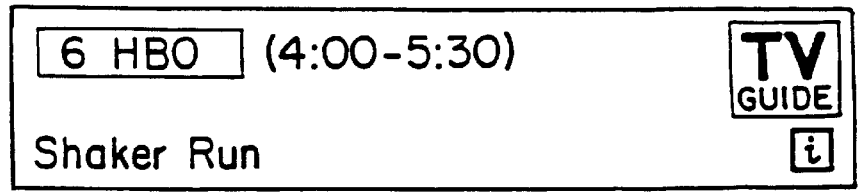
Shaker Run
FIG.9

FIG. 18

All Listings — 180
TV GUIDE — 182
7:13 pm — 183
Enter — 184

Baseball (4:30-7:30p)

| 4 KRON | 7:00p | 7:30p | 8:00p | 8:30p |
|---|---|---|---|---|
| Today | | | | |
| 4 KRON — 185 | Baseball | Ent. Tonight | Fresh Prince | Blossom |
| 5 KPIX | Evening Shade | Major Dad | Murphy Brown | |
| 6 HBO | JFK: In His Own Words | JFK | | |
| 7 KGO | Jeopardy! | Wheel of Fortune | Day One | |

| LISTINGS | ⇕ Listing ◁▷ 6:06P AUG 16 |

| 5:00 | 5:30 | 6:00 | 6:30 | 7:00 | 7:30 | 8:00 |

NBC 4 News
ABC 6 News
CBS 10 CBS News
Fox 28 Club Paradise (5:00)
PBS 29 Mystery!
COM 30 Tribute to Carson
HBO 33 Gremlins 2: The New Batch
ESN 34 Tennis (4:30)
AMC 35 Arise my Love (5:00)
DSC 37 Natural World
NIK 38 I Love Lucy

FIG. 25

STORIES 

US World News
Cubans use Vitamins to combat epidemic
     Geneva - A costly campaign to provide vitamins to all Cubans has helped curb a mysterious epidemic that has afflicted thousands with vision problems, a World Health Organization offical said yesterday.
     The outbreak of optical neuritis has dimmed the vision of about 20,000 Cubans and a related malady has affected 6,000 other people, mostly women.

FIG.34

SPORTS

Major League Baseball
Yesterday in National League Action
Colorado 7, Houston 5
San Francisco 5, Chicago 4

Yesterday in American League Action
Detroit 4, Boston 1
Toronto 4, Milwaukee 2

ELECTRONIC TELEVISION PROGRAM GUIDE SCHEDULE SYSTEM AND METHOD

BACKGROUND OF THE INVENTION

This invention relates to an electronic program schedule system, which provides a user with schedule information for broadcast or cablecast programs viewed by the user on a television receiver. More particularly, it relates to an improved electronic program guide that provides the user with a more powerful and convenient operating environment, while, at the same time, increasing the efficiency of navigation by the user through the guide.

Electronic program guides for television systems are known in the art. For example, one prior system used an electronic character generator to display textual schedule information on the full screen of a television receiver. Other prior systems presented electronically stored program schedule information to a user for viewing while allowing the user to select display formats. Still other systems employed a data processor to input user-selection criteria, then stored only the program schedule information meeting these criteria, and subsequently used the stored information to automatically tune a programmable tuner or activate a recording device at the time of broadcast of the selected television programs. Such prior systems are generally discussed in "Stay Tuned for Smart TV," published in the November 1990 issue of *Popular Science*.

Collectively, the prior electronic program systems may be difficult to implement and cumbersome to use. They also fail to provide viewing capabilities that address in a more realistic manner the viewing habits of the users of these electronic program systems. Moreover, many of these systems are complex in their design and are expensive to implement. Ease of use and economy are primary concerns of television program distributors and viewers as they contemplate dramatic increases in the number and nature of program networks and other television-based services. And, as the number of television channels available to a user increases dramatically with the advent of new satellite and cable-based technologies, the utility of these prior systems substantially diminishes.

These prior-art systems also fail to provide the user with sufficient information, for example pricing and the like, about pay-per-view events, premium services or other packaged programming to which the user does not subscribe, nor do they provide the user with the capability to automatically purchase such programming on demand or impulse. Moreover, these prior-art systems are deficient in that they fail to provide an efficient and automatic method of updating or replacing the application software programs that implement the electronic guide at the user sites, relying instead on manual or other cumbersome forms of revision or replacement or hardware-based systems that can not be updated without physical replacement of integrated circuits and/or other parts.

Nor do these prior electronic guide systems have the capability of linking the user to other applications or information systems which are not part of the electronic program guide application or data.

Nor do these prior electronic guide systems provide video promotion of television programs and services that are functionally linked and visually displayed in an integrated fashion. Program promotion is an important element of the effective marketing of television programming. The promotion of pay-per-view pay (i.e., "a la carte") programs and other unregulated program services is particularly important to cable television operators in the wake of re-regulation by the federal government. The current method of promoting such programming using video is through dedicated "barker" channels that use full screen continuous trailers (i.e., previews) which may or may not be accompanied by prices and ordering information. Recently, such promotional videos have been shown in split screens where part of the screen shows general schedule information for a time period roughly corresponding to the time period during which the general program being promoted is shown. Accordingly, there exists a need for an electronic program guide which can provide improved display and linking of video promotions with program schedule information and order processing functions.

The prior electronic program guides also fail to provide the user with a simple and efficient method of controlling access to individual channels and individual programs. The amount of adult situations involving sex and violence has steadily increased during the last 40 years. The issue of how this affects children or other viewers has gained national attention. Providing a parent with the ability to lock-out a channel is a well known and widespread feature of certain television receivers and cable converter boxes. Despite this availability, the feature is seldom used by parents. The main impediments to its effective use are the cumbersome ways in which it is generally implemented, as well as the requirement that entire channels be blocked in order to block access to any objectional programming. A channel-oriented parental lock is unfair to other programmers on the blocked channel—who, for example, offer adult-oriented programming in the evening and youth-oriented programming the following morning—and inconvenient for viewers who want access to such programs. Thus, there is a particular need for a system which provides password control to individual programs and channels using a flexible and uncomplicated on-screen user interface.

The prior electronic program guides are also deficient in that they do not provide the user with the ability to view on demand current billing status and, thus, a need exists for a system which can provide the user with current billing information on the user's demand.

The prior electronic program guides also lack a method for creating a viewing itinerary electronically while still viewing a program currently appearing on the television receiver. Moreover, these prior program guides leave much guess work for the user as he navigates through a sequence of channels. When skimming through channels to ascertain the program then being displayed on any channel, commonly known as "channel surfing," the user needs to guess which program is currently being aired from the video encountered as the user surfs through the channels. Since much—in some cases, up to 30%—of the programming appearing on any given channel at any given time is advertising or other commercial programming, the user is not provided with any clues as to what program is appearing on a selected channel at a given time and must therefore wait until the advertisement or commercial is over before ascertaining the program then appearing on the selected channel. Thus a need exists for a program guide which displays current program schedule information for each channel as the user surfs through the available channels.

Accordingly, there is a need in the art for a simplified electronic program schedule system that may be more easily implemented, and which is appealing and efficient in operation. There is also a need to provide the user with an electronic program schedule system that displays both broadcast programs and electronic schedule information in a manner not previously available with other electronic program schedule systems, particularly those using a remote controller.

For example, there is a particular need for a flexible program schedule system that allows a user to view selected broadcast programs on a portion of the screen of the television receiver while simultaneously viewing program schedule information for other channels and/or services on another portion of the screen. There is also a need for such a program schedule system that permits the user to select from a plurality of selectable display formats for viewing the program schedule information. It is also preferred to have a system that indicates to the user those keys on the remote controller that are active in any particular mode of operation. There also exists a need for such a system that will give a user the capability to set a programmable reminder for viewing a program scheduled to air at a future time.

There is also a need for an electronic guide system providing the user with comprehensive information about pay-per-view events, premium services or other packaged programming to which the user does not ordinarily subscribe, and which provides the user with the capability to automatically purchase such programming on demand or impulse. There is also a need for an electronic guide system providing a reliable and efficient method of updating or replacing the application software that implements the electronic guide at the user sites.

There also exists a need for an electronic program guide that operates as a shell or window to provide the user with the capability to access other applications or information systems that are not part of the electronic program guide application or data.

It is accordingly an object of the present invention to provide a system that will allow the user to view a broadcast program while, at the same time, interactively viewing program schedule information for other programs.

It is another object of the present invention to provide the user with the ability to select from among a plurality of display formats for the program schedule information.

It is yet another object of the present invention to indicate to the user of the program schedule system those keys on the remote controller active in the particular mode of operation of the system at the time of use.

It is a still further object of the present invention to provide the user of the electronic program schedule system with the capability of setting programmable reminder messages for any future program.

It is yet a further object of this invention to provide the system user with comprehensive information about pay-per-view events, premium services or other packaged programming to which the user does not subscribe and the capability to automatically purchase such programming on demand or impulse.

It is another object of the present invention to provide an electronic guide system that provides a reliable and efficient method of updating or replacing the application software programs that implement the electronic guide at the user sites.

It is still another object of the electronic program guide to operate as a shell or window to provide the user with the capability to access other applications or information systems which are not part of the electronic program guide application or data.

It is yet another object of the electronic program guide to provide a system whereby video promotion of television programs and services are functionally linked and visually displayed in an integrated fashion to facilitate the marketing and sale of such programs and services.

It is still a further object of the present invention to provide password control for access to individual programs, as well as channels, using a protected interactive flexible and uncomplicated on-screen interface.

The disclosed system is also adapted to provide the user with current programming information for all programs as the user surfs through the available channels.

It is yet a further object of the present invention to provide a system in which the user can access his current billing information on demand.

These and other objects of the invention are achieved by an electronic program schedule system which includes a receiver for receiving broadcast, satellite or cablecast television programs for a plurality of television channels and a tuner for tuning a television receiver to a selected one of the plurality of channels. A data processor receives and stores in a memory television program schedule information for a plurality of television programs to appear on the plurality of television channels. A user control apparatus, such as a remote controller, is utilized by a viewer to choose user control commands and transmit signals in response to the data processor which receives the signals in response to user control commands. A television receiver is used to display the television programs and television program schedule information. A video display generator receives video control commands from the data processor and program schedule information from the memory and displays a portion of the program schedule information in overlaying relationship with a television program appearing on a television channel in at least one mode of operation of the television programming guide. The data processor controls the video display generator with video control commands, issued in response to the user control commands, to display program schedule information for any chosen one of the plurality of television programs in overlaying relationship with at least one television program then appearing on any chosen one of the plurality of channels on the television receiver.

BRIEF DESCRIPTION OF THE DRAWINGS

FIG. 9 shows an impulse ordering menu that appears on a television screen in one aspect of the preferred embodiment of the present invention.

FIG. 18 shows a grid listing of schedule information displayed in an All Listings mode of operation of the preferred embodiment of the present invention.

FIG. 25 shows another grid listing of schedule information displayed in an All Listings mode of operation of the present invention.

FIG. 34 is a menu showing information that appears in a news display in the Interactive Television mode of operation of the preferred embodiment of the present invention.

DETAILED DESCRIPTION OF THE PREFERRED EMBODIMENT

System Configuration

Figure 1:
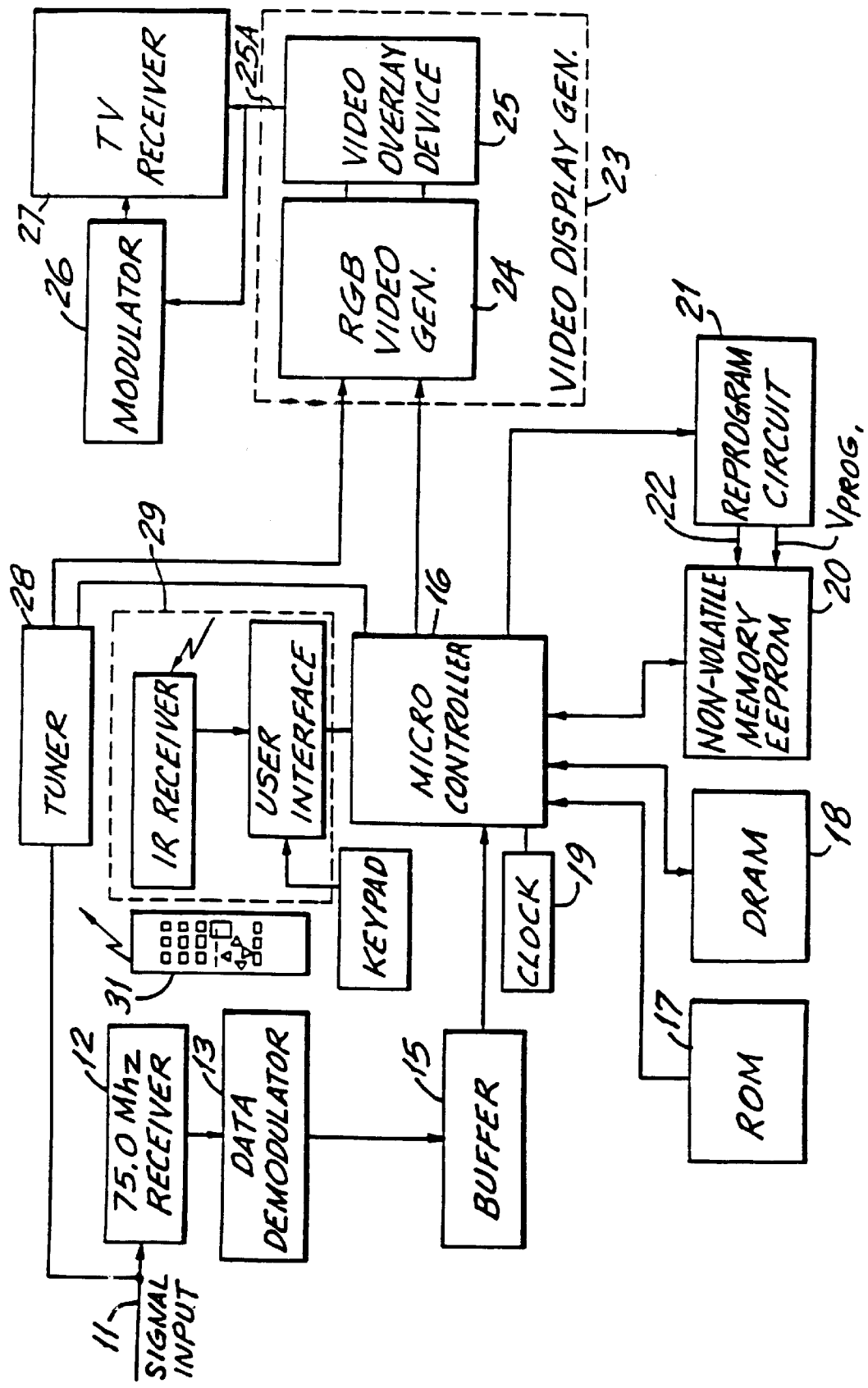
FIG. 1 is a block diagram showing various components of the preferred embodiment of the invention herein.

FIG. 1 is a block diagram showing various components of the electronic program schedule system generally designated as 10. Physically, these system components can be located in a user's set-top cable converter box or other signal reception or processing device, such as a satellite receiver. Alternatively, the components can be mounted in a separate housing, or included as part of a television receiver, VCR, personal computer or multimedia player.

An input signal 11 is connected to a receiver 12, which receives a transmitted data stream from a data provider. The data stream may contain, for example, information about programs or services available in a particular market, geographical or otherwise. The input signal 11 can originate, for example, as part of a standard broadcast, cablecast or satellite transmission, or other form of data transmission. In the case of a cablecast transmission, the data provider is a local cable operator and the data stream contains program schedule information for all television programs and other services available in the operator's geographical market.

The data stream may be modulated and then transmitted on the cable line in any number of ways, including as part of a dedicated channel transmission operating at a frequency of, for example, 75 MHz. Those of skill in the art will understand that numerous other transmission schemes can be used to transmit the data stream, such as embedding it in the vertical blanking interval of a program broadcast signal. As will be discussed in greater detail below, according to the present invention, the transmitted data stream may additionally contain application software for implementing the electronic program guide at the user site.

The transmitted program schedule data or application software is received by the receiver 12 on signal input line 11. The received signal is passed from the receiver to a data demodulator 13, such as a QPSK demodulator, which demodulates the transmission and passes it to a buffer 15.

A microcontroller 16, such as a M68000EC, receives data passed to the buffer 15. Bootstrap operating software, which may be used for capturing electronic program guide application software updates, is stored in a read only memory (ROM) 17. The microcontroller 16 uses the received program schedule information to build a database by storing the data in appropriately organized records in dynamic random access memory (DRAM) 18. The stored schedule information can be updated on a periodic basis, such as hourly, daily or weekly, or at any time when changes in scheduling or other factors warrant an update. The system also includes a system clock 19.

Alternatively, the program schedule information could be supplied in a ROM, disk or other non-volatile memory, or it could be downloaded to a storage disk or other data storage device. The invention herein is not directed to the particular method of transmission or reception of the schedule information.

If the microcontroller 16 recognizes the received data as application software which controls the program schedule system, as opposed to program schedule information, it stores it in non-volatile memory, such as an electrically erasable programmable ROM (EEPROM) 20 or battery-backed static RAM (SRAM). This configuration allows revised or replacement versions of the application software to be downloaded directly from the software developer to the user site through the cable or other transmission system.

In the case where an EEPROM is utilized, revised or replacement versions of the application software downloaded from the developer are first stored in DRAM 18 by the microcontroller 16, under direction of the downloading operating software stored in the ROM 17. The stored application software can then be checked for accuracy by, for example, a checksum analysis or other verification routine.

After the accuracy of the application software has been verified, the microcontroller 16 initiates a routine to re-program the EEPROM 20, where the application software is permanently stored. The microcontroller 16 will issue proper control commands to a reprogram circuit 21, which is adapted to supply the proper program voltage and logic control signals 22 required to erase and write to the EEPROM. It supplies this program voltage, Vprog, as well as any other required control signals, such as read or write enable, to the EEPROM 20 upon command from the microcontroller 16. After the EEPROM 20 has been electrically erased, the microcontroller 16 initiates transfer of the new application software from the DRAM 18 to the EEPROM 20 for storing.

When a battery-backed SRAM is utilized as nonvolatile memory, the microcontroller stores the revised or replacement version of the application software downloaded from the developer directly in the SRAM, again under direction of the downloading operating software stored in the ROM. The stored application software can then be checked for accuracy by, for example, a checksum analysis or other verification routine.

When power is first applied to the system 10, the bootstrap operating software verifies that the program guide application software is resident in memory. If it is not resident, the bootstrap operating software waits for a download of the software. Once the application software is resident, the microcontroller 16 executes the application program software from a dedicated portion of the DRAM 18. Alternatively, the application software can be executed directly from the non-volatile memory 20. Under control of the program guide application software, the microcontroller 16 first verifies that the program schedule information is resident in DRAM 18. If it is not resident, the microcontroller waits for a download of the program schedule information, as discussed above.

When the schedule system is operating, as discussed in greater detail hereinbelow, the microcontroller 16 takes the program schedule information stored in the DRAM 18 and, in conjunction with other downloaded data types such as stored bit maps for the screen configuration and the graphic symbol or logo displays stored in non-volatile memory 20 or, alternatively, in DRAM 18, supplies it to a video display generator (VDG) 23, which in the present embodiment may be a commercially available VGA-type graphics card, such as a Rocgen card manufactured by Roctec. The VDG includes a standard RGB video generator 24, which takes the digital program schedule information sent by the microcontroller 16 and converts it to an RGB format in accordance with the bit map for the particular screen display then being presented to the user on the television receiver 27. The configuration of each screen is shown and discussed in greater detail in the System Operation section below.

Figure 2:
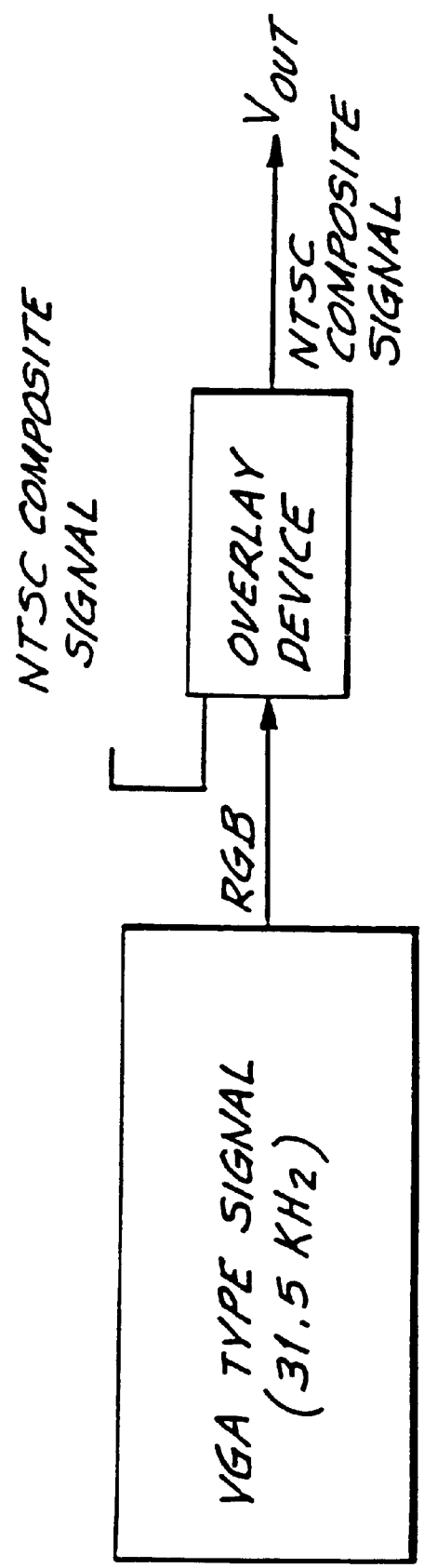
FIG. 2 is a block diagram showing the combination of program and schedule information by the video overlay device utilized in the preferred embodiment of the invention.

The VDG also includes a Video Overlay Device 25, which accepts the RGB video input, as well as an input from conventional television tuner 28, such as a conventional tuner manufactured by General Instrument, which supplies a program signal in standard NTSC video format. The overlay device 25 converts and combines the RGB signal with the signal from the tuner 28, and produces a composite NTSC output signal containing both the program signal and the program schedule information, as shown in FIG. 2. This composite video signal is supplied to a modulator 26, shown in FIG. 1, which can be a modulator such as available from Radio Shack, and then to the television receiver 27, which the user keeps tuned to the modulated channel, for example, channel 3 or 4. The composite video signal can also be supplied directly to the television receiver 27 or other receiving device from the VDG through a video port 25A on the VDG.

The system components identified in connection with FIG. 1 can all be implemented in a preferred platform by, for example, an IBM personal computer equipped with a transmission link and a video graphics card, such as those manufactured by Roctec. Other platforms, such as a cable converter box equipped with a microprocessor and memory, could also be used. In any event, those of skill in the art will appreciate that the particular details of the hardware components and data storage are a function of the particular implementation of the system, and are not the subject of the present invention.

As discussed in detail below, the user may navigate through the program schedule system with a remote controller, such as that shown in FIG. 3, which operates on conventional principles of remote control transmitter-receiver logic, such as by infrared or other signalling, or other suitable user interface. The remote controller 31 communicates with the microcontroller 16 through the remote controller receiver 29, shown in FIG. 1, which can be a Silent Partner IR receiver and which receives signals transmitted by the remote controller 31 and supplies the microcontroller 16 with a corresponding digital signal indicating the key depressed by the user.

Figure 3:
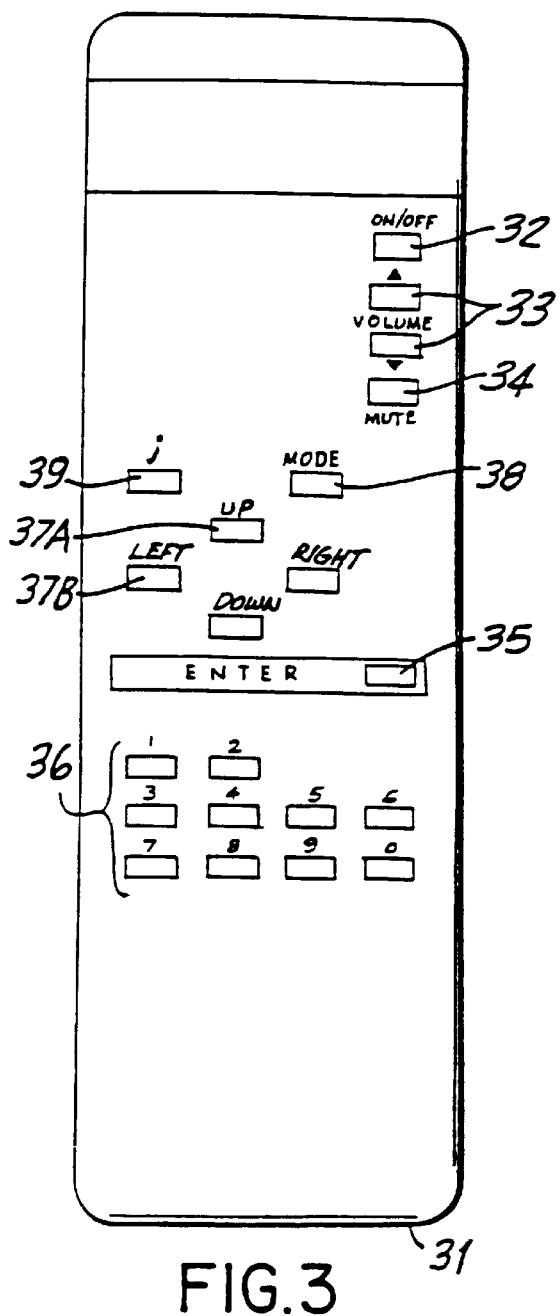
FIG. 3 depicts a remote controller that can be used in connection with the preferred embodiment of the electronic program guide system of the present application.

A remote controller suitable for the present invention, such as shown in FIG. 3, which can be a remote controller manufactured by Universal Electronics, may include a power switch 32, volume 33 and mute 34 controls, an ENTER key 35, 0–9 digit keys 36, four direction arrow keys 37A and 37B, a MODE key 38 and an information key 39 that is designated with a lower case "i." The power 32, volume 33 and mute 34 keys operate in the same manner as conventional remote controllers typically used with present-day television receivers. The numeric digit keys 36 also function in much the same manner as conventional remote controllers. A brief description of the remaining keys follows.

The MODE key 38 takes the user through various layers of the electronic program schedule system 10 and generally allows the user to return to a previous screen when he is in a submenu. The up/down direction arrow keys 37A allow a user to navigate through the different TV program channels when the program schedule system is in a FLIP or BROWSE mode, as will be fully described below, and also allow the user to navigate through highlighted bars displayed on the TV screen when in a MENU mode. The left/right direction arrow keys 37B allow the user to navigate through selected time periods when the program schedule system is in the BROWSE mode, as will also be described below. They further allow the user to navigate across subject-matter categories while in the "Categories" submenu of the MENU mode, as well as to navigate across time periods when the program schedule system is in a pay-per-view ordering mode and, in general, navigate in left or right directions to select various icons and other objects. The information, or "i," key 39 allows the user to view supplemental program and other information during the various modes of the program schedule system. The ENTER 35 key fulfills and inputs a command once the user has made a selection from the remote controller keys. The function and operation of these keys will be made more apparent in the detailed discussion of the FLIP, BROWSE and MENU modes below.

Figure 4:
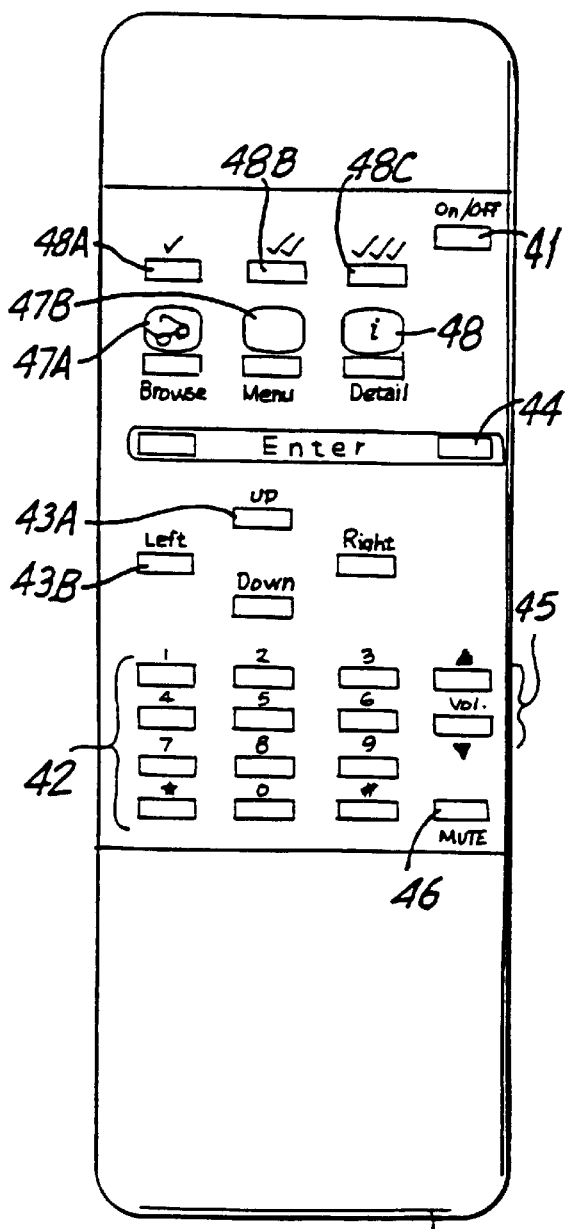
FIG. 4 depicts an alternative embodiment of the remote controller shown in FIG. 3.

A second embodiment of the remote controller 40 is shown in FIG. 4. This embodiment of the remote controller also includes a power key 41, numeric digit keys 42, direction arrow keys 43A and 43B, information key 48, ENTER key 44, volume control 45 and mute keys 46. It also includes pound sign and star keys.

This embodiment of the remote controller further includes a number of icon keys 47A and 47B, which correspond to different submenus or modes of the program schedule system. The icons 47A and 47B may also be displayed on the TV screen when the program schedule system is operating. The icon keys essentially replace the MODE key 38 used in the embodiment of the remote controller shown in FIG. 3. Using these keys, the user can move from one mode to another simply by depressing the icon key corresponding to the desired mode of operation of the program schedule system. In the embodiment of FIG. 4, the icons 47A and 47B are shown as graphic symbols situated directly above a corresponding color-coded key. Alternatively, the color-coded keys could be eliminated and keys could be formed in the image of the icon itself.

The embodiment of the remote controller shown in FIG. 4 also includes three color-coded viewer preference keys, 48A, 48B and 48C that are situated directly above the icon keys. Each of these keys indicates to the program schedule system a distinct user-created "Channel Preference" list, which is a listing of a specific subset of channels for a particular user, arranged in the sequential order that the user wishes to view during operation of the program schedule system. The creation of the Channel Preference list is discussed in the following section. Thus, the system provides for at least three individual channel subsets for three individual users.

Additionally, each of the functions of the remote controllers can also be integrated into a keypad on the user's cable box or other hardware.

System Operation

In operation, the electronic program schedule system of the present invention functions as follows.

Flip Mode

Figure 5:
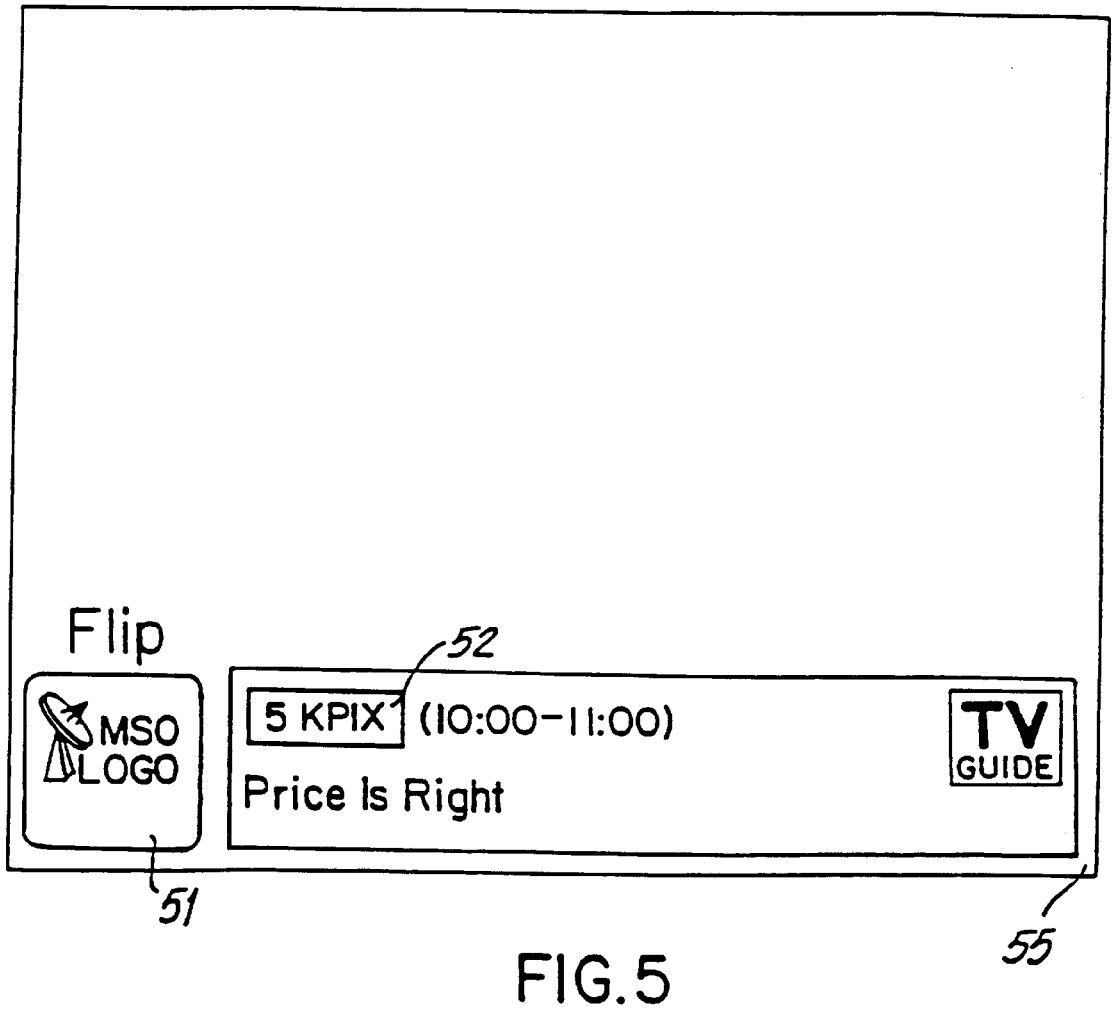
FIG. 5 shows an overlay appearing on a television screen in one mode of operation of the preferred embodiment of the present invention.

When the user is viewing a particular program channel on the television receiver, the program schedule system defaults to a FLIP mode, shown in FIG. 5. In this mode, a graphic overlay 51 containing programming information for the channel currently tuned on the tuner is superimposed in overlaying relationship with a received program signal 55 on the screen of the television receiver 27 whenever the viewer changes the program channel, for example, by using the up/down direction arrows on the remote controller. The video overlay device 25, such as shown in FIG. 1, combines the computer-generated RGB video-graphic overlay information with the NTSC-format program signal from the tuner 28, and supplies an NTSC-format output signal, which includes the program signal from the tuner and the program schedule overlay information for viewing on the television receiver 27.

The programming information contained in the graphic overlay 51 is supplied to the RGB video generator by the microcontroller. In FLIP mode, the microcontroller first searches the program schedule database in, for example, the DRAM 18 to retrieve the programming information for the currently tuned channel 52 corresponding to the current time; i.e., the time at which the user just turned on the television receiver for viewing. The microcontroller 16 then supplies the current channel and program information to the RGB video generator 24 which converts the digital data information to RGB format and supplies it to the video overlay device 25.

In normal operation, the microcontroller 16 defaults to displaying all channels offered by the cable company prioritized by numeric order, which is determined by the broadcast channel position in the radio spectrum or the marketing judgments of local cable opertors. Using a "Channel Preference" submenu, discussed below, the user can revise the content and/or sequential order of the channels presented to the television receiver 27.

In general, if the user does not issue a change-channel instruction, or other command, from the remote controller 40 within a predetermined time interval while in the FLIP mode, the microcontroller 16 instructs the VDG 23 to remove the graphic overlay 51 from the television receiver, thus presenting only a program signal 55 to the television receiver 27 for viewing. The duration of the predetermined time interval is such that it allows the user sufficient time to read the programming information contained in the overlay. The duration of the predetermined time interval during which the graphic 51 overlay appears is stored in a location in non-volatile memory 20 addressable by the microcontroller 16. The user can change the duration of the time interval, by first entering a Viewer Preference mode, and then selecting an "overlay interval" entry. The microcontroller 16 then causes a user prompt to be displayed on the screen which, for example, asks the user to select an appropriate time period for displaying in the graphic overlay on the screen. Using the numeric keys, the user can input an appropriate response, for example, a period between 5 and 60 seconds, and then depress ENTER. The new interval period is then read and stored by the microcontroller 16 in the overlay time interval location in memory.

If the user issues a change-channel command from the remote controller 40 before or after the predetermined overlay period has elapsed, either by using the up/down direction arrows 43A, or by entering a desired channel number using the numeric keys 42 and then depressing the ENTER key 44, the microcontroller 16 will cause the tuner 28 to tune to the desired channel—either the channel immediately preceding or following the current channel when the up or down arrow 43A is used or the specific channel entered on the numeric key pad by the user—and will also search for and immediately cause to be displayed the current program information for that channel. Thus, as the user flips through the channels, the program schedule information for any selected channel automatically appears in the graphic overlay 51 while the actual program 55 appearing on the selected channel at the particular time occupies the remainder of the screen.

The system can also be configured to issue an error message, such as an audible beep or displayed text indicating an invalid key stroke, if the user depresses either the left or right direction arrow keys while in the FLIP mode.

Browse Mode

To initiate the BROWSE mode, the user depresses the MODE switch once while in the FLIP mode when using the first embodiment of the remote controller 31 shown in FIG. 3. Utilizing the second embodiment of the remote controller 40 shown in FIG. 4, the user would depress the button below the BROWSE icon 47A.

Figure 11:
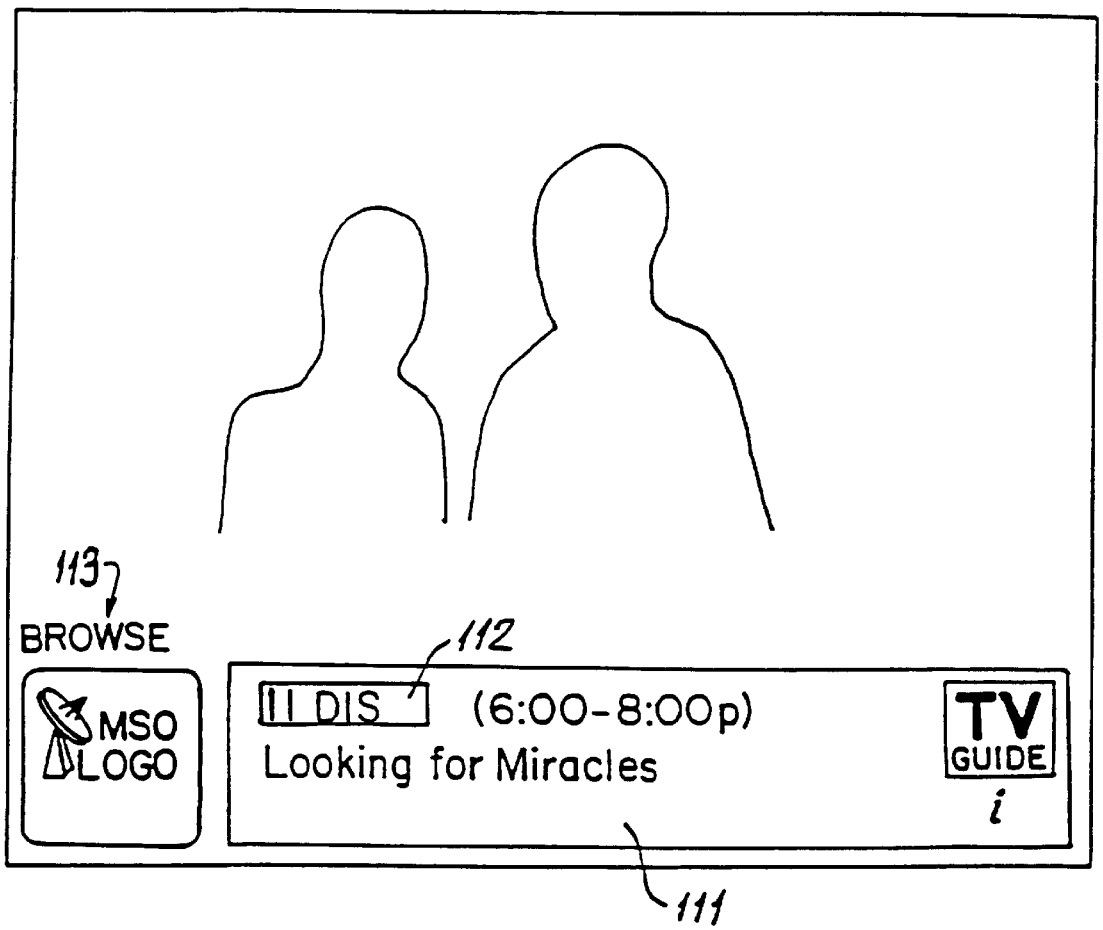
FIG. 11 shows a graphic overlay appearing on a television screeen in a BROWSE mode of operation of the preferred embodiment of the present invention.

In the BROWSE mode, the user is provided with the ability to scan through program schedule information for any channel, including, but not limited to, the channel being viewed, while at the same time continuing to view the TV program previously selected. As shown in FIG. 11, in this mode the graphic overlay information that appears in the FLIP mode is replaced with programming information for the channel being browsed, which may or may not be the channel currently being viewed by the user. After the user issues the command from the remote controller 40 to enter the BROWSE mode, a graphic overlay 111 is generated, as in the FLIP mode, with program schedule information for the currently tuned channel 112 and a textual BROWSE indicator 113 to remind the user of the currently active mode, as shown in FIG. 11.

Figure 12:
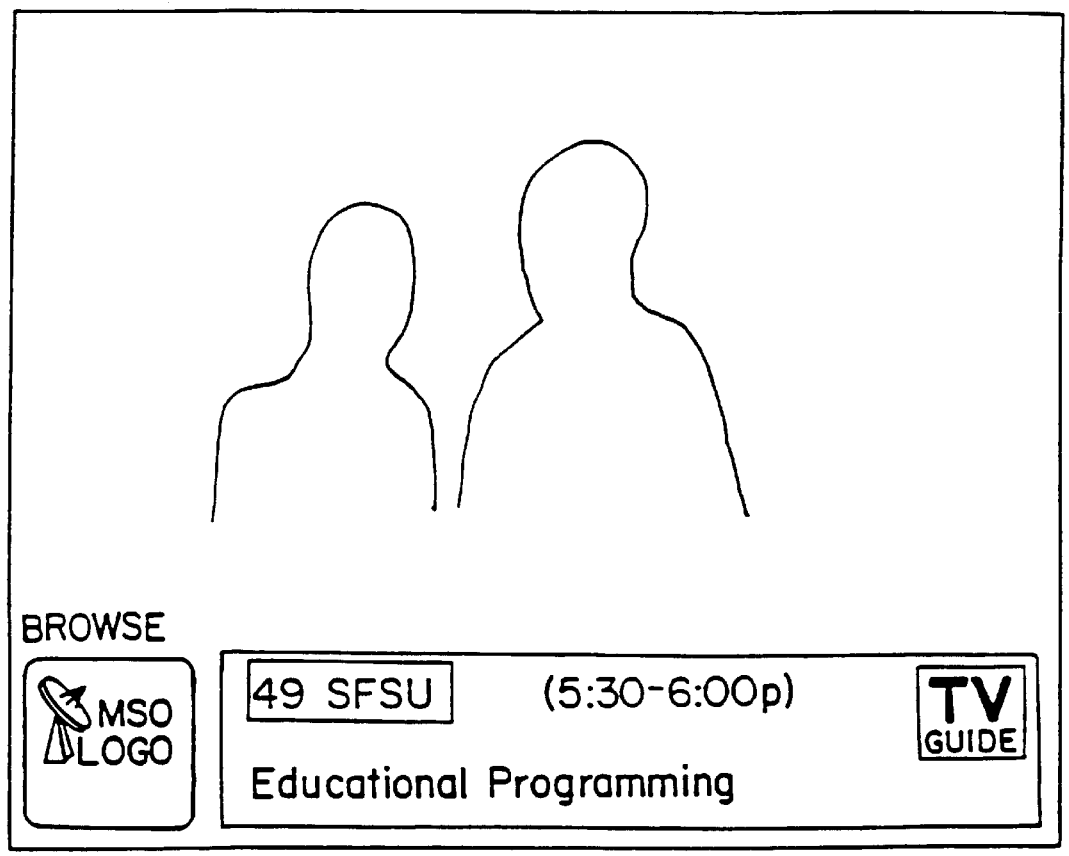
FIG. 12 shows a graphic overlay appearing on a television screen in a BROWSE mode of operation of the preferred embodiment of the present invention having different information from that shown in FIG. 11.

If the user depresses either the up or down direction arrow on the remote controller 40 while in the BROWSE mode, program schedule information for either the prior or next channel is displayed in the graphic overlay portion 111 of the television receiver screen 27, while the tuner remains tuned to the channel program that appeared on the television receiver at the time the user entered the BROWSE mode, as shown in FIG. 12, and continues to so appear. Each successive depression of the up or down direction arrow key produces corresponding program schedule information for the selected channel. The graphic overlay may also include a small video window for showing the actual video signal of a currently aired program or a clip of a future program corresponding to the schedule information then appearing in the BROWSE overlay. In this way, the user can simultaneously scan program schedule information for all channels while continuously viewing at least one selected program on the television receiver. With the advent of sophisticated television receivers, it may also be possible to simultaneously display multiple broadcast programs on a single screen for viewing, or to split the screen to show, for example, broadcast programs in combination with advertisements. The BROWSE feature could be used in any of these situations.

If, at any time during scanning of the program schedule information in the BROWSE mode, the user desires to tune the television receiver 27 from the program channel currently being viewed to the program channel indicated in the schedule information in the graphic overlay, he simply depresses the ENTER button 44 and the tuner 28 will be tuned to that channel. If the user does not want to view another channel and wishes to exit the BROWSE mode, thus removing the graphic overlay 111 with the program schedule information, he must depress the MODE key twice in the first embodiment of the remote controller 31. The first depression of the MODE key takes the user to the MENU mode, discussed below, and the second depression will take the user to the FLIP mode. Once in the FLIP mode, the graphic overlay will be removed after the duration of the time-out interval has passed. In the second embodiment of the remote controller shown in FIG. 4, the user toggles the BROWSE icon key to deactive the BROWSE mode.

When the user first enters the BROWSE mode and begins scanning channels, the schedule information appearing in the overlay portion ill describes the programs currently playing on any particular channel. In order to view programming information for later times, the user employs the left and right direction arrows 43B. As a consequence, the system will display future program schedule information for the particular channel previously selected by the up and down direction arrows, whether it is the channel currently being viewed or any other available channel. The schedule information presented includes the name of the program and program start/stop time. The instant embodiment of the system, in order to conserve memory, will not allow the user to view programming information for a time prior to the current time. The system could be easily modified to provide such information if adequate memory is made available.

Figure 12A:
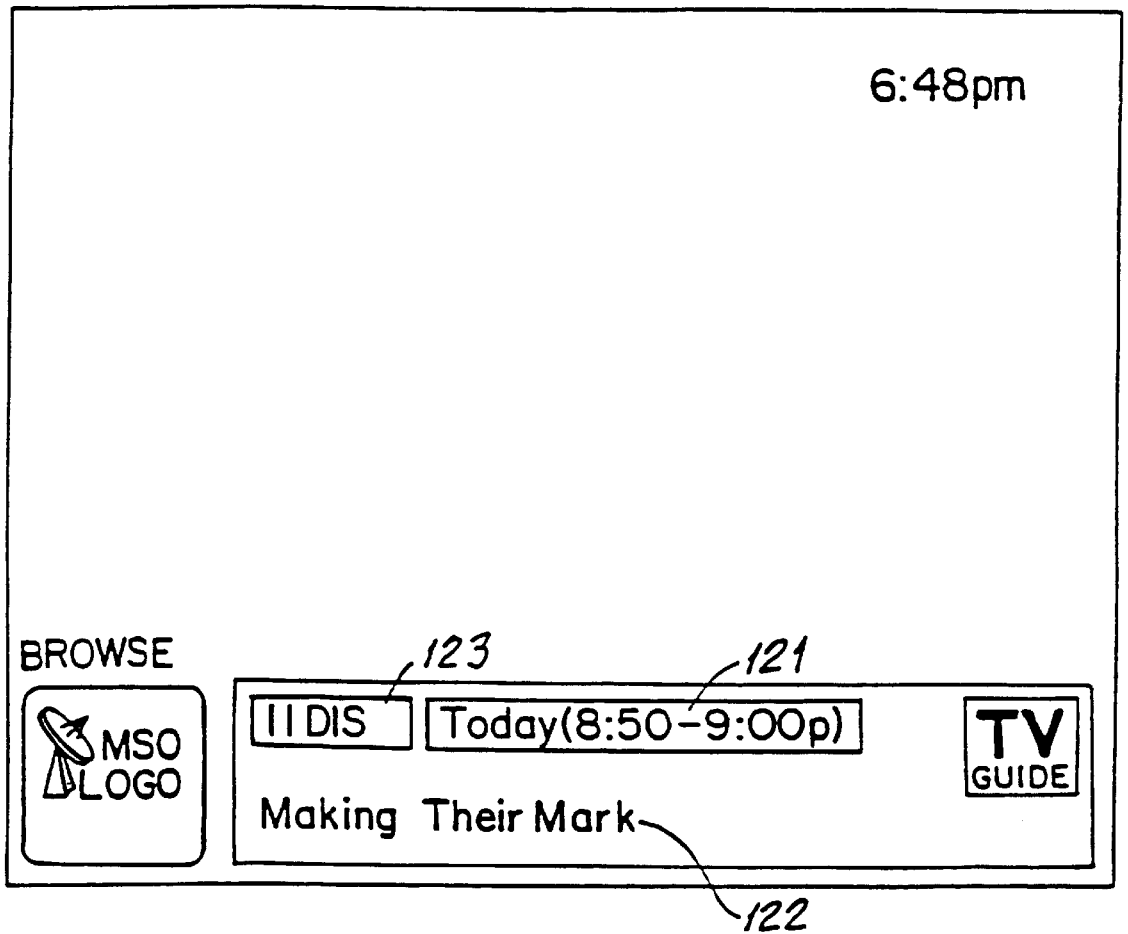
FIG. 12A shows a graphic overlay appearing on a television screen in a BROWSE mode of operation in the present invention displaying schedule information for a time and channel other than that shown in FIG. 11.

When viewing program schedule information for a future time in the BROWSE mode, the displayed time of airing 121 of the particular show 122 is highlighted, as well as the channel number and service indicator 123, as shown in FIG. 12A. Such highlighted information reminds the user that he is viewing program schedule information for a future time. Also, when viewing program schedule information for a future time on any particular channel in the BROWSE mode, depression of the channel up direction arrow key on the remote controller 40 causes programming schedule information for the next channel to appear, which corresponds in time to the future time that was being viewed before the up key was depressed by the user. The channel down direction arrow key 43B functions identically in this mode.

Figure 13:
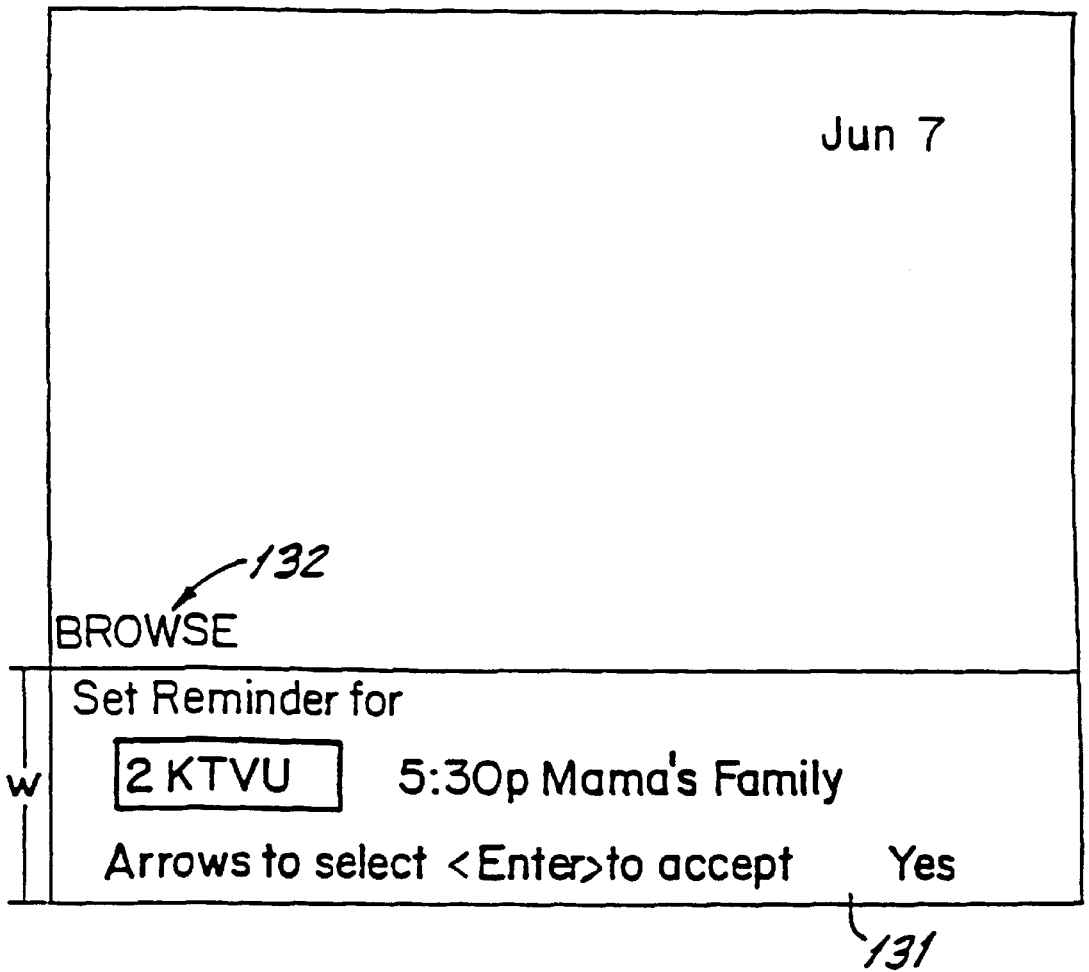
FIG. 13 shows a graphic overlay appearing in a REMINDER mode of operation of the preferred embodiment of the present invention.
Figure 14:
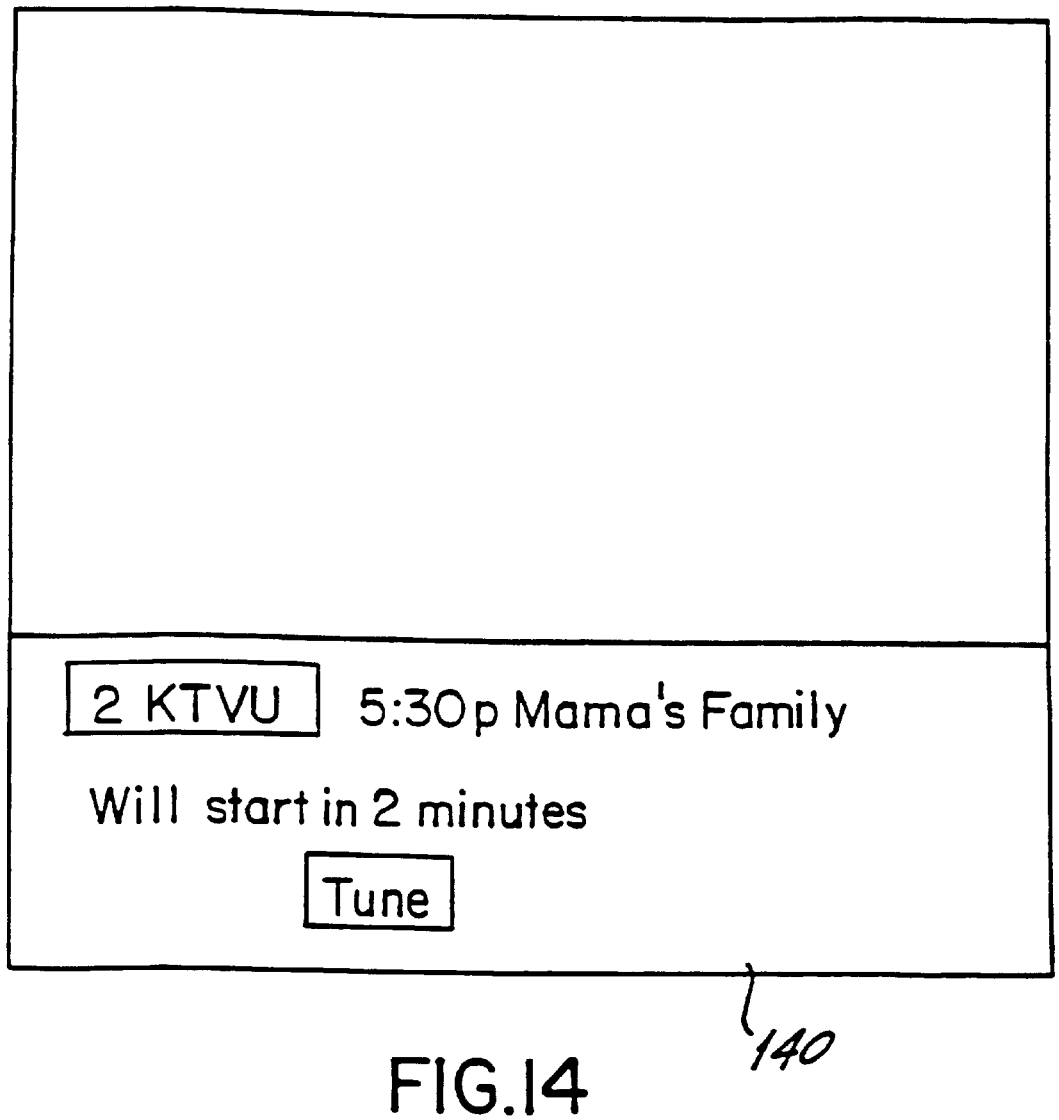
FIG. 14 shows yet another graphic overlay appearing in a REMINDER mode of operation of the preferred embodiment of the present invention.

If while viewing program schedule information for a future time in BROWSE mode the user depresses the ENTER key on the remote controller, the microcontroller 16 will instruct the VDG 23 to display a REMINDER overlay message 130 which, as shown in FIG. 13, is displayed as a second overlay 131 appearing above the BROWSE overlay 132. The REMINDER message 130 queries the user as to whether the system should remind the user, at a predetermined time before the start of the selected program, that he or she would like to view the selected program, as shown in FIG. 13. If the user responds affirmatively, the microcontroller 16 stores reminder data consisting of at least the channel, time and day of the selected program in a reminder buffer, which contains similar schedule information for all programs for which the user has set a reminder. At a pre-determined time before the selected program start time, for example, five minutes, the microcontroller 16 will retreive schedule information, including title and service, based on the reminder data, and will instruct the VDG 23 to display a REMINDER overlay message 140 on the television receiver 27, as shown in FIG. 14, to remind the user that he or she previously set a reminder to watch the selected program. The REMINDER message 140 contains the channel, service and start time. It also displays the number of minutes before the time of airing of the particular show and updates the display every minute until the time of airing. The REMINDER message 140 also displays a "TUNE" inquiry, which asks the user if she would like to tune to the selected program. As with the overlay display time period in the FLIP mode, the user can modify the time period before a selected program that the REMINDER message appears by entering the Viewer Preference mode and revising the time entry.

Menu Mode

Using the remote controller 31 shown in FIG. 3, the user can enter the MENU mode from the BROWSE mode or from the FLIP mode by toggling the MODE button 38 once or twice, respectively. Using the remote controller 40 of FIG. 4, the user would simply depress the key 47B corresponding to the MENU icon.

Figure 6:
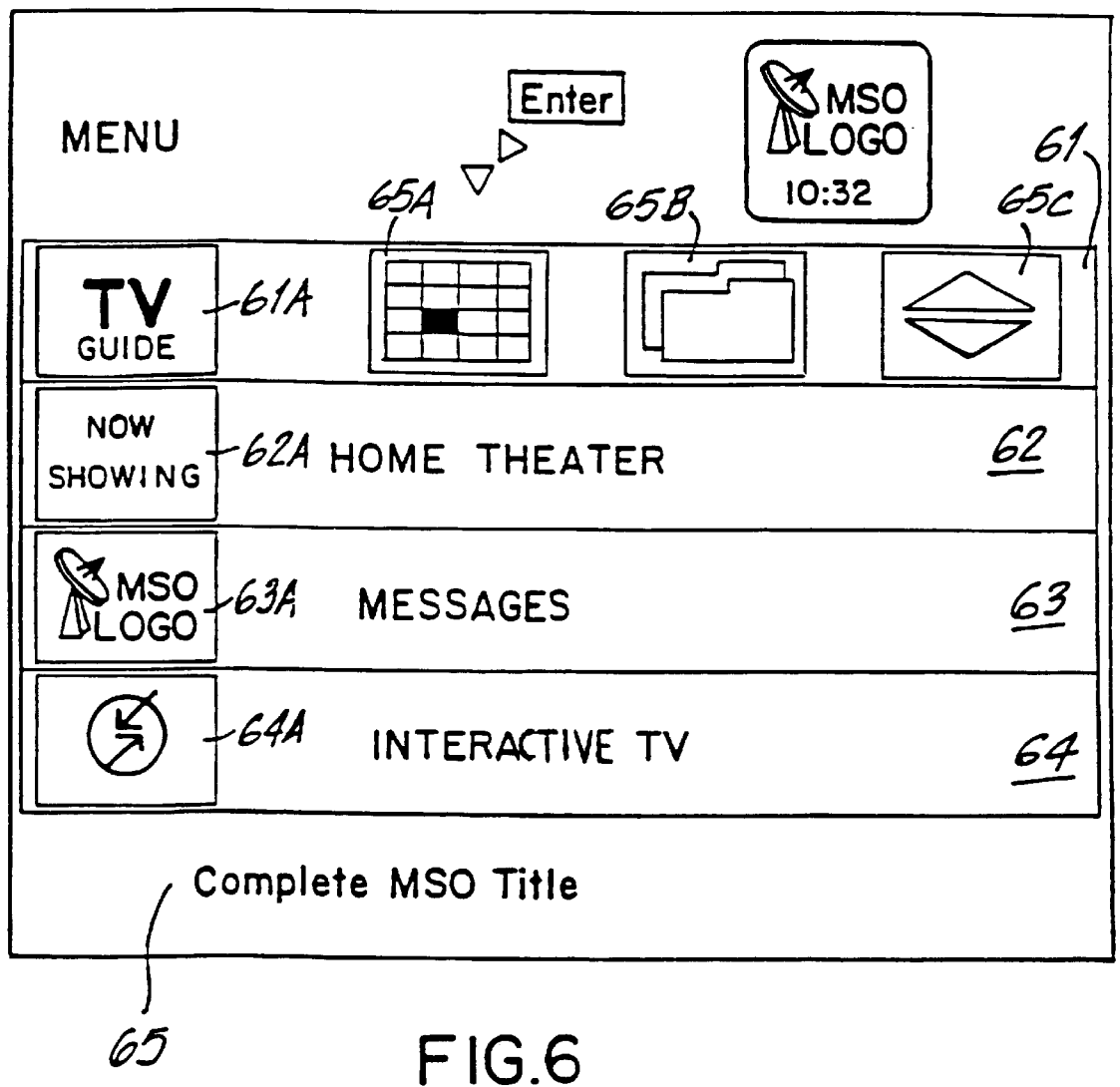
FIG. 6 is a menu that appears on a television screen in a MENU mode of operation of the preferred embodiment of the present invention.
Figure 6A:
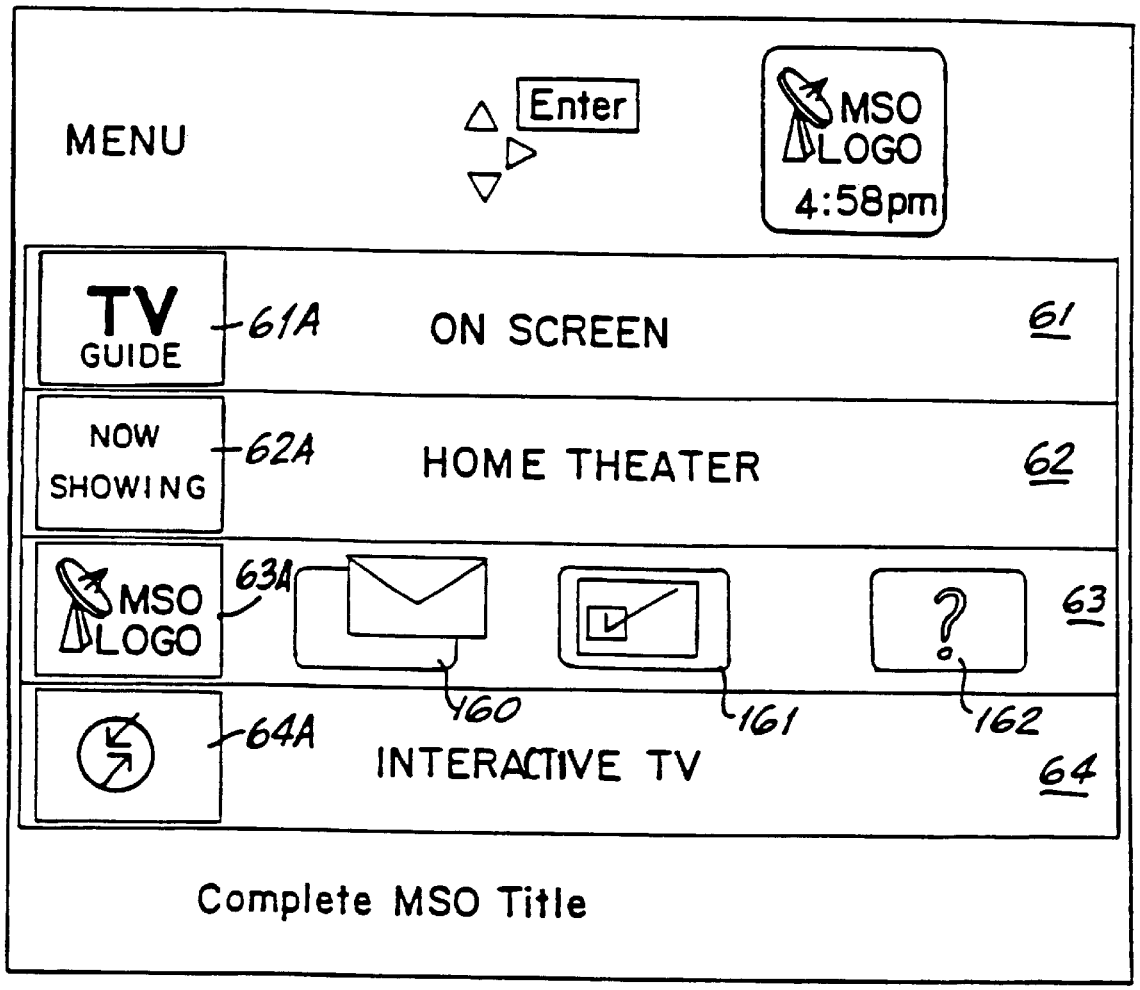
FIG. 6A is yet another menu that appears on a television screen in a MENU mode of operation of the preferred embodiment of the present invention.

Referring to FIG. 6, in the MENU mode, the system displays a plurality of menu items and icons, which correspond to and allow user selection of distinct program schedule information display formats, local cable system message boards and other on-line information services. Unlike in the FLIP and BROWSE modes, in the MENU mode no program signal from the tuner is displayed on the television receiver 27. In the embodiment shown in FIG. 6, there are four vertically selectable horizontal bars 61–64, which are accessed using the up and down direction arrows 43A on the remote controller 31 or 40. At the extreme left of each bar, an identifying icon 61A–64A is displayed, which identifies the information contained in that bar. In the embodiment of FIG. 6, the "TV GUIDE" icon 61A in the first bar corresponds to program schedule information from TV Guide® magazine, the "NOW SHOWING" icon 62A in the second bar 62 corresponds to pay-per-view and premium service events, the "MSO Logo" icon 63A in the third bar 63 corresponds to Customer Service or local cable company information messages, and the circular icon 64A in the fourth bar 64 corresponds to other interactive services available to the user. As also shown in FIGS. 6 and 6A, each bar also contains a textual description of its contents.

Figure 15:
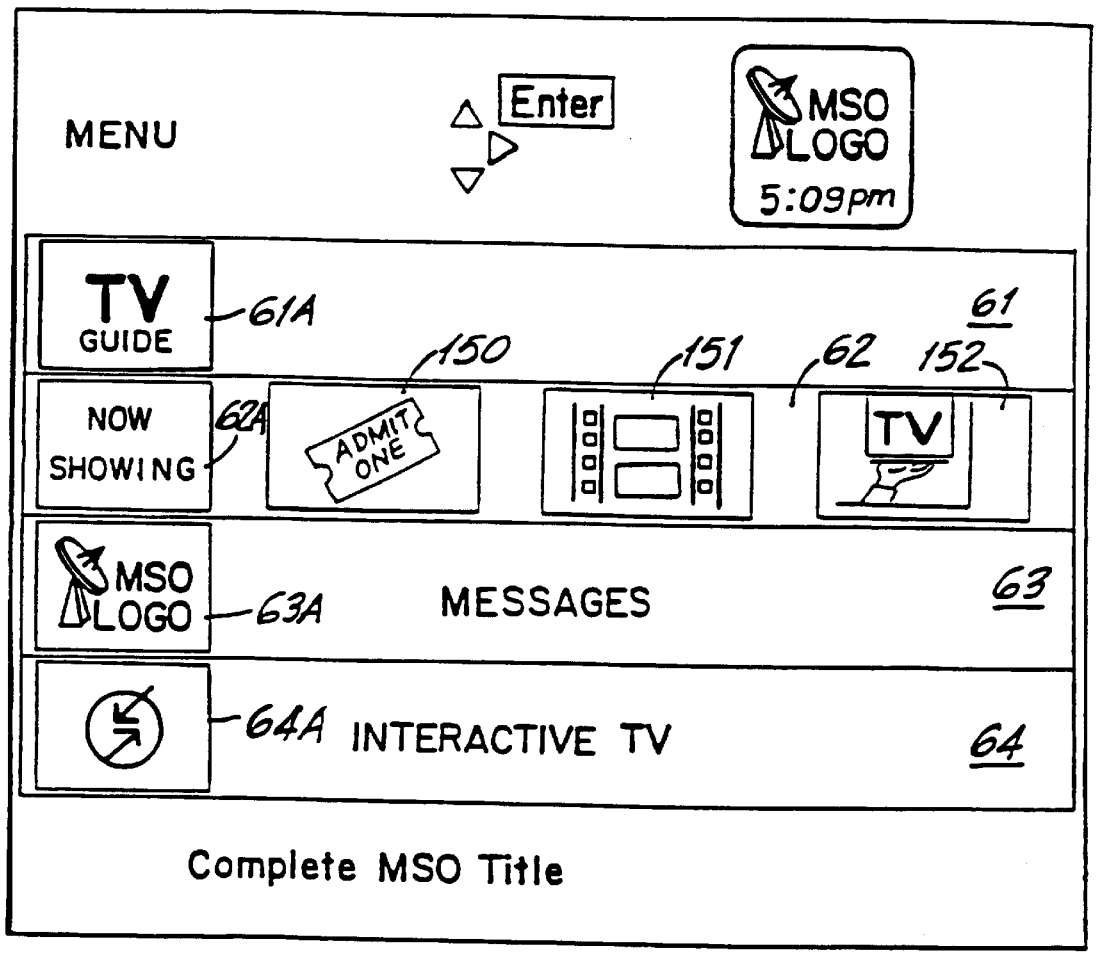
FIG. 15 is yet another menu that appears on a television screen in a MENU mode of operation of the preferred embodiment of the present invention.
Figure 16:
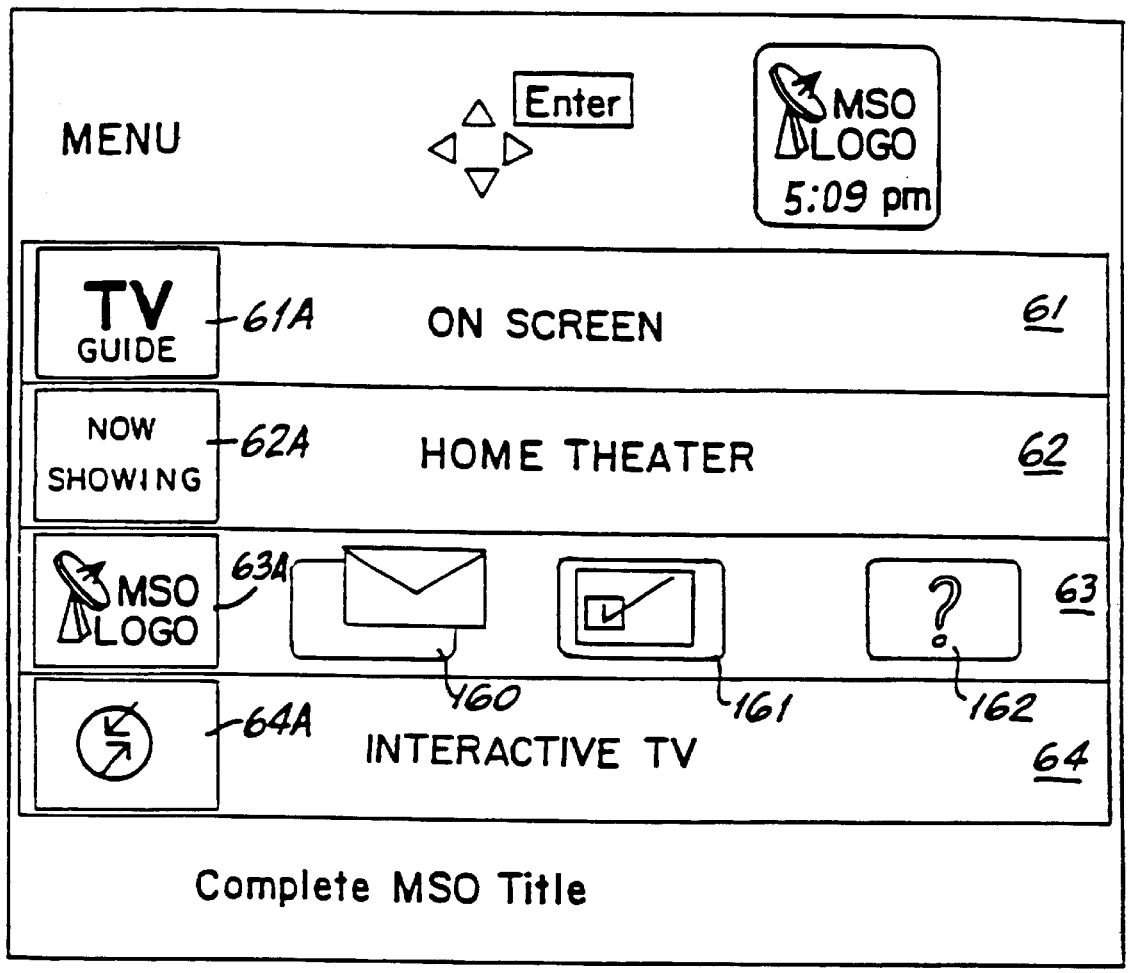
FIG. 16 is yet another menu that appears on a television screen in a MENU mode of operation of the preferred embodiment of the present invention.
Figure 17:
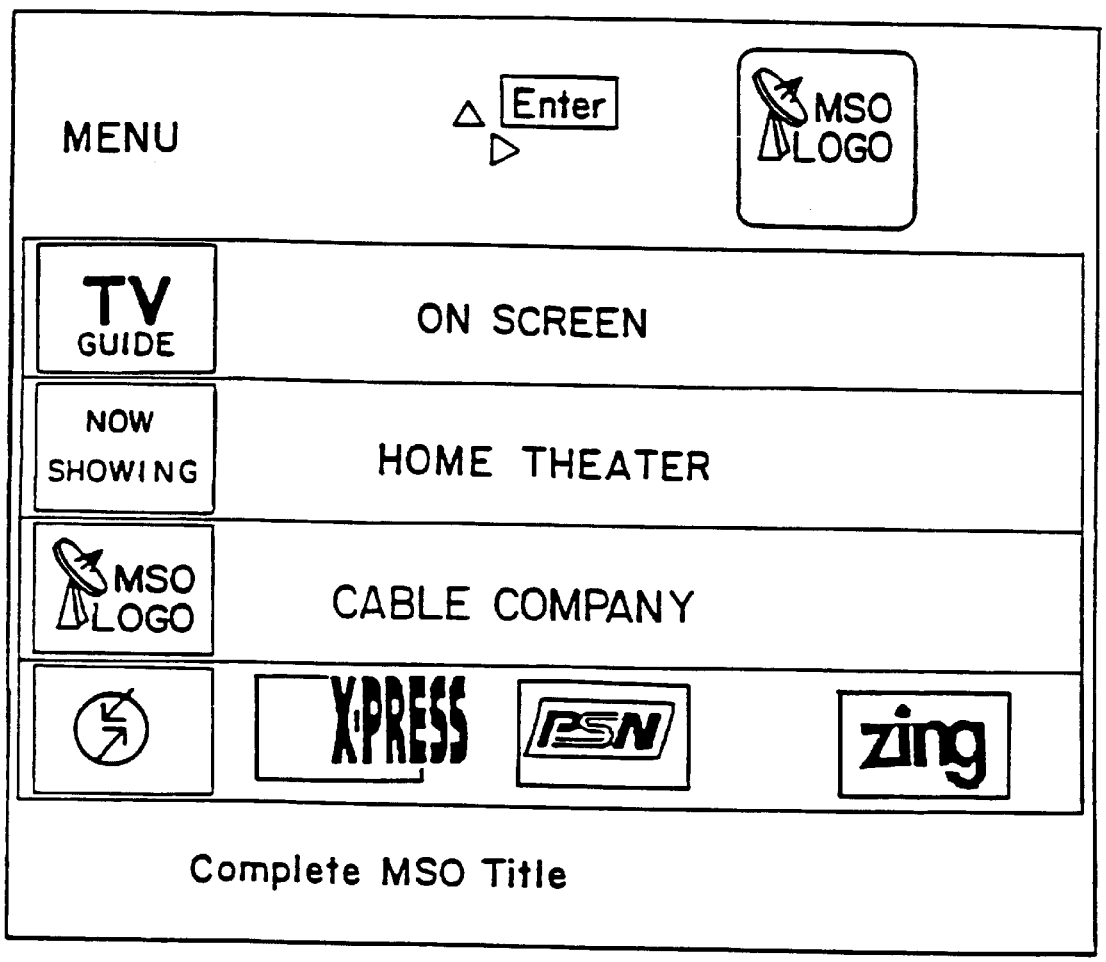
FIG. 17 is yet another menu that appears on a television screen in a MENU mode of operation of the preferred embodiment of the present invention.

When the user first enters the MENU mode, the system defaults to selection of the program schedule bar. When a particular bar is selected, the textual description is removed and a plurality of icons are displayed adjacent the identifying icon. In FIG. 6, the program schedule bar 61 is selected. Using the up or down direction arrow key on the remote controller 40, the user selects a vertically adjacent bar. FIGS. 15–17 show, respectively, selection of the Pay-Per-View bar 62, the Customer Service or Messages bar 63 and the Interactive TV services bar 64.

Once a particular bar in the MENU screen is selected, the user can select a particular icon from the plurality of horizontally selectable displayed icons 65A–65C by using the left or right direction arrow and the ENTER key on the remote controller 40. Each icon contains a graphical symbol appearing in a background window of a particular color. When a particular icon is selected, it is offset from its background window and the color of the window changes. In FIG. 6, the grid icon 65A immediately adjacent the "TV GUIDE" icon in the first bar 61 is selected.

The function corresponding to each icon will now be discussed.

In the uppermost vertically selectable horizontal bar 61, the first grid icon 65A represents an "All Listings" mode in which the program schedule information is displayed in a grid listing, such as that shown in FIG. 18. Alternatively, a single column grid-like display could be used, as that shown in FIG. 25. In this format, the vertical y-axis identifies the channel number and service while the horizontal x-axis identifies the time. The screen display of FIG. 18 also contains in the upper left-hand corner a mode identifier 180, in this case the notation "All Listings," to remind the user of the current operating mode of the system. Directly underneath the mode display is a highlighted display 181 of the channel that the user was watching before entering the MENU mode. In the upper right-hand corner, a logo icon 182 appears in a window directly above a date/time identifier 183, which alternatively displays the current date and time.

In the center of the screen display shown in FIG. 18 is a graphical Active Key Display (AKD) 184 which indicates to the user those keys on the remote controller that are active for that particular mode of the program guide display system. For example, in the screen display of FIG. 18, the cursor can only move up, down or to the right. If the user were to depress the left direction arrow key on the remote controller at that point, the system would not carry out any function since the cursor can not move to the left. Thus, the left arrow key is not active so its image is not displayed on the AKD 184. Similarly, since the system will only respond to a depression of the up, down or right direction arrow keys and the ENTER key, they are the only key images displayed on the graphical AKD 184. The MODE key, though not displayed, is always active to change from one mode to another. When the user first enters the All Listings guide, the time listing begins by default at the half-hour immediately preceding the current time unless the current time is on the hour or half-hour, in which case the display begins with the particular hour or half-hour, and the channel listing begins at the last channel being viewed by the user before entering the MENU mode. For example, in FIG. 18, the current time is displayed as 7:13 p.m., the time listing begins at 7:00 p.m. and the channel listing begins with channel 4.

In the All Listings mode, a moveable highlighted cursor 185 is used to indicate the currently selected program to the user. The user manipulates cursor movement using the direction arrow keys on the remote controller 40. Furthermore, the entire information display pages upward if the cursor is placed at the bottom of the screen and the down direction arrow is depressed, and similarly pages to the left if the cursor is at the extreme right side of the display and the right direction arrow is depressed. In this way, the user can navigate through the entire program schedule.

Figure 19:
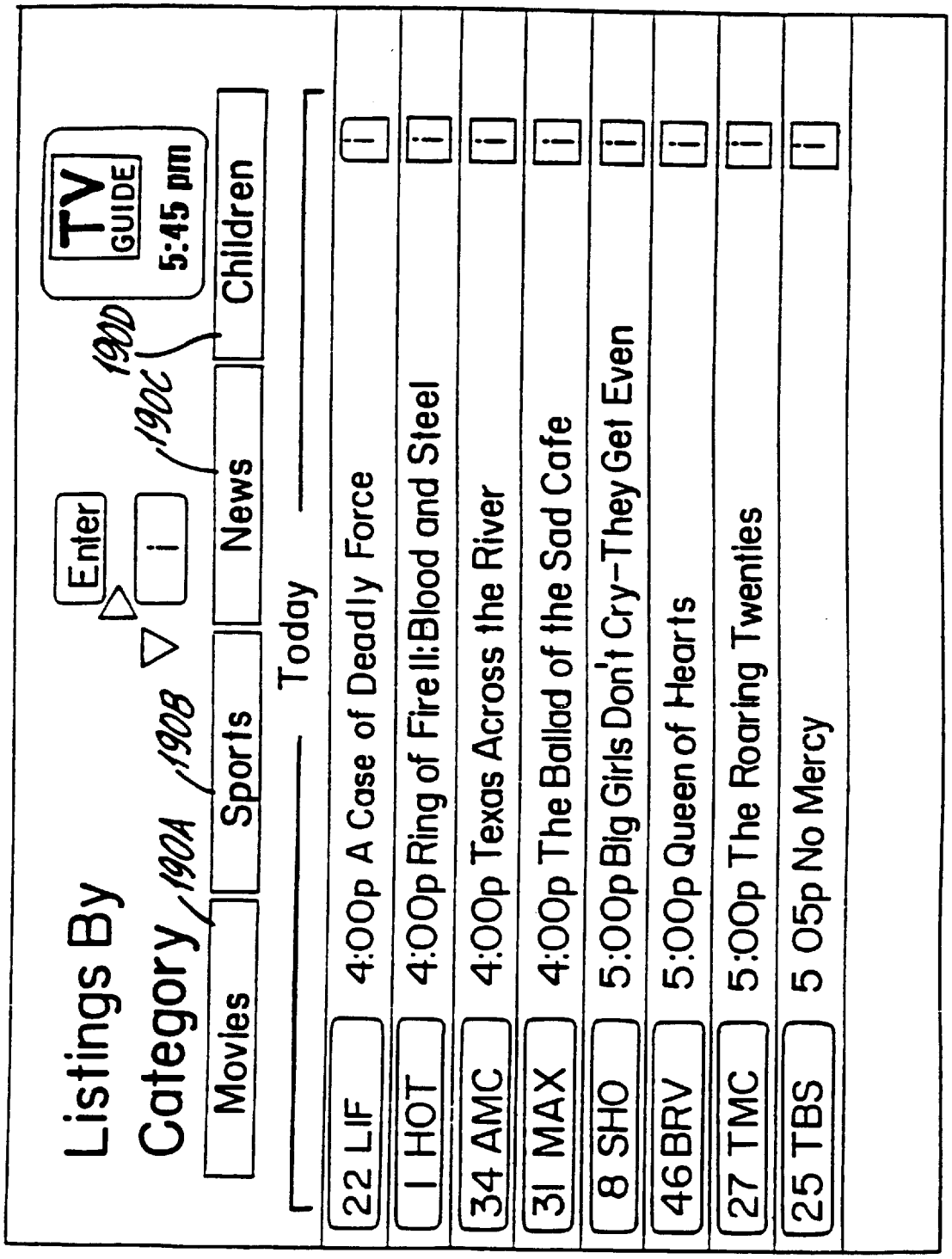
FIG. 19 shows schedule information displayed in a Listings By Category mode of operation of the preferred embodiment of the present invention.

The folder icon 65B immediately to the right of the All Listings icon in the top horizontal bar 61 of FIG. 6 identifies a "Category Listing" mode in which program schedule information is displayed and categorized by program content, as shown in FIG. 19. The particular listing shown in FIG. 19 includes the categories of Movies, Sports, News and Children 190A–190D. The database record stored for each listing contains a content-specific identifier so the microcontroller can search the database and categorize the information by content for purposes of displaying it in the Category Listing mode. As shown in FIG. 19, the user can manipulate the cursor left or right to highlight any one of the categories which appear at the head of the listing. In FIG. 19, the "Movies" category 190A is selected. As shown, the user is given a display of all movies, prioritized by time and then alphabetically by title of show, beginning with the half-hour immediately preceding the current time unless the current time is on the hour or half-hour, in which case the display begins with the particular hour or half-hour. The screen display shown in FIG. 19 also includes a textual description of the current operating mode of the program schedule system, as well as the graphic AKD 184, similar to that used in connection with the All Listings mode.

As with the All Listings mode, if the user highlights a show which is currently airing, he can immediately tune to that show by depressing the ENTER key on the remote controller 40. If the highlighted show is one that will appear at future time, the user is again given the option of setting a REMINDER message.

Figure 20:
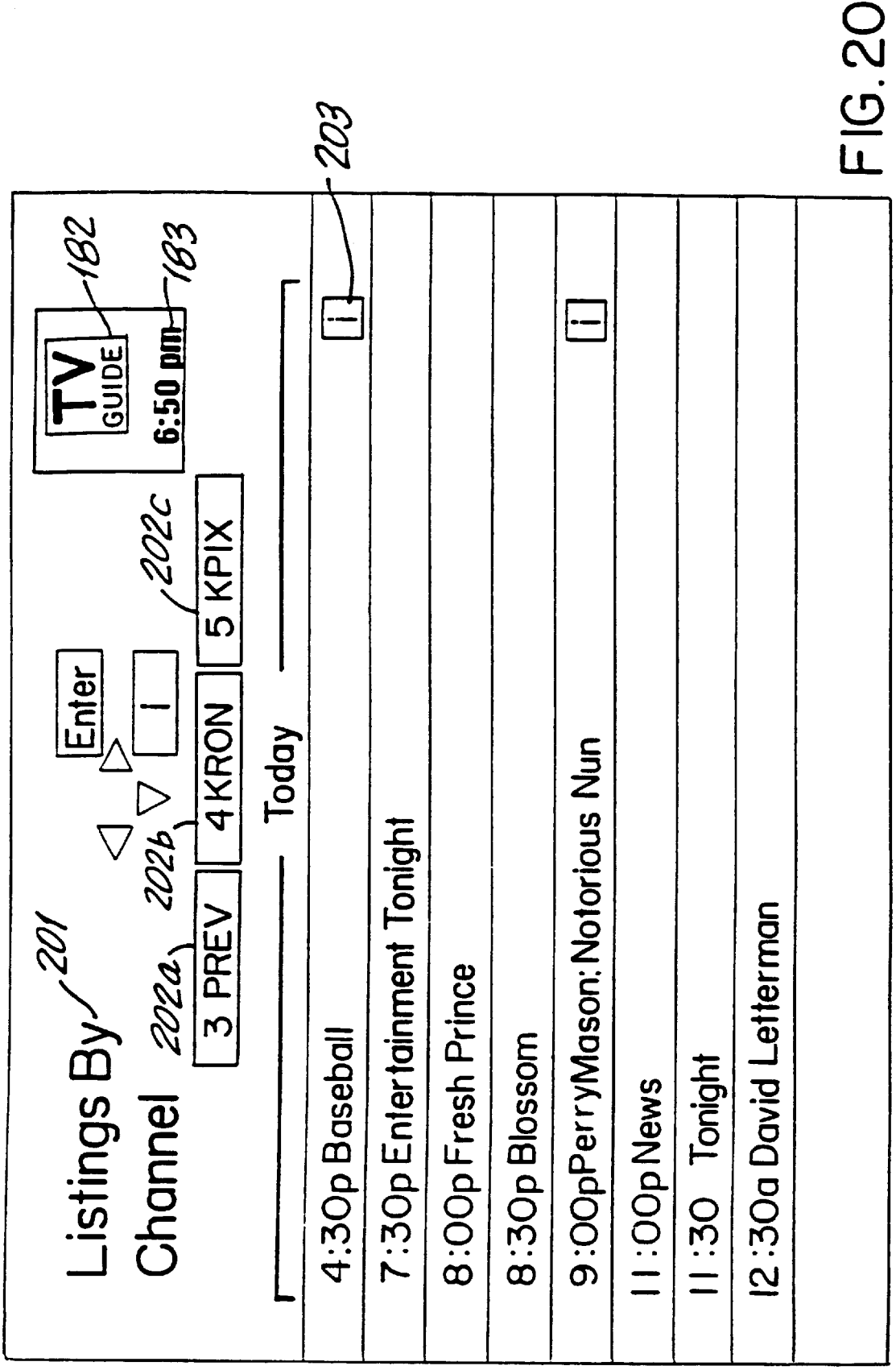
FIG. 20 shows schedule information displayed in a Listings By Channel mode of operation of the preferred embodiment of the present invention.

The triangular icon 65C at the far right of the TV GUIDE bar 61 in the display of FIG. 6 identifies a "Channel Listing" mode in which the program schedule information is categorized and displayed by channel, as shown in FIG. 20. The screen display shown in FIG. 20 again includes a textual mode identifier 201, the graphic AKD 184, and the window including the logo icon 182 and alternating time/date display 183. At the head of the program listing is a list of several consecutive channels 202A–202C beginning with the last channel viewed by the user before entering the Channel Listing mode. The channel in the middle window 202B is highlighted and is the channel for which schedule information is displayed. The display identifies those programs appearing on the highlighted channel beginning with the half-hour immediately preceding the current time unless the current time is on the hour or half-hour, in which case the display begins with the particular hour or half-hour. The user can display further future listings by manipulating the cursor to the bottom of the screen and paging the display, as previously described. The user can also change the selected channel by manipulating the left or right direction arrow keys on the remote controller 40. When the user issues a change-channel command in this manner, the next consecutive channel will be displayed in the highlighted window 202B in the channel string at the head of the display, and schedule information for the newly selected channel will be displayed on the television receiver 27.

As with other modes, if a user wishes to tune to a highlighted program that is currently airing, he can do so by simply depressing the ENTER key on the remote controller 40, and if the user wishes to view a program that airs at a future time, the user is again given the option of setting a REMINDER message.

Figure 21:
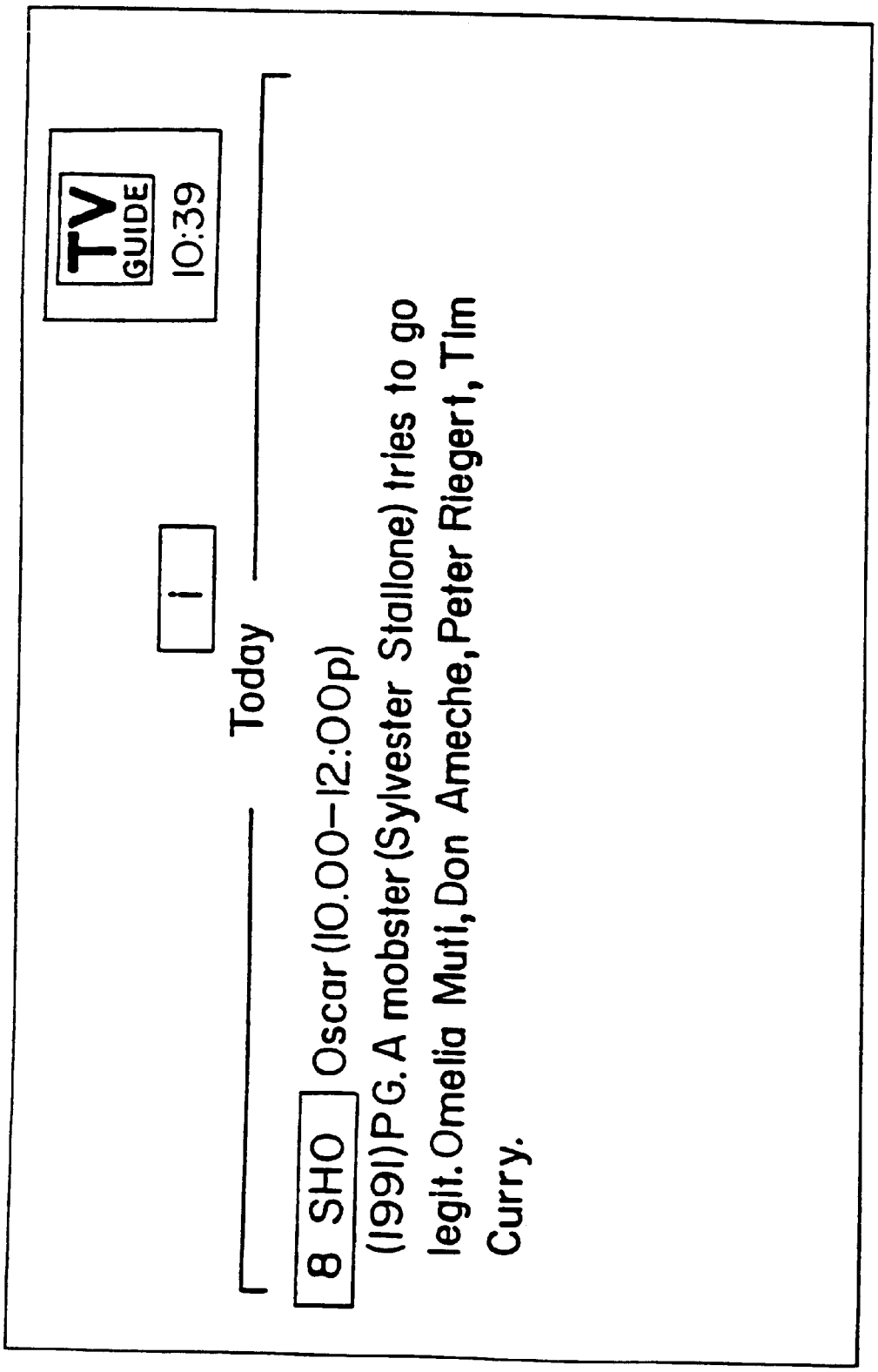
FIG. 21 shows information displayed in response to a user's request for supplemental programming information.

In each of the FLIP, BROWSE and MENU modes, a lower case "i" icon appears at a number of occasions in connection with certain program listings, such as movies, such as the "i" 203 shown in FIG. 20. Any time this icon appears, the user can view additional programming information, generally comprising a textual description of program content and/or other information related to the program, such as the names of cast members and the like, by depressing the "i" key 48 on the remote controller 40. An example of a display of such additional information is shown in FIG. 21.

Figure 22:
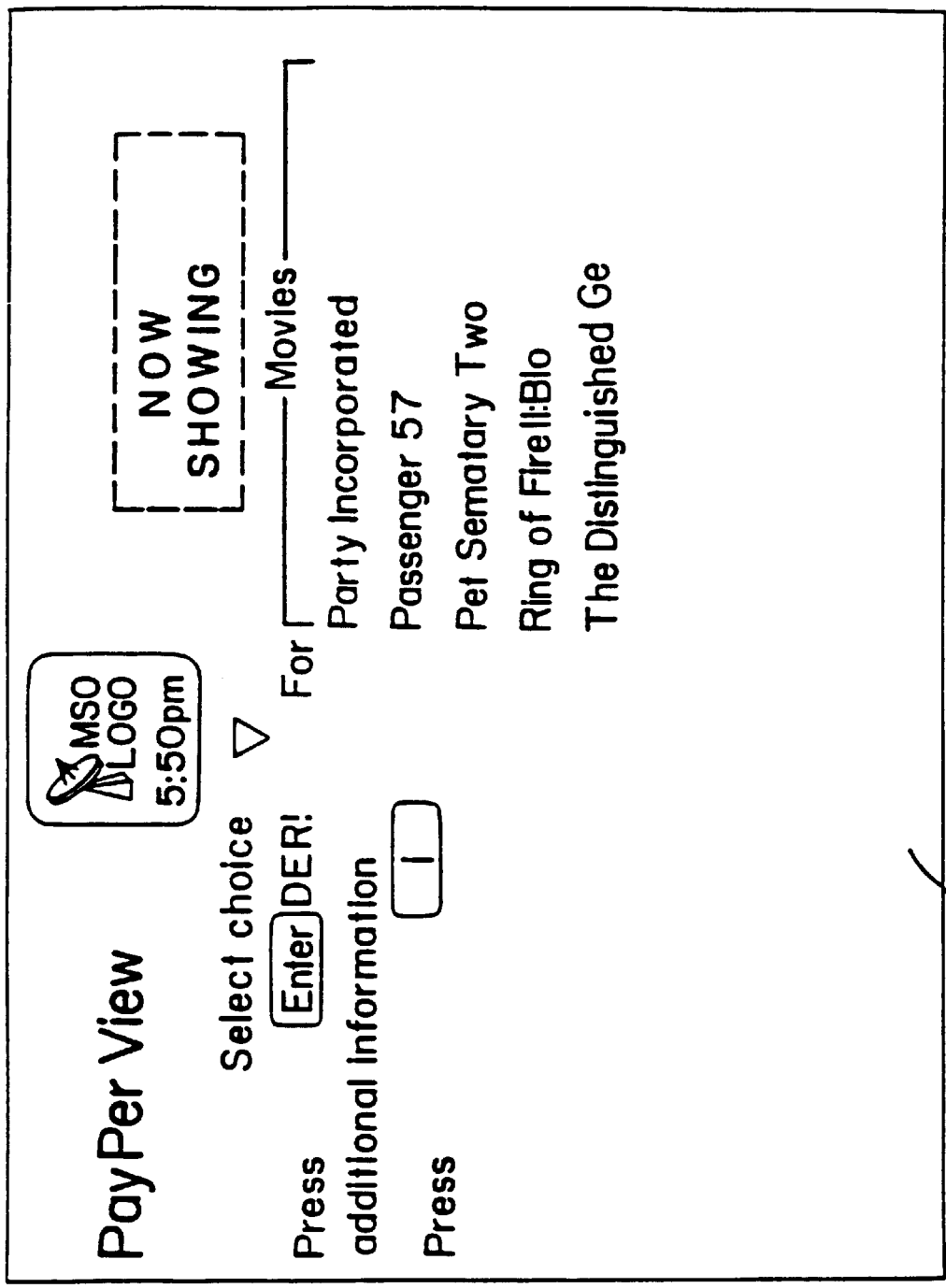
FIG. 22 shows programming, ordering and video promotional information displayed in a Pay-Per-View mode of operation of the preferred embodiment of the present invention.

The second horizontal bar 62 appearing on the screen in the MAIN MENU mode shown in FIG. 6 is the "Home Theater" Listing. It corresponds to Pay-Per-View events or services, specialized programming, and Premium Service programs. When this category is chosen by the user, the television receiver displays information as shown in FIG. 15. The first theater-ticket icon 150 that appears in this Home Theater bar identifies a format in which the Pay-Per-View events and premium services are displayed, as shown in FIG. 22. As with other modes, the user can manipulate the cursor to highlight and select any particular show. Also, the user can obtain additional information about the Pay-Per-View event or service by depressing the "i" key 48 on the remote controller 40. The Pay-Per-View menu screen display shown in FIG. 22 also includes a video display section 220 in which short promotional clips of current and future events and services can be shown to the user while the user is viewing the Pay-Per-View scheduling information. The display of FIG. 22 is bit mapped such that the advertising clips may be shown in the lower left quadrant of the screen. The clips may be shown randomly in the video display section 120 or, alternatively, the clip shown could correspond to the particular selected entry on the list of events, and would change automatically as the user navigated through the list.

Figure 23:
FIG. 23 shows an ordering submenu used in conjunction with the mode of operation shown in FIG. 22.
Figure 24:
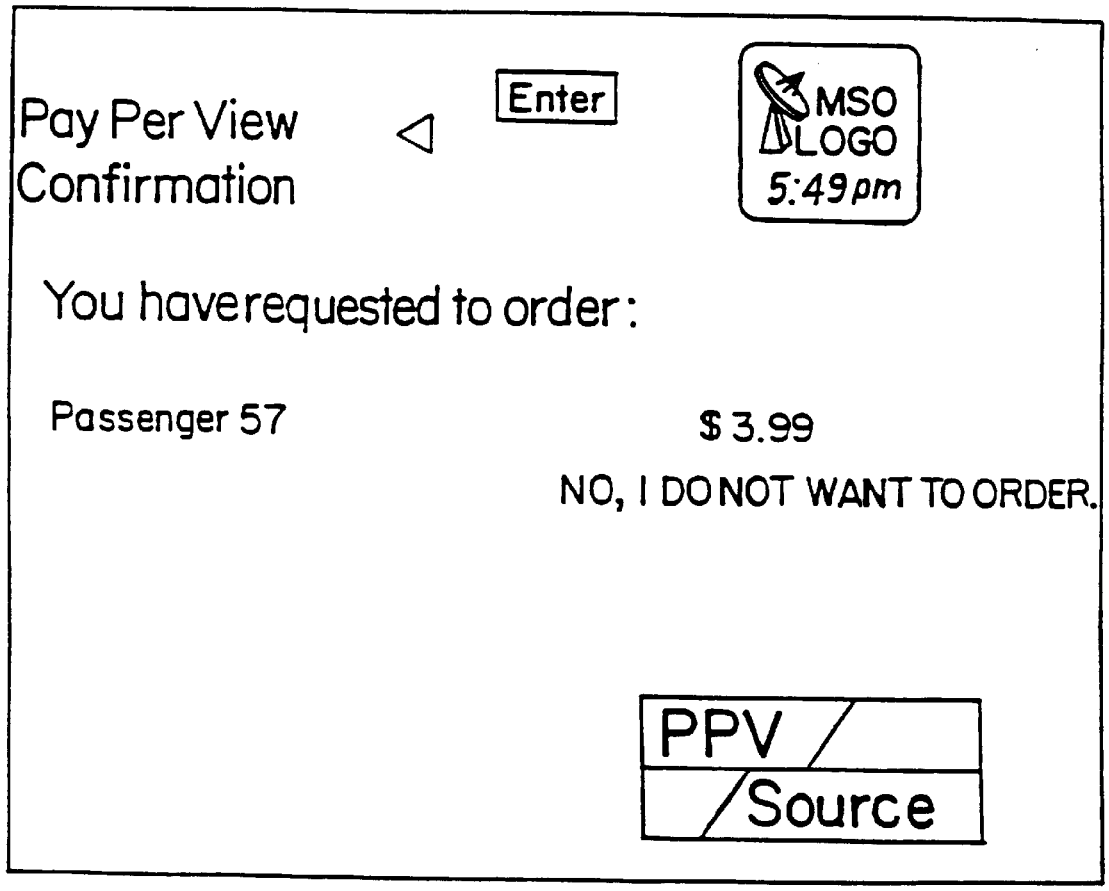
FIG. 24 shows yet another ordering submenu used in conjunction with the mode of operation shown in FIG. 22.
Figure 24A:
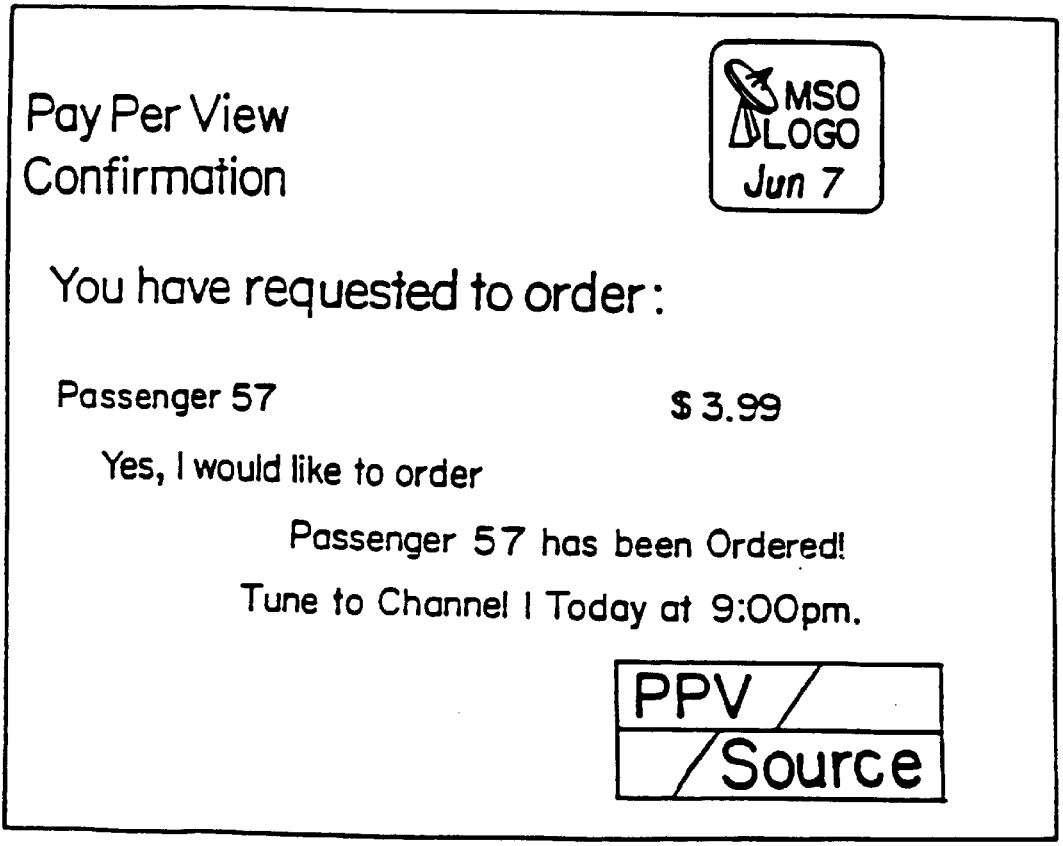
FIG. 24A shows yet another ordering submenu used in conjunction with the mode of operation shown in FIG. 22.

When a user highlights a Pay-Per-View event or service by manipulating the cursor to the desired event or service using the direction arrow keys on the remote controller 40, he can order the event or service by depressing the ENTER button on the remote controller, thus linking schedule, promotional and ordering functions. If the user selects a particular Pay-Per-View event or service in this manner, the programming schedule system will next present to the user a Pay-Per-View ordering screen such as that shown in FIG. 23. The display includes a figure representing the cost of the event or service. The display also asks the user to choose from among a plurality of scheduled airing times 230A–230C, as well as whether the user would like to see a REMINDER message prior to the start of the Pay-Per-View event or service. The user responds to these inquiries by using the direction keys on the remote controller 40 to manipulate the cursor to the proper response and then depressing the ENTER key. After the user has ordered a Pay-Per-View event or service, the program schedule system will present the user with two ordering confirmation submenus, such as shown in FIGS. 24 and 24A. In either of these submenus, the user can confirm or cancel the Pay-Per-View event or service.

If the user confirms the order, the microcontroller 16 stores the Pay-Per-View ordering information in a location in memory. The ordering information can then be transmitted to the cable operator by the microcontroller 16 either by phone line or on the cable line where the system has two-way communication or other such interactive capability. Alternatively, a computer at the cable operator location can interrogate the memory where the microcontroller stored the Pay-Per-View ordering information. At the appropriate time, the cable operator supplies the Pay-Per-View event or service and it is received by all users who have ordered the program.

The second icon 151 in the Pay-Per-View bar of FIG. 15 identifies a specialized broadcast, cable or satellite programming service to which the user has access via the electronic program guide. In this mode, the electronic program guide application software acts to connect the user, through an appropriate data transmission link, to the programming service, at which point the user interacts with the service. Alternatively, the electronic program guide provides the navigation software, including the menus and scheduling information, for the particular programming service. Such a service could be, for example, Your Choice TV ("YCTV"), a service offering reruns of highly rated broadcast and cable programs, in which case the icon may take a form suitable to identify YCTV. The programming available on YCTV is then supplied to the user via the programming guide system.

Figure 26:
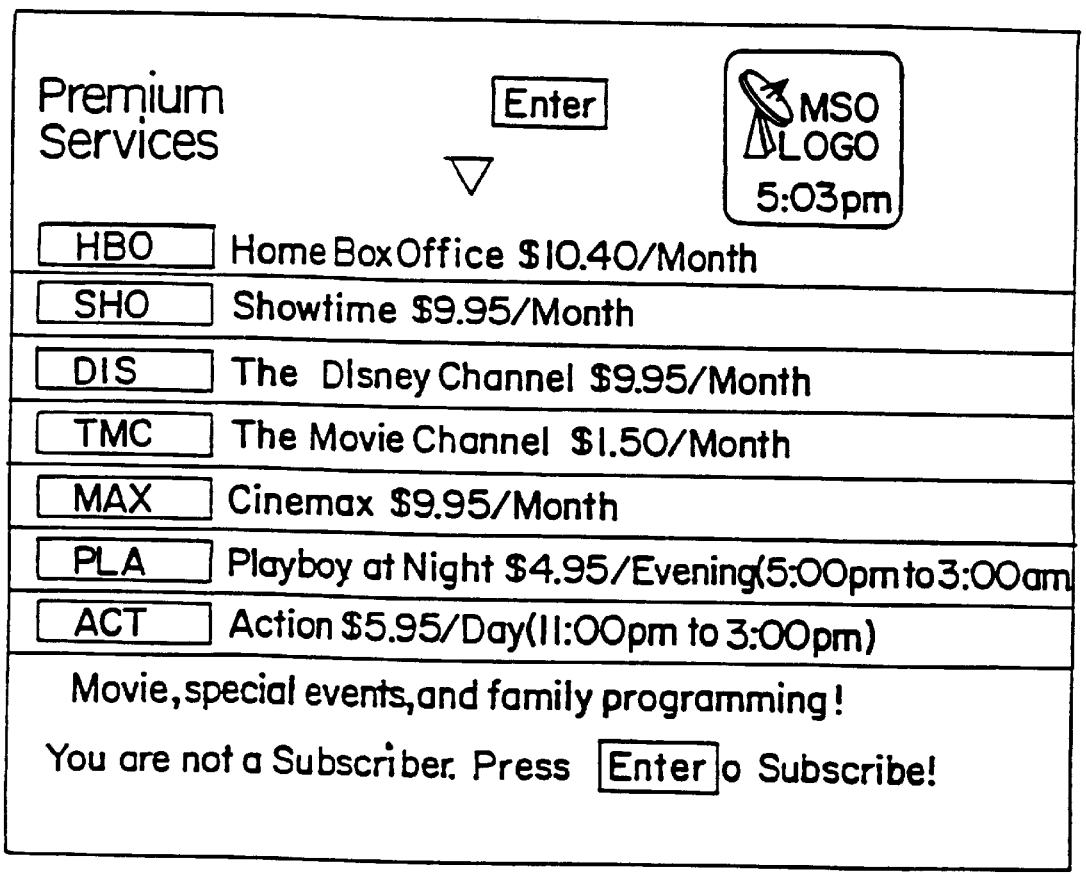
FIG. 26 shows a Premium Services submenu that appears in one mode of operation of the preferred embodiment of the present invention.

The last icon 152 appearing in the Pay-Per-View bar of FIG. 15 identifies a display format which lists all Premium Services offered by the cable operator, as shown in FIG. 26. In this mode, the user can select for impulse ordering any one of the premium services by manipulating the cursor using the direction arrow keys on the remote controller and depressing the ENTER key. Similar to Pay-Per-View ordering, the system will present the user with a series of ordering displays and, if a service is ordered by the user, it will confirm the user's request using another other submenu. If confirmed, the microcontroller 16 will store the ordering information or transmit it directly to the cable operator. Once the order has been confirmed, the microcontroller can immediately allow the user access to the ordered premium service. In this manner, the user can order premium events or services on demand.

If, during FLIP or BROWSE modes, a user views a channel or schedule information for a service not subscribed to by the user, the microcontroller 16 causes an ordering submenu to appear instead of displaying a program signal along with the graphic overlay, as shown in FIG. 9. This submenu indicates to the user that she does not currently subscribe to the selected service, and then asks the user if she would like to order the service. If the user responds affirmatively, the program schedule system takes the user to the ordering submenu discussed above. In this manner, the user can order premium events or services on impulse.

Figure 27:
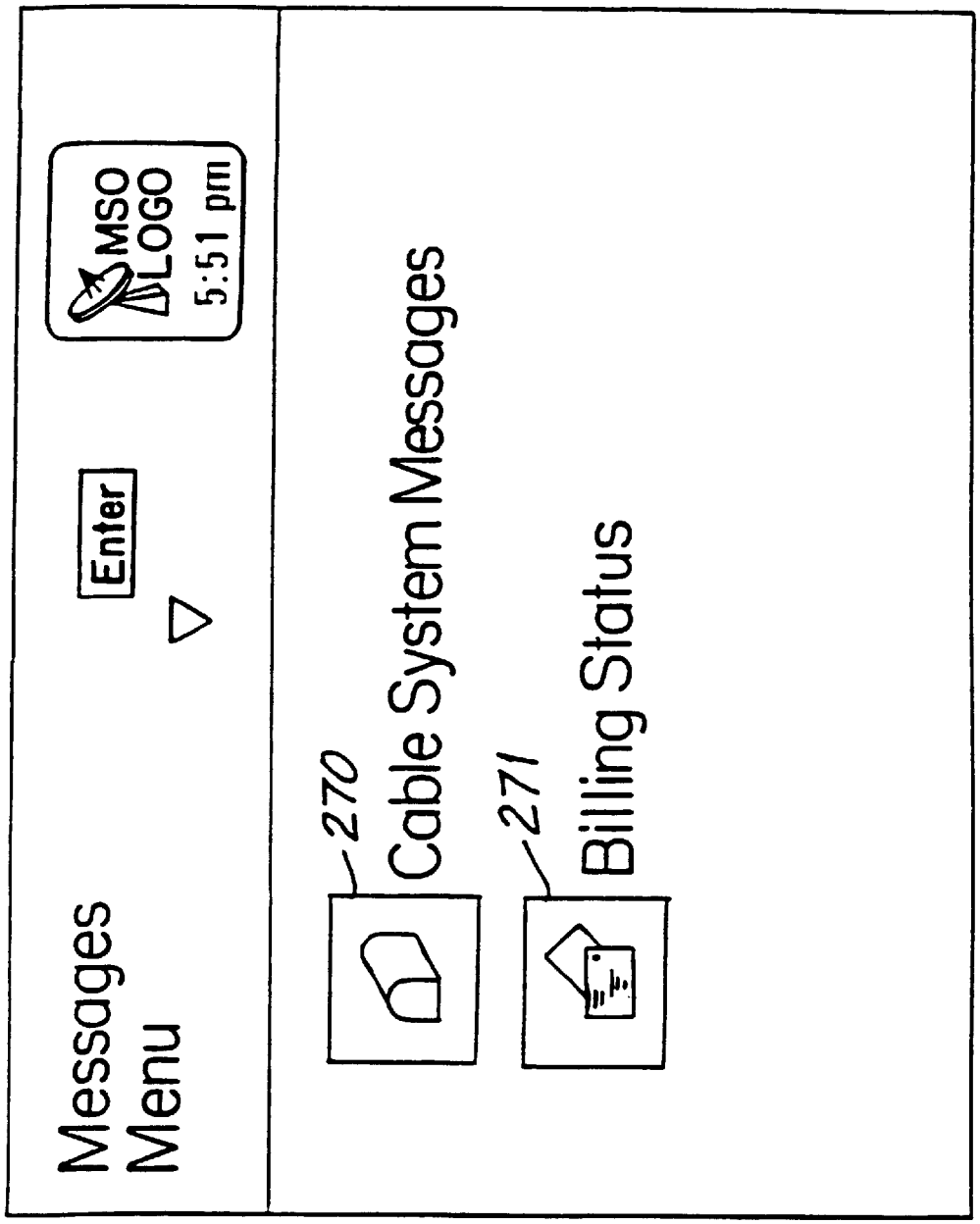
FIG. 27 shows a Messages menu that appears in one mode of operation of the preferred embodiment of the present invention.
Figure 28:
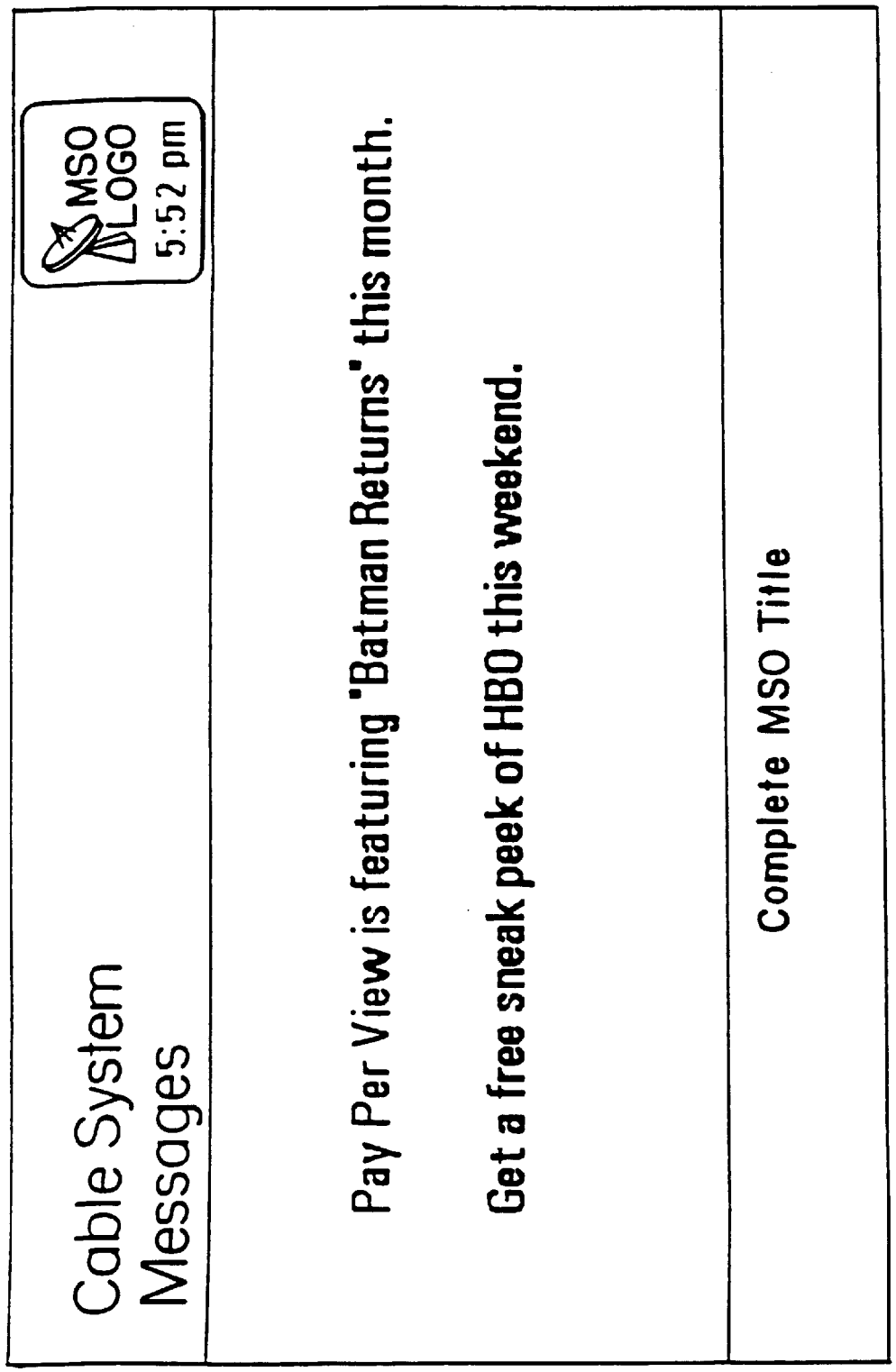
FIG. 28 shows exemplary messages used in connection with the menu of FIG. 27.
Figure 28A:
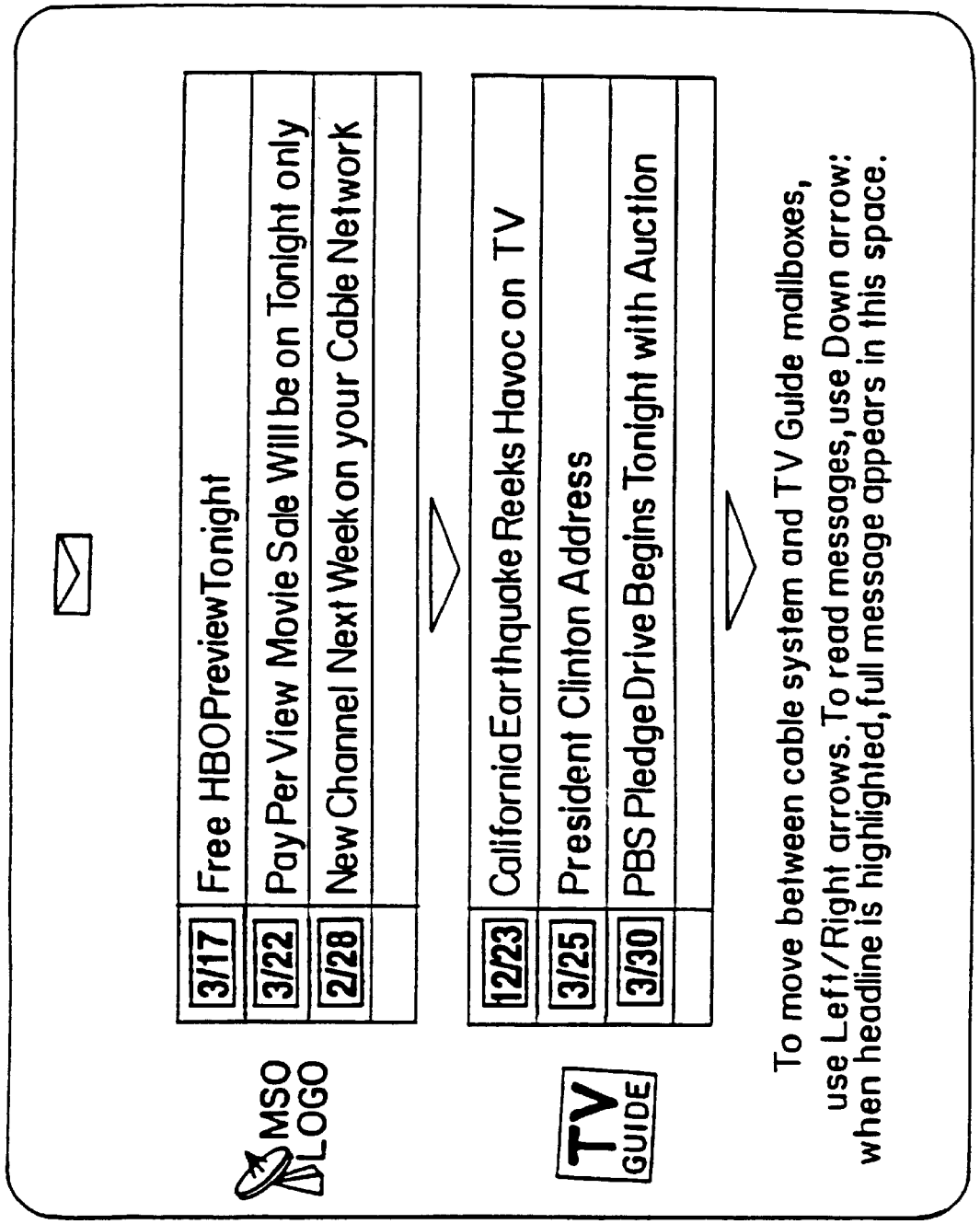
Figure 29:
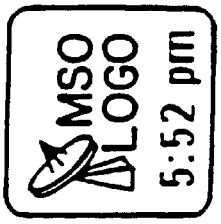
FIG. 29 shows billing information used in connection with the menu of FIG. 27.

The third horizontal bar 63 in the MENU mode shown in FIG. 6 is the "Messages" or "Customer Service" listing. As shown in FIG. 16, the first envelope icon 160 represents message information available from the cable operator. When the user selects the message icon, he is presented with a screen display of currently available messages, as shown in FIG. 27. The display shown in FIG. 27 includes cable system messages 270 and billing information 271. If the user selects the cable system messages option 270, she is presented with a message pertaining to the local cable operator, such as that shown in FIG. 28. If the user selects the billing status option 271 shown in FIG. 27, she is presented with a display of current billing information, such as that shown in FIG. 29.

The next icon 161 in the Customer Service information bar 63 of FIG. 16 identifies a "Viewer Preference" mode, which allows the user to create or revise a number of program schedule system operating parameters. Once selected, this display presents the user with several preference options concerning certain operating parameters of the program schedule system, as well as the viewing of certain channels and/or certain content-specific programming, for example, those shown in FIG. 7.

Figure 7:
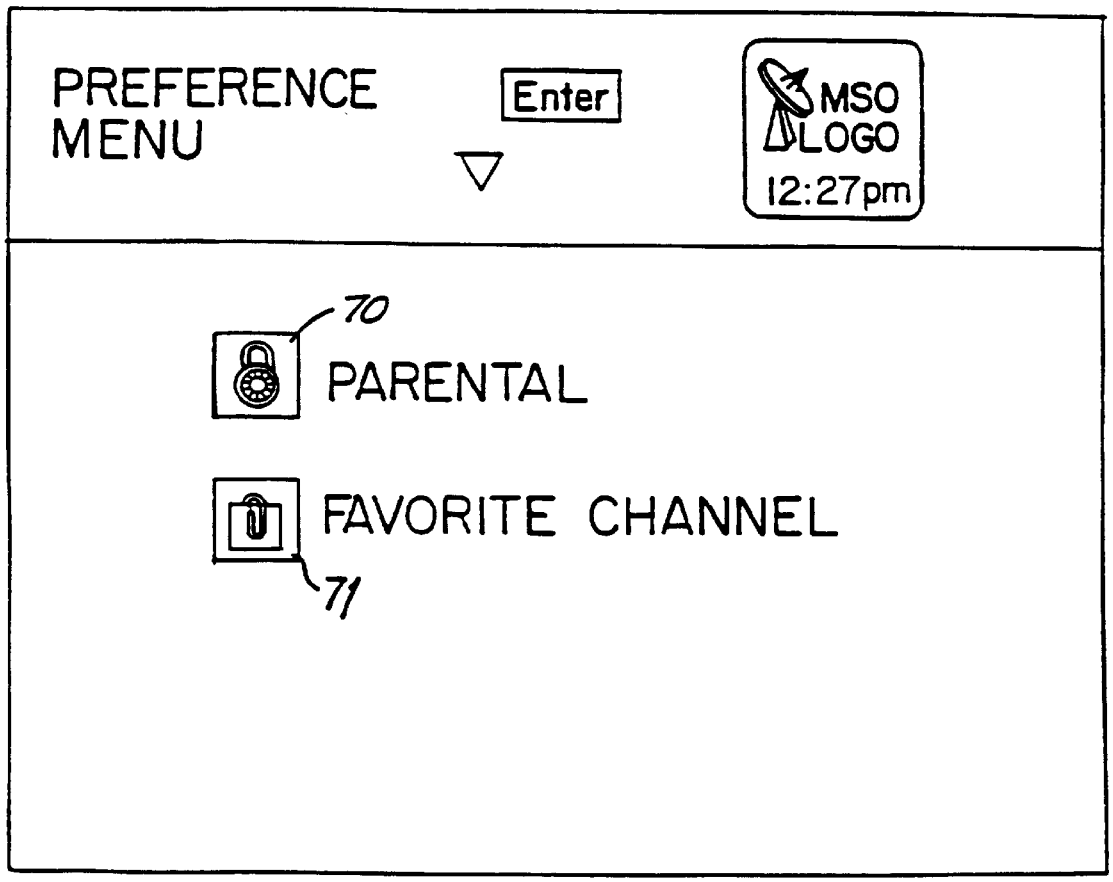
FIG. 7 depicts a Viewer Preference Menu that appears on a television screen in one aspect of the preferred embodiment of the present invention.

The first option shown in FIG. 7 is the "Parental" option 70, which can also be expressed as a "Key Lock Access" option. Once this option is initially selected by the user, the system displays a "Key Lock Access" submenu such as that shown in FIG. 30.

Figure 30:
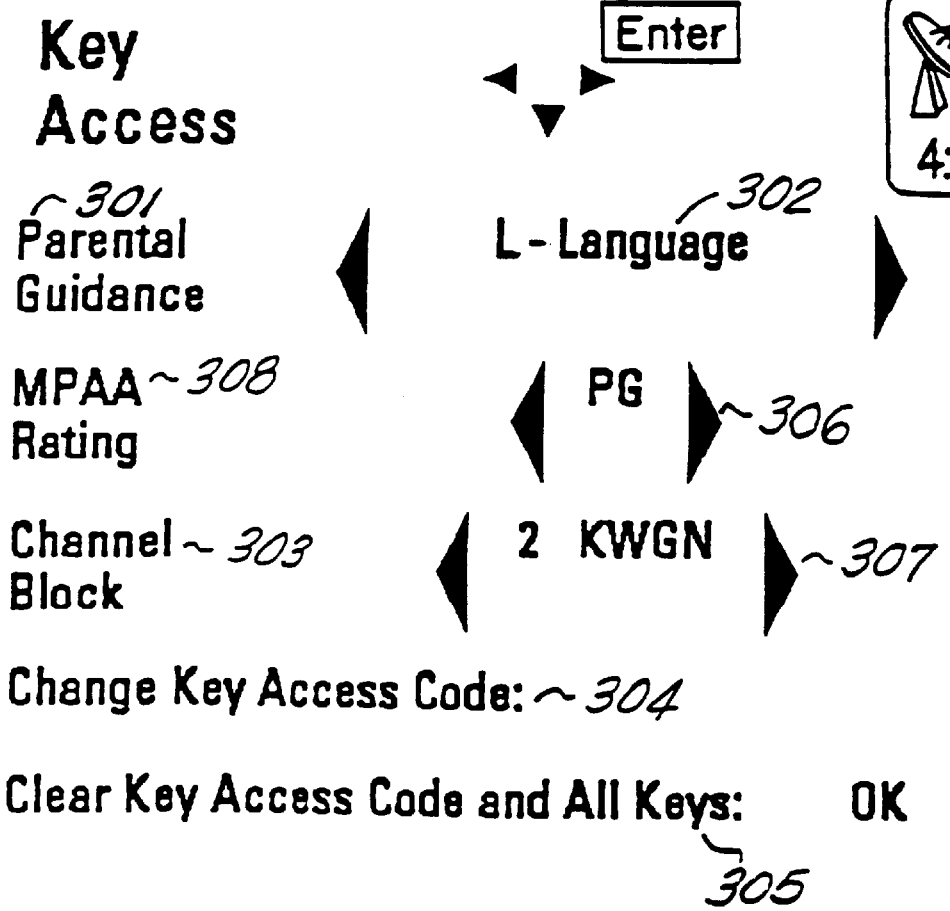
FIG. 30 shows a Key Lock Access menu that appears during one mode of operation of the preferred embodiment of the present invention.

The Key Lock Access menu shown in FIG. 30 allows the user to control access to individual channels and programs or events by requiring the user to enter an access code "key," consisting of a user-specified four digit code in the specific embodiment discussed herein, before ordering or viewing these pre-selected channels, programs or events. The menu display shown in FIG. 30 shows a series of subject categories that are entries in the vertical y-axis selectable by the user. A particular subject category is chosen by using the up or down direction arrow keys on the remote controller 40 to highlight the desired entry. Once the user selects a particular subject category, the left and right arrow keys are used to navigate within the chosen category.

The first subject entry shown in FIG. 30 is the "Parental Guidance" category 301. Once the user selects this category by manipulating the cursor to highlight the entry, the cursor can be then moved horizontally to an active window 302 which displays and selects one the five letter rating items in the category. The letter items represent ratings of program content as follows: "V" for violence, "N" for nudity, "L" for language, "AS" for adult situations and "PD" for parental discretion. Once the user selects a particular item, such as "L", by moving to the active window 302 using the right direction arrow key, depressing the ENTER key will indicate to the microcontroller 16 that a key lock access has been selected for programs rated with a "L" rating for violent or explicit language. The system indicates activation of a key lock access by displaying a key icon directly below the "L" category display. Once a key lock access is set, it can be deactivated by selecting the category letter and then depressing the ENTER key. This action causes the key icon to disappear. The user can change the rating category in the active window 302 by using the left or right direction arrow keys on the remote controller 40, images of which are displayed on the screen adjacent the active window as a reminder to the user. In this manner, the user can select other rating categories for setting a key lock access for any of the program content identifiers appearing in the Parental Guidance category.

The key lock access code itself consists of a four digit code, which the user can enter and modify at any time. To do so, the user highlights the fourth vertically selectable entry "Change Key Lock Access Code," 304 by manipulating the cursor to highlight it using the direction arrow keys on the remote controller. Once highlighted, the user enters a new four digit code or revises the then existing code and depresses the ENTER key. The microcontroller 16 then identifies the new four digit key lock access code and stores it in memory. The user can clear the key lock access code, as well as all other previously activated keys, by moving to the last entry in FIG. 30, "Clear Key Lock Access Code and All Keys," 305 which highlights the "OK" window, and then depressing the ENTER key. This action clears and deactivates all previously set keys, as well as the key lock access code.

The schedule information database record for each program contains a field that corresponds to the program content identifiers in the Parental Guidance category. During operation, the microcontroller checks this field in response to a user command to tune to or order a program, or to display its corresponding schedule information before carrying out the tuning, ordering or displaying function. If the parental guide identifier in the program schedule information database record matches any one of the activated parental guidance identifiers shown in FIG. 30, the user will be prompted to enter the four digit key lock access code before the system takes any further action. If the entered code matches the key lock access code previously entered and stored by the user as described above, the system will carry out the user request to tune to the program, to order it, or to display its corresponding schedule information. If the code is not recognized by the system, no further action will be taken and the user's request will be denied.

By manipulating the cursor using the direction arrow keys to highlight the second entry, "MPAA ratings," 308 the user can also set a key lock access for programs based on their MPAA rating code, as also shown in FIG. 30.

As with the Parental Guidance category, once the MPAA rating category has been selected, the user can move horizontally within the category to the active window 306 to select one the five rating codes, i.e., "G" for general audiences, "PG" for parental guidance, "PG-13" for suggested parental guidance, no one under 13 admitted without an adult, "R" for restricted and "X" for x-rated. As with the Parental Guidance category, by selecting a particular rating—by using the left or right direction arrow keys until the particular rating code appears in the active window—and then depressing the ENTER key, the user sets a key lock access for the rating, in which case a key icon appears below the rating code. And, as with the Parental Guidance category, once a key lock access is set, the system will prompt the user to enter the four digit key lock access code anytime a request is made to tune to, order or display schedule information for a particular program having a rating code which matches a rating code for which key lock access has been activated.

The Key Lock Access mode also includes a subject category 303 for controlling access to channels, which may be entitled, for example, "Channel Block" or "Channel Lock." As with the Parental Guidance 301 and MPAA 308 categories, the user navigates to the Channel Block category 303 by manipulating the cursor using the direction arrow keys on the remote controller and depressing the ENTER key. Once the Channel Block category 303 has been entered, the user can move horizontally to an active window 307, which in FIG. 30 indicates channel 2. Once the user highlights this window by manipulating the cursor using the direction arrow keys on the remote controller 40, a key lock access can be set for the channel appearing in the active window. This is done, as with the other subject categories in the Key Lock Access mode, by depressing the ENTER key, which again causes a key icon to appear below the channel number in the active window. The user can move to the prior channel or to the next channel in sequence by depressing either the left or right direction arrow key on the remote controller 40. In this manner, the user can activate a key lock access for any available channel.

As with the Parental Guidance 301 and MPAA 308 categories, once a key lock access is set for a particular channel, the system will prompt the user to input the key lock access code prior to carrying out an instruction to tune to or order that channel. If the input key lock access code matches the previously stored access code, the user's instruction is carried out. Otherwise, the user's instruction is ignored. Thus, the user can control access to the audio and video program content of any available channel. In this instance, the microcontroller 16 will not allow audio or video program signals to pass to the VDG, but it will allow schedule information to appear for the channel.

The next option shown in FIG. 7 is the Channel Preference or "Favorite Channel" list option 71. By highlighting this icon and depressing the ENTER key on the remote controller 40, the user is presented with a submenu on the screen such as that shown in FIG. 8.

In normal operation, the program guide system presents channels to the user in numerical order in response to an up or down change-channel command issued by the user using one of the direction arrow keys on the remote controller. The channel number presentation sequence includes all channels offered by the cable company in the order of which they are modulated onto the channel by the operator.

The program guide system also provides the capability of selecting from among several user-defined channel presentation sequences, which are activated using one of the three "check mark" icon keys 48A, 48B or 48C on the remote controller 40 shown in FIG. 4. Each of these keys represents a preferred particular list of channels which a particular user selects and which the microcontroller stores in memory as a "Channel Preference" list, as discussed in detail below. To activate one of these preferred channel lists, the user depresses the corresponding check-mark icon key, in which case the microcontroller may display the chosen icon on the screen in the graphic overlays and full screen displays to remind the user that a particular channel preference list is being used by the system. Once a preference list is activated, the system will limit the tuning of the television receiver and the display of schedule information only to those channels that are designated in the activated viewer preference list.

To revise the content and/or sequential order of the channels in the Channel Preference list, the user enters the MENU mode of the programming guide system. To enter the MENU mode from the FLIP mode, the user twice depresses the MODE key 38 when using the remote controller 31 of FIG. 3. To enter the MENU mode when using the alternative embodiment of the remote controller 40 of FIG. 4, the user simply depresses the MENU icon key 47B.

When first entered, the MENU mode has a screen display such as shown in FIG. 6. To select the submenu for editing the Channel Preference list, the user first selects the third horizontal bar 63, which can be titled, for example, "Messages" or "Customer Service," by manipulating the cursor using the down direction arrow key, as shown in FIG. 7. The screen of FIG. 6A is thereby displayed. The user then selects the second icon 161 appearing in that bar, indicated with a check mark, which corresponds to a "Viewer Preference" mode, by highlighting the icon using the direction arrow keys and again depressing the ENTER key. This action will cause the microcontroller 16 to display a Viewer Preference submenu such as that shown in FIG. 7. By selecting the Channel Preference or "Favorite Channel" entry 71, the user enters the Channel Preference submenu, shown in FIG. 8. If the user has not already done so, he would then depress the particular check-mark icon key on the remote controller 40 of FIG. 4 to create or revise the particular channel preference list.

Figure 8:
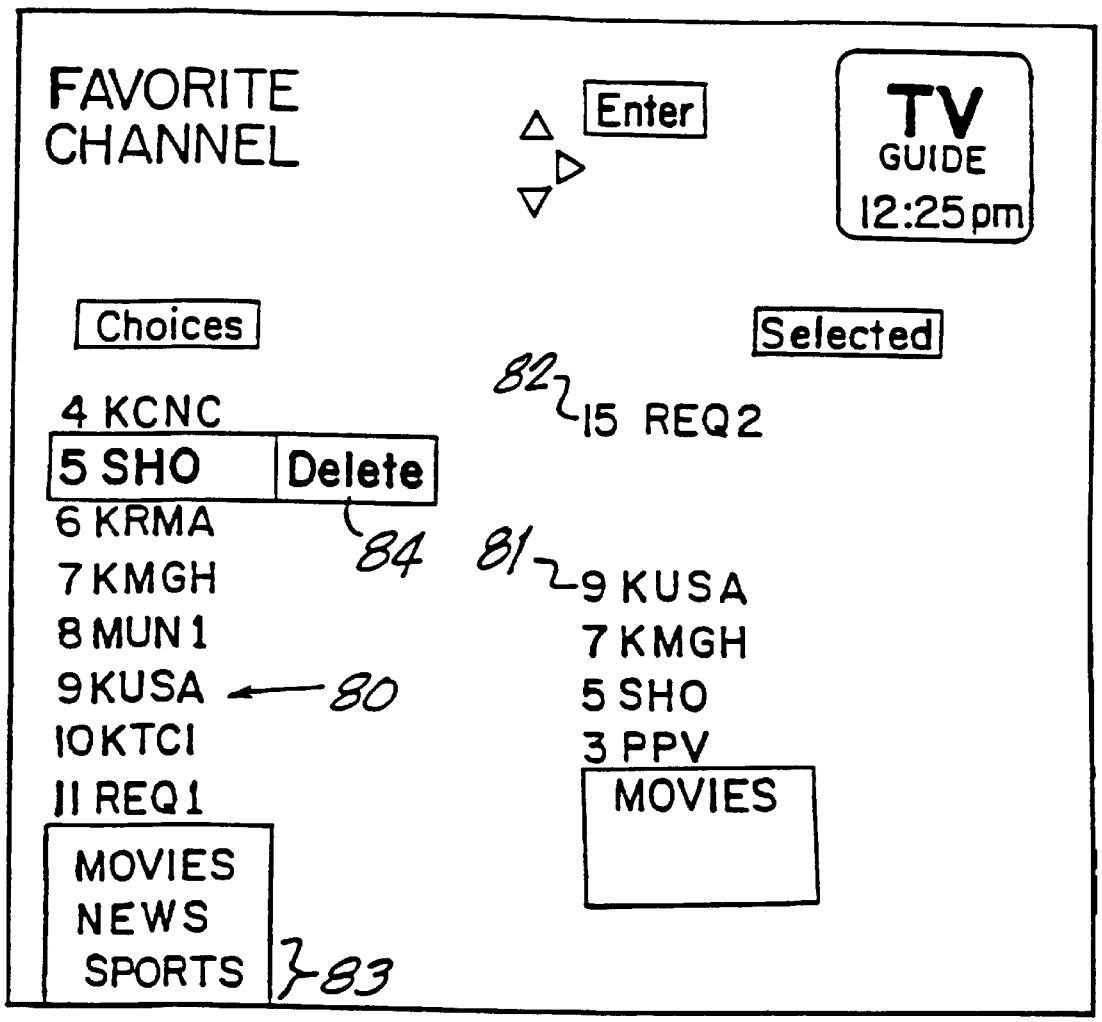
FIG. 8 shows a Preferred Channel selection submenu.
Figure 10:
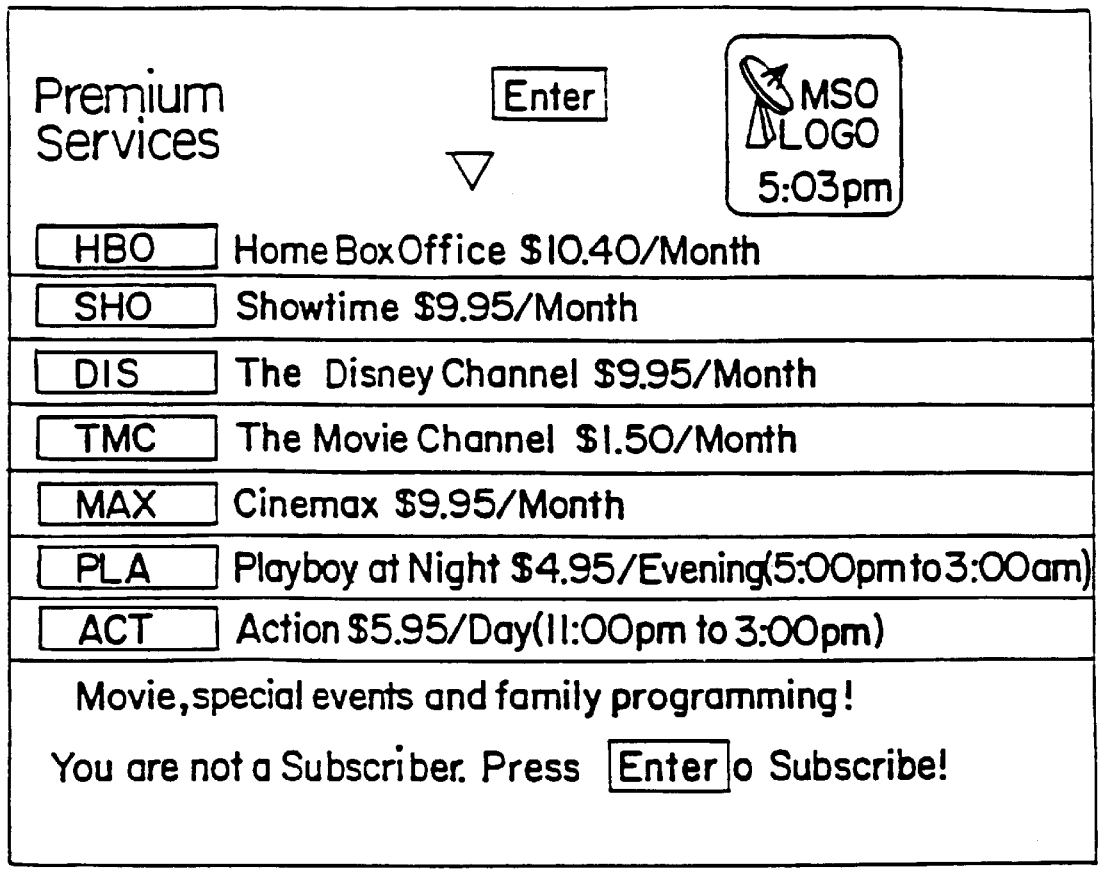
FIG. 10 shows a Premium Services submenu that appears in one mode of operation of the preferred embodiment of the present invention.

In the Channel Preference menu shown in FIG. 8, a list 80 of all channels available on the particular cable system is displayed on the left side of the television receiver screen, labeled "Choices" in FIG. 8, and the viewer's preferred list 81, designated "Selected" in FIG. 8, is displayed on the right side. If a particular code, such as an END or "1" symbol appears in the first (uppermost) position 82 of the viewer preference list 81, the system displays information for all channels in numerical order in all modes of operation. This is the default mode of the system.

By selecting channels in sequence from the available list 80 and placing them in the desired order in the preference list 81, the user can select a subset of channels and/or rearrange the default sequence in response to a channel up or channel down command from the user. This is accomplished by highlighting a channel in the available list 80 using the up and down direction arrow keys on the remote controller 40 and depressing the ENTER key 44, which stores the entry temporarily in a buffer.

The microcontroller 16 stores a list of all channels previously entered in the viewer preference list 81. As a particular channel is highlighted by the user when navigating through the available channel list 80 displayed on the left side of the television screen, a window 84 appears adjacent to the particular channel highlighted by the user. If the particular channel already appears in the viewer preference list 81, the system displays a "DELETE" message in the window 84 as a reminder that the channel was previously selected from the available channel list 80 and can only be deleted from the list 81, which is accomplished by depressing the ENTER key 44. If the particular highlighted channel in the list 80 was not previously selected, the system displays a "SELECT" message in the window 84 as a reminder that the particular channel will be selected for addition to the viewer preference list 81 if the user depresses the ENTER key 44. The microcontroller 16 inserts a selected channel at the bottom of the list 81. In this manner, the user can select or delete channels from the viewer preference list in any desired order.

The available channel list 80 may also be provided with categorical entries 83, such as movies, news, sports or children's shows. The user may also highlight any of these entries and put them into the viewer preference list 81. If the user does include a category in his viewer preference list 81, when the user issues channel up or down commands, the system will display, in sequence, first the user's selected preferred channels in numerical order and then all channels having a program whose content corresponds to the selected category or categories at the time.

Once the user has revised the channel preference list 81 in the described manner, the microcontroller 16 will follow the stored user-specified channel sequence in response to a change-channel command made by the user employing one of the direction arrow keys. To activate the viewer preference list, the user depresses one of the three check-mark icon keys 48A, 48B or 48C on the top of the remote controller shown in FIG. 4. The viewer preference list can be used to selectively limit tuning of the television receiver or display of schedule information in any of the operating modes of the electronic program guide. In the present embodiment, once a preference list is activated, the system will limit the tuning of the television receiver and the display of schedule information in the FLIP, and BROWSE modes, as well as in the grid category and channel listings in the MENU mode, only to those channels designated in the activated viewer preference list. The tuner can not be tuned to, and no corresponding schedule information can be displayed for, any channel not entered in the viewer preference list when it is activated. In this regard, it should be noted that setting a key lock access in the Parental Guidance 301, MPAA 308 or Channel Block 303 categories produces a different result than when using other display criteria, such as the Channel Preference List of preferred channels discussed above. Thus, while a key lock access will prevent audio and video program information, but not schedule information, from being displayed or ordered absent entry of an authorization code, if a particular channel is included in the Channel Preference list and also has a key lock access activated in the Channel Block category 303 of the Key Lock Access mode, that channel or its corresponding schedule information will not be displayed at any time.

To deactivate a previously selected viewer preference list, the user toggles the appropriate check-mark icon key on the remote controller 40 of FIG. 4. Once deactivated, the system defaults to displaying and tuning all available channels, as well as displaying schedule information for all available channels.

Alternatively, the viewer preference list 81, if activated, can be used to control tuning and display of schedule information only in selected modes, such as only in the FLIP mode, thus allowing the user to tune and view corresponding schedule information only for those channels entered in the preference list 81 in the FLIP mode, while viewing all channels and corresponding schedule information in all other modes.

In this latter configuration, as well as in the instance where no channel preference list is activated and the system is in default mode, if a channel appears in the viewer preference list 81 that corresponds to a service not subscribed to by the user, the microcontroller 16 causes an ordering submenu to appear instead of displaying a program signal along with the graphic overlay, as shown in FIG. 9. This submenu indicates to the user that he does not currently subscribe to the selected service, and then asks the user if he would like to order the service. If the user responds affirmatively, the program schedule system takes the user to another ordering submenu to confirm the user's request, as with impulse ordering.

In addition to Channel Preference keys, the remote controller 40 can also be supplied with a number of user-activated category preference icon keys, e.g., movies, sports, or children's programming. The system can be adapted to present to the user only those programs meeting particular preference category when it is activated by the user. As with the Channel Preference icons, the microcontroller may display the icon corresponding to the activated preference category to remind the user of the currently activated mode of system operation.

The question mark icon 162 at the far right of the third horizontal bar in the menu of FIG. 16 identifies a program guide system "Help" mode in which information explaining the operation of the system is displayed for the user. Again, by manipulating the cursor using the appropriate keys on the remote controller, the user can select this mode. Once selected, the next submenu appearing in the Help mode asks the user to identify the particular portion of the system about which the user would like to view Help information.

The icons appearing in the last horizontal bar of the MENU mode identify certain interactive and/or other types of information services which the programming system, acting as a gateway, makes available to the user as shown in FIG. 17. By manipulating the cursor, the user can select any one of the identified services, as shown in FIGS. 31–35.

Figure 31:
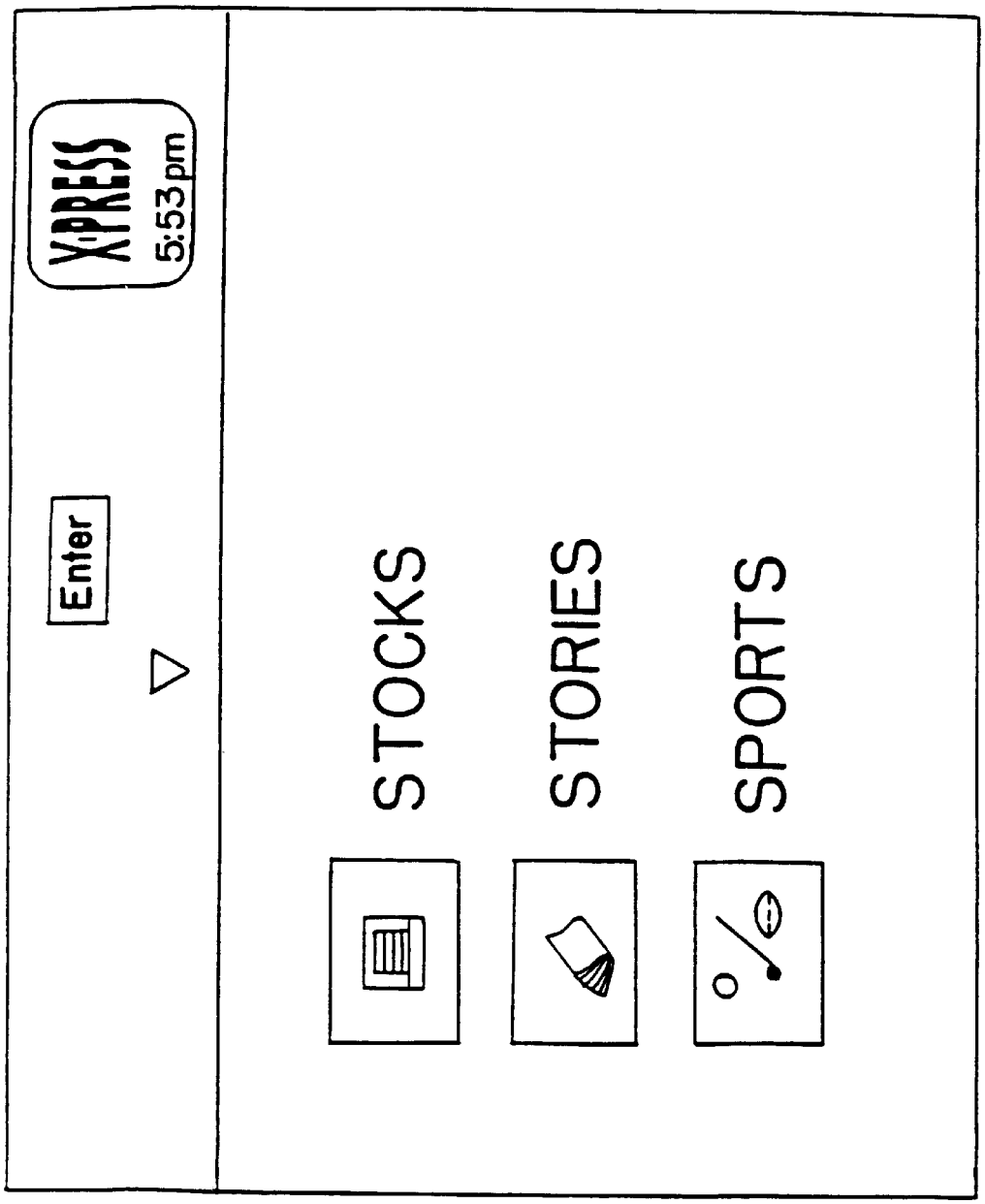
FIG. 31 shows a menu appearing in connection with an Interactive Television mode of operation of the preferred embodiment of the present invention.
Figure 32:
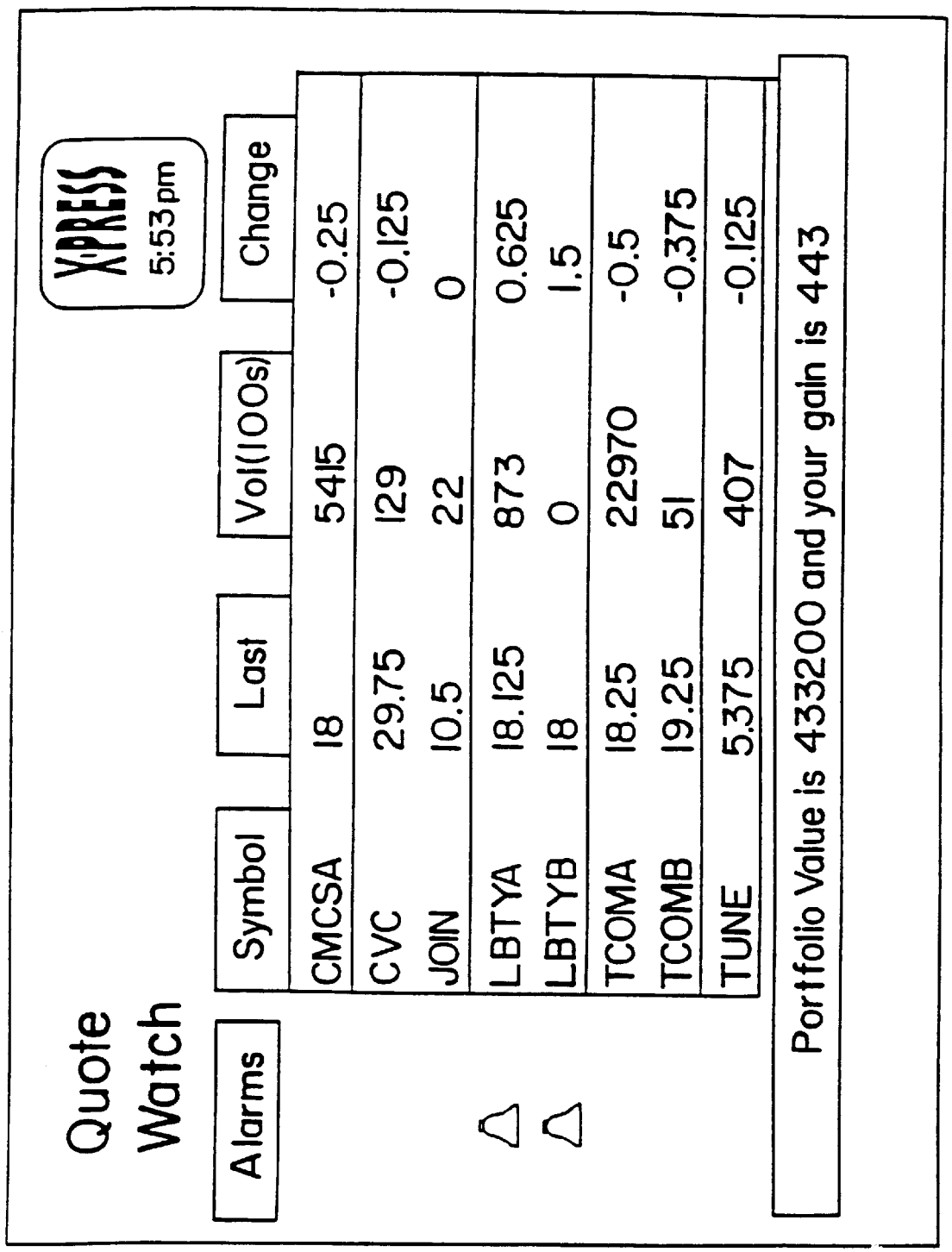
FIG. 32 shows information that appears in a Quote Watch menu in connection with the Interactive Television mode of operation shown in FIG. 31.
Figure 33:
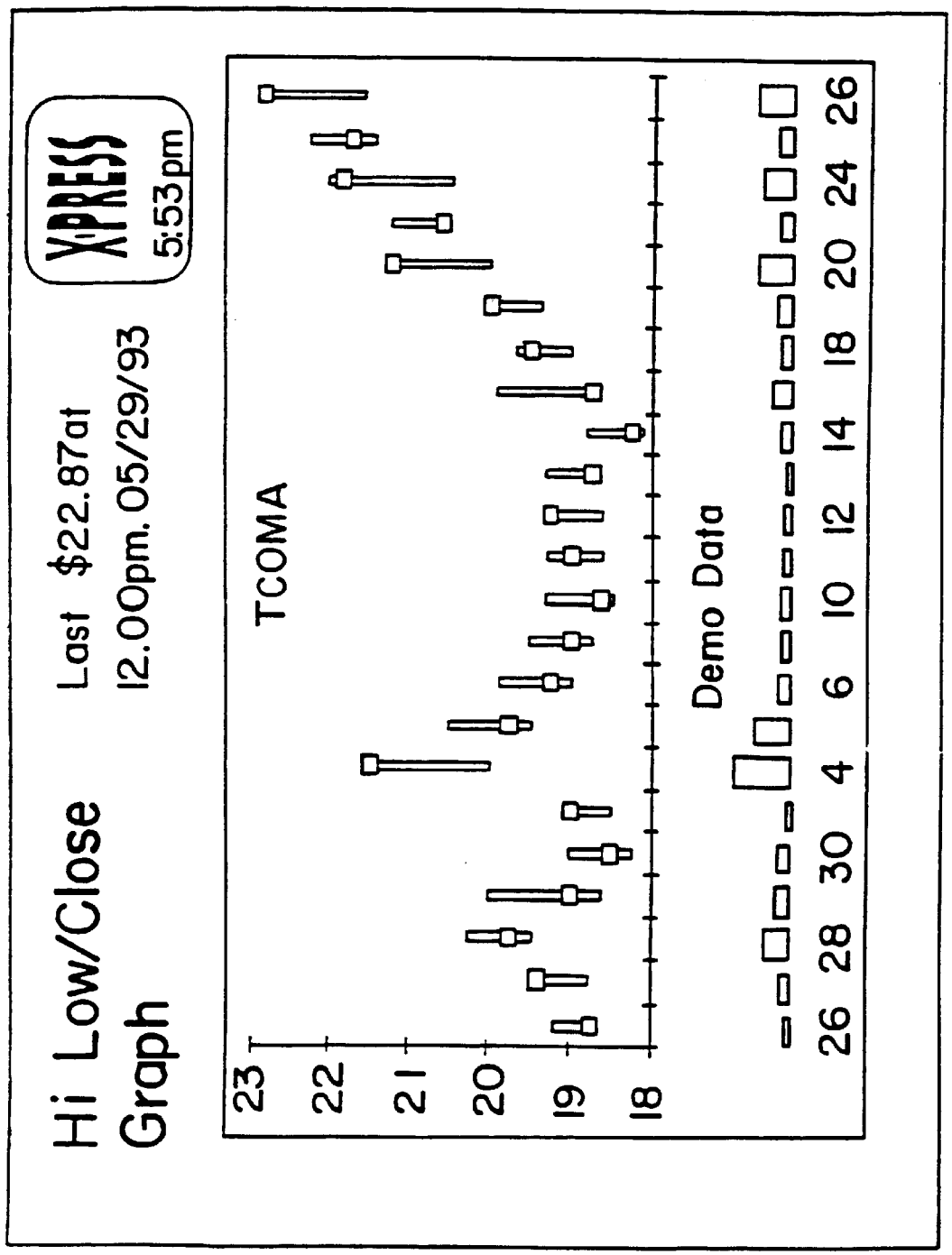
FIG. 33 shows other information that appears in connection with the Interactive Television mode of operation shown in FIG. 31.
Figure 35:
FIG. 35 is a menu showing information that appears in a sports display in the Interactive Television mode of operation of the preferred embodiment of the present invention.
Figure 36A:
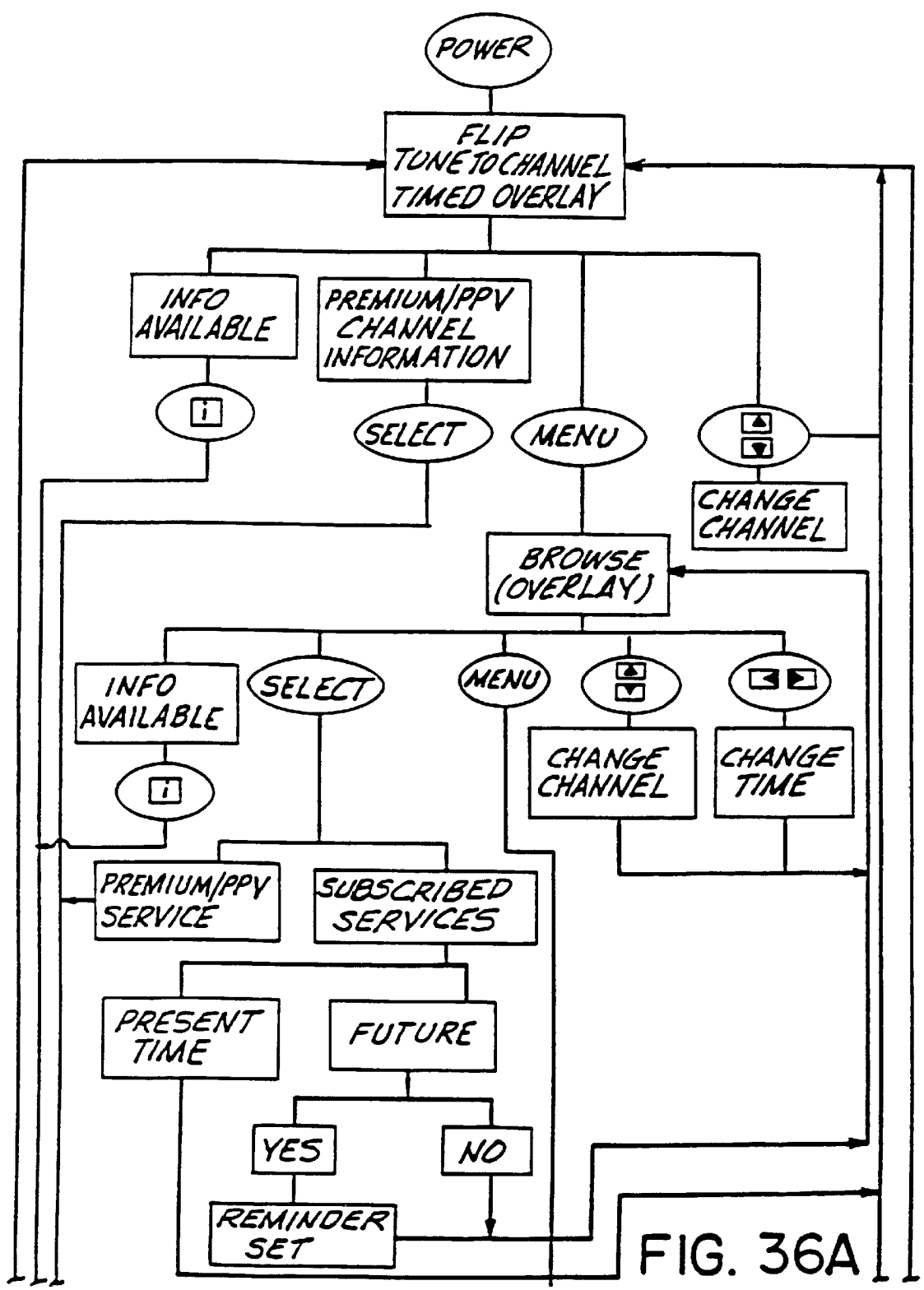
FIGS. 36A–D collectively form a flow chart showing the operational logic of a computer program that may be used to implement various aspects of the present invention.
Figure 36B:
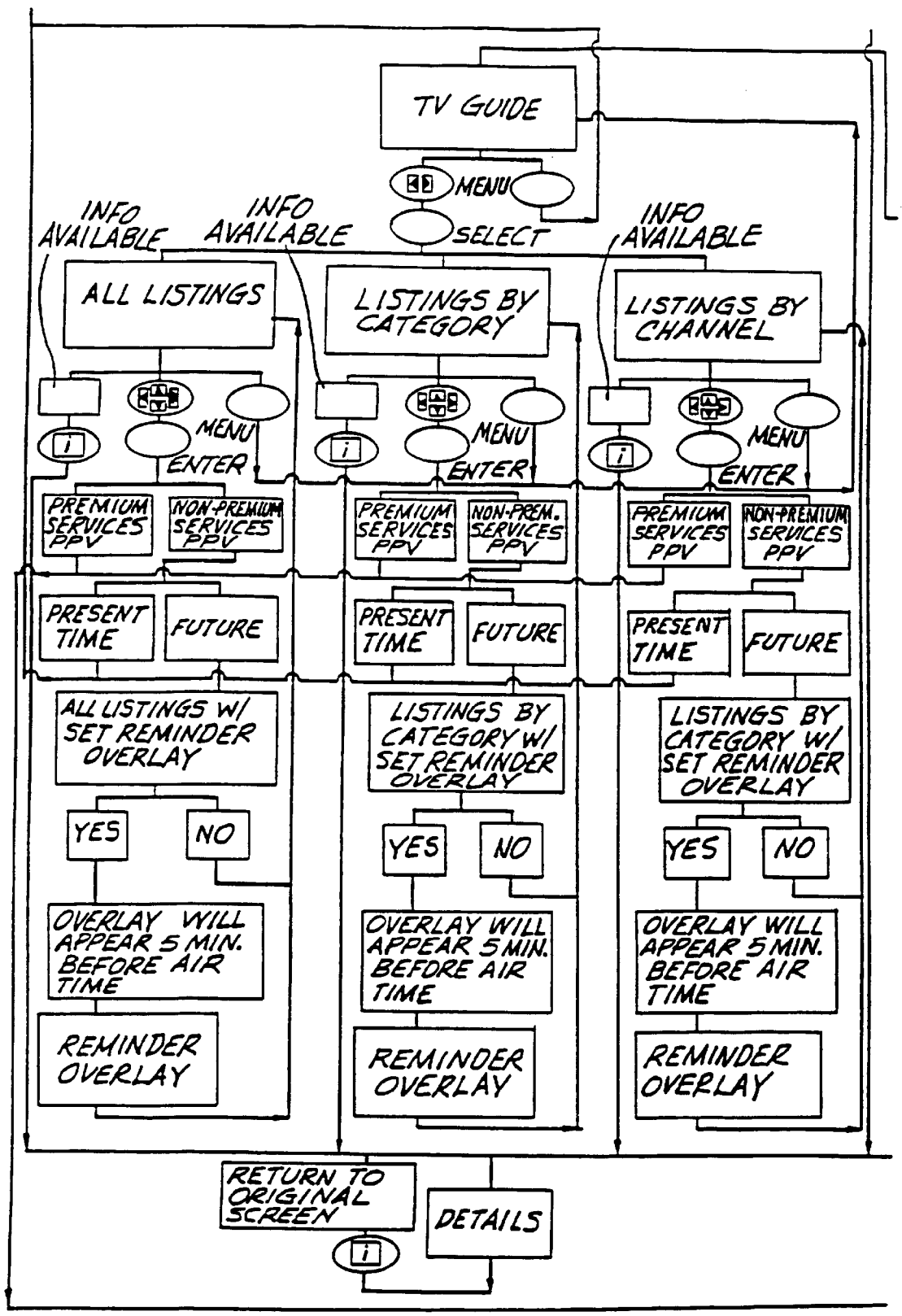
Figure 36C:
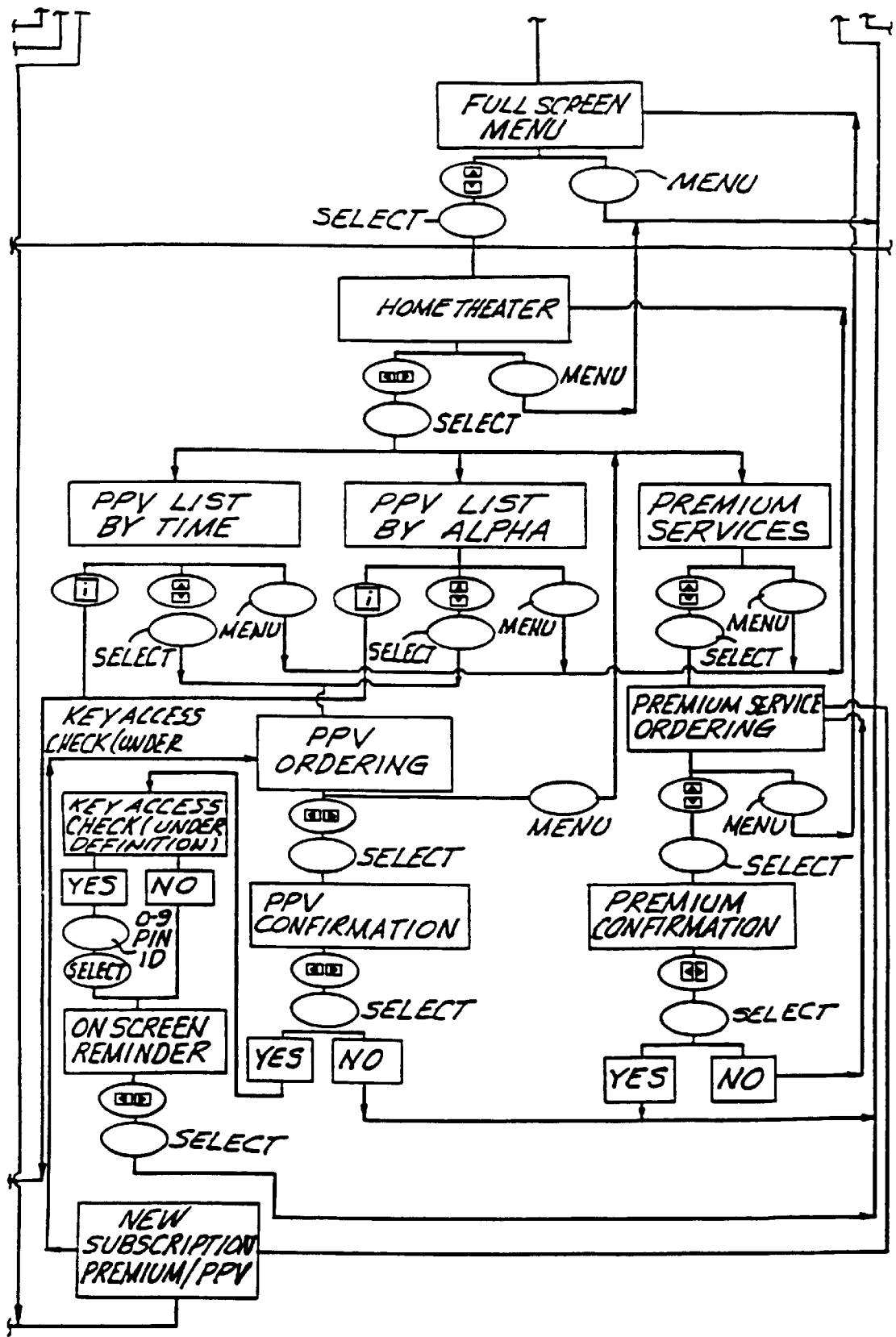
Figure 36D:
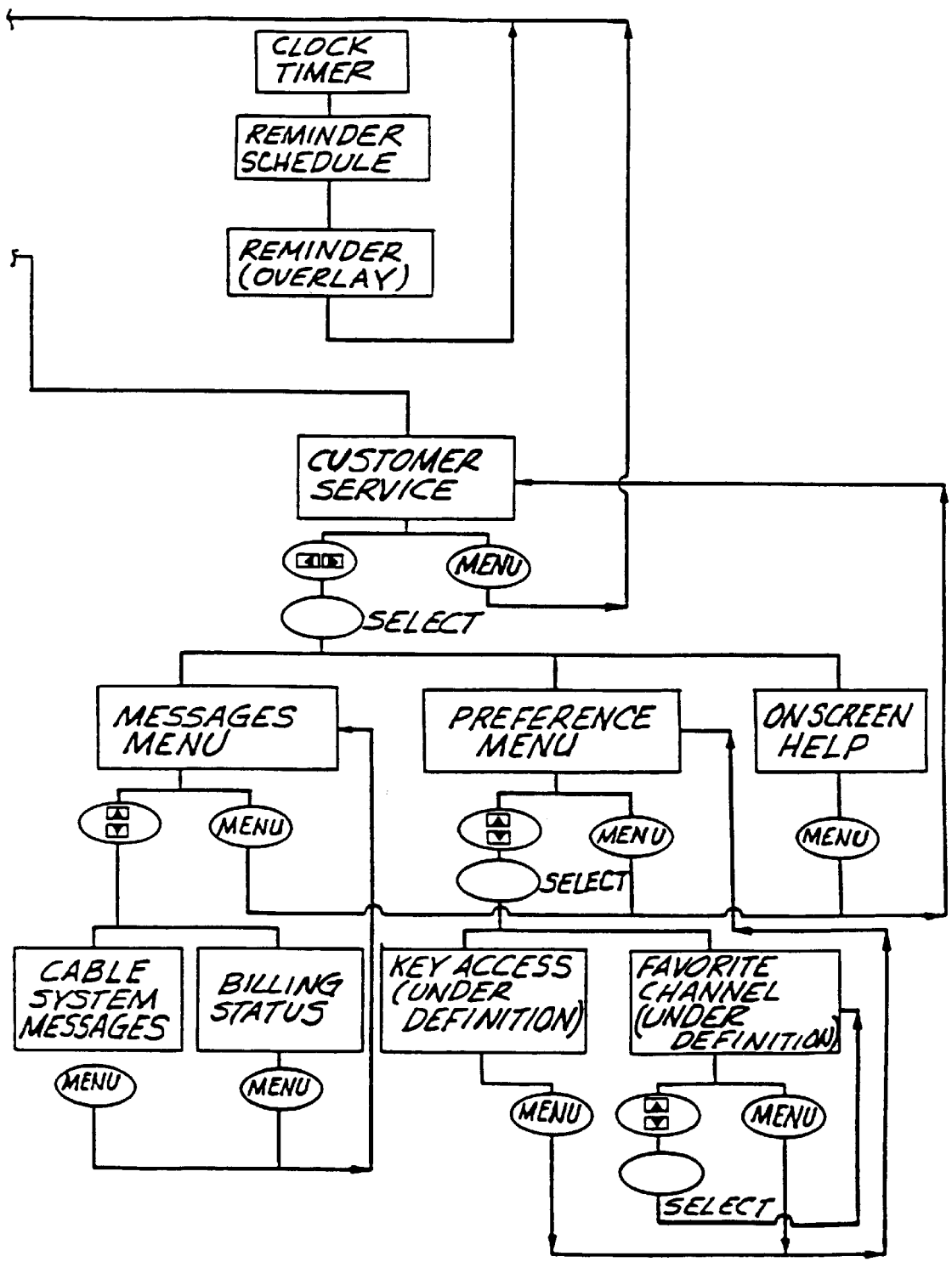

For example, if the user initially selects the "X*PRESS" icon appearing in the last horizontal bar, he is presented with a submenu such as that shown in FIG. 31. Using the direction arrow and enter keys on the remote controller, the user selects one of the three entries appearing in the display of FIG. 31. Once a particular entry is selected, the electronic program guide connects the user to the selected service and passes control to the particular service application software, as shown in FIGS. 32–35.

Additionally, the electronic program guide could be configured to store a unique digital identifier for each program along with its schedule information and later use the identifier—e.g., by transmitting it—to indicate to a recording or storage device, such as a video recorder, that the user wishes to record the program. The program guide could also use the identifier to automatically control operation of the video recorder. The electronic program guide could also be configured to use other stored schedule information for this purpose.

The form and content of a particular computer program to implement the invention disclosed herein will be readily apparent to those skilled in the art of video system programming and graphic display. A flow chart showing the operation logic of the system is shown in FIGS. 36A–D. It will also be appreciated by those skilled in the art that there can be departure from the specific embodiment of the invention described herein without departing from the true scope of the claims appended hereto.

We claim:

1. An electronic programming guide for use with a television receiver having a plurality of television channels for displaying television programs and program schedule information for said television programs comprising:

memory means for storing television program schedule information for a set of television programs scheduled to appear on said plurality of television channels;

user control means for choosing user control commands, including television tuning, guide channel-control and guide time-control commands, and transmitting signals in response thereto;

data processing means for receiving said signals in response to said user control commands; and a video display generator adapted to receive video control commands from said data processing means and program schedule information from said memory means for displaying interactively-selected successive portions of said program schedule information in overlaying relationship with another display signal currently appearing on a selected channel in at least one mode of operation of said programming guide;

said data processing means controlling said video display generator with said video control commands in response to said user control commands to display each said portion of program schedule information for any chosen one of said television programs for a predetermined display period in partial overlaying relationship with another display signal currently being received on said television receiver;

each said portion being displayed in response to corresponding consecutive ones of said guide control commands for successively navigating through listing information for sequential time periods or programs for which program schedule information is stored in said memory means, said data processing means being responsive to said television tuning commands for allowing a user to select any one of said television programs for which listing information is displayed in said partially overlayed portion of said schedule information.

2. An electronic programming guide for use with a television receiver having a plurality of television channels for displaying television programs and program schedule information for said television programs comprising:

memory means for storing television program schedule information for a set of television programs scheduled to appear on said plurality of television channels;

user control means for choosing user control commands, including television tuning and guide time-control commands, and transmitting signals in response thereto;

data processing means for receiving said signals in response to said user control commands; and a video display generator adapted to receive video control commands from said data processing means and program schedule information from said memory means for displaying interactively-selected successive portions of said schedule information for a currently tuned channel in overlaying relationship with another display signal currently appearing on said channel in at least one mode of operation of said programming guide;

said data processing means controlling said video display generator to display each said portion of program schedule information in partial overlaying relationship with said currently appearing display signal, each said portion comprising listing information for each successive one of said television programs scheduled to appear on said currently tuned channel and being consecutively displayed in response to corresponding consecutive ones of said guide control commands for successively navigating through listing information for sequential time periods for which program schedule information is stored in said memory means, said data processing means being responsive to said television tuning commands for allowing a user to select any one of said programs for which listing information is displayed in said partially overlayed portion of said schedule information.

3. An electronic programming guide for use with a television receiver having a plurality of television channels for displaying television programs and program schedule information for said television programs comprising:

memory means for storing television program schedule information for a set of television programs scheduled to appear on said plurality of television channels;

user control means for choosing user control commands, including television tuning, guide channel-control and guide time-control commands, and transmitting signals in response thereto;

data processing means for receiving said signals in response to said user control commands; and a video display generator adapted to receive video control commands from said data processing means and program schedule information from said memory means for displaying interactively-selected successive portions of said schedule information for a set of channels, including ones different from a currently tuned channel, in overlaying relationship with another display signal currently appearing on said tuned channel in at least one mode of operation of said programming guide;

said data processing means controlling said video display generator to display each said portion of program schedule information in partial overlaying relationship with said currently appearing display signal, each said portion comprising listing information for each successive one of said television programs scheduled to appear on said set of channels and being consecutively displayed in response to corresponding consecutive ones of said guide control commands for successively navigating through listing information for sequential time periods or programs for which program schedule information is stored in said memory means, said data processing means being responsive to said television tuning commands for allowing a user to select any one of said television programs for which listing information is displayed in said partially overlayed portion of said schedule information.

4. An electronic programming guide for use with a television receiver having a plurality of television channels for displaying television programs and program schedule information for said television programs comprising:

memory means for storing television program schedule information for a set of television programs scheduled to appear on said plurality of television channels;

user control means for choosing user control commands, including television tuning, guide time-control and guide channel-control commands, and transmitting signals in response thereto;

data processing means for receiving said signals in response to said user control commands;

a video display generator adapted to receive video control commands from said data processing means and program schedule information from said memory means for displaying interactively-selected successive portions of said program schedule information in overlaying relationship with another display signal currently appearing on a currently tuned channel in at least one mode of operation of said programming guide; and said data processing means controlling said video display generator to display each said portion of program schedule information in partial overlaying relationship with said currently appearing display signal, each said portion comprising listing information for each successive one of said television programs scheduled to appear on a channel different from said currently tuned channel and being consecutively displayed in response to corresponding consecutive ones of said guide control commands for successively navigating through listing information for sequential time periods or programs for which program schedule information is stored in said memory means, said data processing means being responsive to said television tuning commands for allowing a user to select any one of said television programs for which listing information is displayed in said partially overlayed portion of said schedule information.

5. An electronic programming guide for use with a video display for displaying program schedule information for television programs appearing on a plurality of television channels comprising:

means for receiving television program schedule information for a set of television programs scheduled to appear on said plurality of television channels;

user control means for choosing user control commands, including channel-control and time-control commands, including selection commands, guide channel-control and guide time-control commands, and transmitting signals in response thereto;

data processing means for receiving said signals in response to said user control commands; and a video display generator adapted to receive video control commands from said data processing means and program schedule information from said receiving means for displaying interactively-selected successive portions of said program schedule information in overlaying relationship with another display signal appearing on said video display;

said data processing means being adapted to control said video display generator with said video control commands in response to said user control commands to display for a predetermined display period each said selected portion of program schedule information in partial overlaying relationship with said another display signal currently appearing on said video display, each said portion displayed in response to corresponding consecutive ones of said guide control commands for successively navigating through listing information for sequential time periods or programs for which program schedule information has been received;

said data processing means controlling said video display generator to also selectively display reminder selection messages in at least one mode of operation of said programming guide, for allowing said user to choose selection commands in response to said reminder selection messages for selecting a reminder associated with a chosen future program, each said selected reminder message also to be displayed on said display at a predetermined time prior to the time of occurrence of each chosen future one of said television programs, said reminder message being displayed in overlaying relationship with another display signal being displayed at said time said reminder message is displayed.

6. The electronic programming guide according to claims 1 or 5 wherein said predetermined display period is a user-selectable variable time period chosen in response to a user control command.

7. The electronic programming guide according to claims 1, 2, 3, 4, or 5 wherein said schedule information displayed by said video display generator comprises at least program title and program channel.

8. The electronic programming guide according to claim 5 wherein said data processing means is further adapted to control said video display generator to selectively display second reminder selection messages, in at least one further mode of operation of said programming guide, for allowing said user to choose selection commands in response to said second reminder selection messages for selecting said predetermined amount of time prior to said time of occurrence of each said chosen future television program each said reminder message is to be displayed.

9. The electronic programming guide according to claim 5 wherein said video display generator displays each said reminder message in a partial overlaying relationship with said another display signal.

10. The electronic programming guide according to claims 1, 2, 3, 4, or 5 wherein said another display signal is a television program.

11. A process for use with a television receiver having a plurality of television channels for displaying television programs and program schedule information for said television programs comprising:

storing in a memory television program schedule information for a set of television programs scheduled to appear on said plurality of television channels;

providing user control means for issuing user control commands, including television tuning and guide time-control commands, and for transmitting signals in response thereto;

receiving by a data processor said user control commands;

controlling a video display generator with the data processor for displaying interactively-selected successive portions of said schedule information for a currently tuned channel in overlaying relationship with another display signal currently appearing on said tuned channel in at least one mode of operation said process; and configuring said data processor to control said video display generator with video control commands in response to said user control commands to display each said portion of program schedule information, in partial overlaying relationship with said currently appearing display signal, for each successive one of said television programs scheduled to appear on said channel, and consecutively displaying each said portion in response to corresponding consecutive ones of said guide control commands for successively navigating through listing information for sequential time periods for which program schedule information is stored in said memory means, and also configuring said data processor to be responsive to said television tuning commands for allowing a user to select any one of said television programs for which listing information is displayed in said partially overlayed portion of said schedule information.

12. A process for use with a television receiver having a plurality of television channels for displaying television programs and program schedule information for said television programs comprising:

storing in a memory television program schedule information for a set of television programs scheduled to appear on said plurality of television channels;

providing user control means for issuing user control commands, including television tuning, guide channel-control and guide time-control commands, and transmitting signals in response thereto;

receiving by a data processor said user control commands;

controlling a video display generator with the data processor for displaying interactively-selected successive portions of said schedule information for a set of channels, including ones different from a currently tuned channel, in overlaying relationship with another display signal currently appearing on said tuned channel in at least one mode of operation of said process; and configuring said data processor to control said video display generator with video control commands in response to said user control commands to display each said portion of program schedule information, in partial overlaying relationship with said currently appearing display signal, for each successive one of said television programs scheduled to appear on said set of channels, and consecutively displaying each said portion in response to corresponding consecutive ones of said guide control commands for successively navigating through listing information for sequential time periods or programs for which program schedule information is stored in said memory, and also configuring said data processor to be responsive to said television tuning commands for allowing a user to select any one of said television programs for which listing information is displayed in said partially overlayed portion of said schedule information.

13. The process of claims 11 or 12 wherein said another display signal is chosen from the group consisting of a television program, promotional video clip or an advertisement.

14. An electronic programming guide for displaying television schedule information on a video display on which is displayed a display signal, said programming guide comprising:

memory means for storing television program schedule information;

user control means for choosing user control commands, including television tuning, guide channel-control and guide time-control commands, and transmitting signals in response thereto;

data processing means for receiving said signals in response to said user control commands; and a program schedule display generator coupled to said data processing means and said memory means for displaying, in a partial overlay on said display signal, user-selected portions of said schedule information comprising listing information for at least one program different from said display signal, each said portion of said schedule information being interactively selected by a user and consecutively displayed in response to consecutive user-activated ones of said guide control commands for successively navigating through listing information for sequential time periods or programs for which schedule information is stored in said memory means, said data processing means being responsive to said television tuning commands for allowing a user to select any one of said television programs for which listing information is displayed in said partially overlayed portion of said schedule information.

15. An electronic programming guide for displaying television schedule information on a video display on which is displayed a display signal, said programming guide comprising:

memory means for storing television program schedule information;

user control means for choosing user control commands, including selection commands, guide channel-control and guide time-control commands, and transmitting signals in response thereto;

data processing means for receiving said signals in response to said user control commands; and a program schedule display generator coupled to said data processing means and said memory means for displaying, in a partial overlay on said display signal, user-selected portions of said schedule information comprising listing information for at least one program different from said display signal, each said portion of said schedule information being interactively selected by a user and consecutively displayed in response to consecutive user-activated ones of said guide control commands for successively navigating through listing information for sequential time periods or programs for which program schedule information is stored in said memory means;

said data processing means controlling said program schedule display generator to also selectively display reminder selection messages in at least one mode of operation of said programming guide, for allowing said user to choose selection commands in response to said reminder selection messages for selecting a reminder associated with a chosen future program, each said selected reminder message also to be displayed on said display at a predetermined time prior to the time of occurrence of each chosen future one of said television programs, said reminder message being displayed in overlaying relationship with another display signal being displayed at said time said reminder message is displayed.

16. An electronic programming guide for displaying television schedule information on a video display on which is displayed a display signal, said programming guide comprising:

memory means for storing television program schedule information;

user control means for choosing user control commands, including television tuning, guide channel-control and guide time-control commands, and transmitting signals in response thereto;

data processing means for receiving said signals in response to said user control commands; and a program schedule display generator coupled to said data processing means and said memory means for displaying, in a partial overlay on said display signal, user-selected portions of said schedule information comprising listing information for at least one program different from said display signal, each said portion of said schedule information being interactively selected by a user and consecutively displayed in response to consecutive user-activated ones of said guide control commands for successively navigating through listing information for sequential time periods or programs for which schedule information is stored in said memory means, said navigation including deleting at least one program listing appearing in the overlay and adding at least another program listing in the overlay, and said data processing means being responsive to said television tuning commands for allowing a user to select any one of said television programs for which listing information is displayed in said partially overlayed portion of said schedule information.

17. An electronic programming guide for displaying television schedule information on a video display on which is displayed a display signal, said programming guide comprising:

memory means for storing television program schedule information;

user control means for choosing user control commands, including selection commands, guide channel-control and guide time-control commands, and transmitting signals in response thereto;

data processing means for receiving said signals in response to said user control commands; and a program schedule display generator coupled to said data processing means and said memory means for displaying, in a partial overlay on said display signal, user-selected portions of said schedule information comprising listing information for at least one program different from said display signal, each said portion of said schedule information being interactively selected by a user and consecutively displayed in response to consecutive user-activated ones of said guide control commands for successively navigating through listing information for sequential time periods or programs for which program schedule information is stored in said memory means, said navigation including deleting at least one program listing appearing in the overlay and adding at least another program listing in the overlay;

said data processing means controlling said program schedule display generator to also selectively display reminder selection messages in at least one mode of operation of said programming guide, for allowing said user to choose selection commands in response to said reminder selection messages for selecting a reminder associated with a chosen future program, each said selected reminder message also to be displayed on said display at a predetermined time prior to the time of occurrence of each chosen future one of said television programs, said reminder message being displayed in overlaying relationship with another display signal being displayed at said time said reminder message is displayed.

18. The television schedule system according to claims 14, 15, 16, or 17 wherein the navigation is controlled by user-activated direction keys provided on said user control means.

19. An electronic programming guide for displaying television schedule information on a video display on which is displayed a display signal, said television programming guide comprising:

means for receiving television program schedule information;

user control means for choosing user control commands, including television tuning commands and guide control commands, and transmitting signals in response thereto;

data processing means for receiving said signals in response to said user control commands; and a program schedule display generator coupled to said data processing means and said receiving means for displaying program schedule information in a browse mode of operation of said electronic programming guide for allowing a user to interactively select display listing information, including for programs other than a currently appearing display signal, using said guide control commands, said program schedule display generator displaying said selected program schedule information in a partial overlay on said currently appearing display signal in said browse mode, said data processing means being responsive to said television tuning commands for allowing a user to select any one of said television programs for which listing information is displayed in said partially overlayed portion of said schedule information.

20. An electronic television programming guide for use with a television receiver having a plurality of television channels for displaying television programs and program schedule information for said television programs comprising:

memory means for storing television program schedule information for a set of television programs scheduled to appear on said plurality of television channels;

user control means for choosing user control commands, including television tuning and guide channel-control commands, and transmitting signals in response thereto;

data processing means for receiving said signals in response to said user control commands; and a video display generator adapted to receive video control commands from said data processing means and program schedule information from said memory means for displaying interactively-selected successive portions of said schedule information for programs appearing on channels different from a currently tuned channel, in overlaying relationship with another display signal currently appearing on said tuned channel in at least one mode of operation of said programming guide;

said data processing means controlling said video display generator to display each said portion of program schedule information in partial overlaying relationship with said currently appearing display signal, each said portion comprising listing information for each successive one of said television programs scheduled to appear on a channel different from said currently tuned channel at the same time as the currently appearing display signal on said currently tuned channel and being consecutively displayed in response to corresponding consecutive ones of said guide control commands for successively navigating through listing information for sequential programs for which program schedule information is stored in said memory means, said data processing means being responsive to said television tuning commands for allowing a user to select any one of said television programs for which listing information is displayed in said partially overlayed portion of said schedule information.

21. The electronic programming guide according to claim 20 wherein said portion of displayed program schedule information comprises at least program title and program channel.

22. A process for displaying television schedule information on a video display on which is displayed a display signal comprising:

storing in a memory television program schedule information;

providing user control means for issuing user control commands, including television tuning, guide channel-control and guide time-control commands, and for transmitting signals in response thereto;

receiving by a data processor said user control commands;

controlling a program schedule display generator with the data processor for displaying, in a partial overlay on a portion of said display signal, interactively-selected successive portions of said schedule information comprising listing information for at least one program different from said display signal; and consecutively displaying each said portion of said schedule information in response to consecutive user-activated ones of said guide control commands for successively navigating through listing information for sequential time periods or programs for which program schedule information is stored in said memory, and also configuring said data processor to be responsive to said television tuning commands for allowing a user to select any one of said television programs for which listing information is displayed in said partially overlayed portion of said schedule information.

23. A process for displaying television schedule information on a video display on which is displayed a display signal comprising:

storing in a memory television program schedule information;

providing user control means for issuing user control commands, including selection commands, guide channel-control and guide time-control commands, and for transmitting signals in response thereto;

receiving by a data processor said user control commands;

controlling a program schedule display generator with the data processor for displaying, in a partial overlay on a portion of said display signal, interactively-selected successive portions of said schedule information comprising listing information for at least one program different from said display signal; and consecutively displaying each said portion of said schedule information in response to consecutive user-activated ones of said guide control commands for successively navigating through listing information for sequential time periods or programs for which program schedule information is stored in said memory means; and also configuring said data processor to control said display generator to also selectively display reminder selection messages in at least one mode of operation of said programming guide, for allowing said user to choose selection commands in response to said reminder selection messages for selecting a reminder associated with a chosen future program, each said selected reminder message also to be displayed on said display at a predetermined time prior to the time of occurrence of each chosen future one of said television programs, said reminder message being displayed in overlaying relationship with another display signal being displayed at said time said reminder message is displayed.

24. A process for displaying television schedule information on a video display on which is displayed a display signal comprising:

storing in a memory television program schedule information;

providing user control means for issuing user control commands, including television tuning, guide channel-control and guide time-control commands, and for transmitting signals in response thereto;

receiving by a data processor said user control commands;

controlling a program schedule display generator with the data processor for displaying, in a partial overlay on a portion of said display signal, interactively-selected successive portions of said schedule information comprising listing information for at least one program different from said display signal; and consecutively displaying each said portion of said schedule information in response to consecutive user-activated ones of said guide control commands for successively navigating through listing information for sequential time periods or programs for which program schedule information is stored in said memory means, said navigation including deleting one program listing appearing in the overlay and adding another program listing in the overlay, and also configuring said data processor to be responsive to said television tuning commands for allowing a user to select any one of said television programs for which listing information is displayed in said partially overlayed portion of said schedule information.

25. A process for displaying television schedule information on a video display on which is displayed a display signal comprising:

receiving television program schedule information;

providing user control means for issuing user control commands, including selection commands, guide channel-control and guide time-control commands, and transmitting signals in response thereto;

receiving by a data processor said user control commands;

controlling a program schedule display generator with the data processor for displaying, in a partial overlay on a portion of said display signal, interactively-selected successive portions of said schedule information comprising listing information for at least one program different from said display signal; and consecutively displaying each said portion of said schedule information in response to consecutive user-activated ones of said guide control commands for successively navigating through listing information for sequential time periods or programs for which program schedule information is received; and also configuring said data processing means to control said display generator to also selectively display reminder selection messages in at least one mode of operation of said programming guide, for allowing said user to choose selection commands in response to said reminder selection messages for selecting a reminder associated with a chosen future program, each said selected reminder message also to be displayed on said display at a predetermined time prior to the time of occurrence of each chosen future one of said television programs, said reminder message being displayed in overlaying relationship with another display signal being displayed at said time said reminder message is displayed.

26. The process of claims 22, 23, 24, or 25 wherein said display signal is chosen from the group consisting of a television program, promotional video clip or an advertisement.

27. The process according to claims 11, 12, 22, 23, 24, or 25 further comprising the step of displaying said program schedule information for a display period and wherein said display period is a user-selectable variable time period chosen in response to a user control command.

28. An electronic programming guide for displaying television schedule information on a video display on which is displayed a display signal, said programming guide comprising:

means for receiving television program schedule information;

user control means for choosing user control commands, including television tuning, guide channel-control and guide time-control commands, and transmitting signals in response thereto;

data processing means for receiving said signals in response to said user control commands; and a program schedule display generator coupled to said data processing means and said means for receiving for displaying, in a partial overlay on said display signal, user-selected portions of said schedule information comprising listing information for at least one program different from said display signal, each said portion of said schedule information being interactively selected by a user and consecutively displayed in response to consecutive user-activated ones of said guide control commands for successively navigating through listing information for sequential time periods or programs for which schedule information has been received, said data processing means being responsive to said television tuning commands for allowing a user to select any one of said television programs for which listing information is displayed in said partially overlayed portion of said schedule information.

29. An electronic programming guide for displaying television schedule information on a video display on which is displayed a display signal, said programming guide comprising:

means for receiving television program schedule information;

user control means for choosing user control commands, including selection commands, guide channel-control and guide time-control commands, and transmitting signals in response thereto;

data processing means for receiving said signals in response to said user control commands; and a program schedule display generator coupled to said data processing means and said means for receiving for displaying, in a partial overlay on said display signal, user-selected portions of said schedule information comprising listing information for at least one program different from said display signal, each said portion of said schedule information being interactively selected by a user and consecutively displayed in response to consecutive user-activated ones of said guide control commands for successively navigating through listing information for sequential time periods or programs for which program schedule information has been received;

said data processing means controlling said program schedule display generator to also selectively display reminder selection messages in at least one mode of operation of said programming guide, for allowing said user to choose selection commands in response to said reminder selection messages for selecting a reminder associated with a chosen future program, each said selected reminder message also to be displayed on said display at a predetermined time prior to the time of occurrence of each chosen future one of said television programs, said reminder message being displayed in overlaying relationship with another display signal being displayed at said time said reminder message is displayed.

30. An electronic programming guide for displaying television schedule information on a video display on which is displayed a display signal, said programming guide comprising:

means for receiving television program schedule information;

user control means for choosing user control commands, including television tuning, guide channel-control and guide time-control commands, and transmitting signals in response thereto;

data processing means for receiving said signals in response to said user control commands; and a program schedule display generator coupled to said data processing means and said means for receiving for displaying, in a partial overlay on said display signal, user-selected portions of said schedule information comprising listing information for at least one program different from said display signal, each said portion of said schedule information being interactively selected by a user and consecutively displayed in response to consecutive user-activated ones of said guide control commands for successively navigating through listing information for sequential time periods or programs for which schedule information has been received, said navigation including deleting at least one program listing appearing in the overlay and adding at least another program listing in the overlay, and said data processing means being responsive to said television tuning commands for allowing a user to select any one of said television programs for which listing information is displayed in said partially overlayed portion of said schedule information.

31. The electronic programming guide according to claim 29 wherein said data processing means further controls said display generator to selectively display second reminder selection messages, in at least one further mode of operation of said programming guide, for allowing said user to choose second selection commands in response to said second reminder selection messages for selecting said predetermined amount of time prior to said time of occurrence of each said chosen future television program each said reminder message is to be displayed.

32. The electronics programming guide according to claim 29 wherein said display generator displays each said reminder message in a partial overlaying relationship with said another display signal.

33. An electronic guide for displaying schedule information on a video display on which is displayed a television display signal, said guide comprising:

memory means for storing information regarding scheduled events;

user control means for choosing user control commands, including television tuning, guide channel-control and guide time-control commands, and transmitting signals in response thereto;

data processing means for receiving said signals in response to said user control commands; and an event schedule display generator coupled to said data processing means and said memory means for displaying, in a partial overlay on said display signal, user-selected portions of said schedule information comprising listing information for at least one receivable signal different from said display signal, each said portion of said schedule information being interactively selected by a user and consecutively displayed in response to consecutive user-activated ones of said guide control commands for successively navigating through listing information for sequential time periods or programs for which schedule information is stored in said memory means, said data processing means being responsive to said television tuning commands for allowing said user to select any one of said receivable signals for which listing information is displayed in said partially overlayed portion of said schedule information.

34. An electronic guide for displaying schedule information on a video display on which is displayed a television display signal, said guide comprising:

memory means for storing information regarding scheduled events;

user control means for choosing user control commands, including selection commands, guide channel-control and guide time-control commands, and transmitting signals in response thereto;

data processing means for receiving said signals in response to said user control commands; and an event schedule display generator coupled to said data processing means and said memory means for displaying, in a partial overlay on said display signal, user-selected portions of said schedule information comprising listing information for at least one receivable signal different from said display signal, each said portion of said schedule information being interactively selected by a user and consecutively displayed in response to consecutive user-activated ones of said guide control commands for successively navigating through listing information for sequential time periods or programs for which schedule information is stored in said memory means, said data processing means controlling said event schedule display generator to also selectively display reminder selection messages in at least one mode of operation of said programming guide, for allowing said user to choose selection commands in response to said reminder selection messages for selecting a reminder associated with a chosen future event, each said selected reminder message also to be displayed on said display at a predetermined time prior to the time of transmission of each chosen future one of said events, said reminder message being displayed in overlaying relationship with another display signal being displayed at said time said reminder message is displayed.

35. The television schedule system according to claims 14, 15, 16, 17, or 18 wherein said display signal is chosen from the group consisting of a television program, promotional video clip or an advertisement.

36. The electronic programming guide according to claims 1, 2, 3, 4, 5 or 20 wherein said another display signal is an advertisement.

37. The electronic programming guide according to claims 1, 2, 3, 4, 5 or 20 wherein said another display signal is a promotional video clip.

38. The electronic programming guide according to claims 2, 3, 4, 14, 15, 16, 17 or 20 wherein said program schedule information is displayed for a display period and wherein said display period is a user-selectable variable time period chosen in response to a user control command.

39. An electronic programming guide for use with a video display for displaying program schedule information for television programs appearing on a plurality of television channels comprising:

means for receiving television program schedule information for a set of television programs scheduled to appear on said plurality of television channels;

user control means for choosing user control commands, including television tuning, guide time-control and guide channel control commands, and transmitting signals in response thereto;

data processing means for receiving said signals in response to said user control commands; and a video display generator adapted to receive video control commands from said data processing means and program schedule information from said receiving means for displaying interactively-selected successive portions of said program schedule information for a set of channels, including ones different from a currently tuned channel, simultaneously with another display signal appearing on said video display in at least one mode of operation of said programming guide;

said data processing means controlling said video display generator with said video control commands in response to said user control commands to display each said selected portion of program schedule information, each said portion comprising listing information for each successive one of said television programs scheduled to appear on said set of channels, simultaneously with said another display signal currently appearing on said video display, each said portion consecutively displayed in response to corresponding consecutive ones of said guide control commands for successively navigating through listing information for sequential time periods or programs for which program schedule information has been received, said data processing means being responsive to said television tuning commands for allowing a user to select any one of said television programs for which listing information is displayed.

40. An electronic programming guide for displaying television schedule information on a video display on which is displayed a display signal, said programming guide comprising:

memory means for storing television program schedule information;

user control means for choosing user control commands, including television tuning, guide channel-control and guide time-control commands, and transmitting signals in response thereto;

data processing means for receiving said signals in response to said user control commands; and a program schedule display generator coupled to said data processing means and said memory means for displaying, simultaneously with said display signal, user-selected portions of said schedule information comprising listing information for at least one program different from said display signal, each said portion of said schedule information being interactively selected by a user and consecutively displayed in response to consecutive user-activated ones of said guide control commands for successively navigating through listing information for sequential time periods or programs for which schedule information is stored in said memory means, said data processing means being responsive to said television tuning commands for allowing a user to select any one of said television programs for which listing information is displayed.

41. An electronic programming guide for use with a television receiver having a plurality of television channels for displaying television programs and program schedule information for said television programs comprising:

memory means for storing television program schedule information for a set of television programs scheduled to appear on said plurality of television channels;

user control means for choosing user control commands, including selection commands and guide time-control commands, and transmitting signals in response thereto;

data processing means for receiving said signals in response to said user control commands;

a video display generator adapted to receive video control commands from said data processing means and program schedule information from said memory means for displaying interactively-selected successive portions of said schedule information for a currently tuned channel in overlaying relationship with another display signal currently appearing on said channel; and said data processing means controlling said video display generator to display each said portion of program schedule information in partial overlaying relationship with said currently appearing display signal, each said portion comprising listing information for each successive one of said television programs scheduled to appear on said currently tuned channel and being consecutively displayed in response to corresponding consecutive ones of said guide control commands for successively navigating through listing information for sequential time periods for which program schedule information is stored in said memory means;

said data processing means controlling said video display generator to also selectively display reminder selection messages in at least one mode of operation of said programming guide, for allowing said user to choose selection commands in response to said reminder selection messages for selecting a reminder associated with a chosen future program, each said selected reminder message also to be displayed on said television receiver at a predetermined time prior to the time of occurrence of each chosen future one of said television programs, said reminder message being displayed in overlaying relationship with another display signal being displayed at said time said reminder message is displayed.

42. An electronic programming guide for use with a television receiver having a plurality of television channels for displaying television programs and program schedule information for said television programs comprising:

memory means for storing television program schedule information for a set of television programs scheduled to appear on said plurality of television channels;

user control means for choosing user control commands, including selection commands, guide channel-control and guide time-control commands, and transmitting signals in response thereto;

data processing means for receiving said signals in response to said user control commands; and a video display generator adapted to receive video control commands from said data processing means and program schedule information from said memory means for displaying interactively-selected successive portions of said schedule information for a set of channels, including ones different from a currently tuned channel, in overlaying relationship with another display signal currently appearing on said tuned channel;

said data processing means controlling said video display generator to display each said portion of program schedule information in partial overlaying relationship with said currently appearing display signal, each said portion comprising listing information for each successive one of said television programs scheduled to appear on said set of channels and being consecutively displayed in response to corresponding consecutive ones of said guide control commands for successively navigating through listing information for sequential time periods or programs for which program schedule information is stored in said memory means;

said data processing means controlling said video display generator to also selectively display reminder selection messages in at least one mode of operation of said programming guide, for allowing said user to choose selection commands in response to said reminder selection messages for selecting a reminder associated with a chosen future program, each said selected reminder message also to be displayed on said television receiver at a predetermined time prior to the time of occurrence of each chosen future one of said television programs, said reminder message being displayed in overlaying relationship with another display signal being displayed at said time said reminder message is displayed.

43. An electronic programming guide for use with a television receiver having a plurality of television channels for displaying television programs and program schedule information for said television programs comprising:

memory means for storing television program schedule information for a set of television programs scheduled to appear on said plurality of television channels;

user control means for choosing user control commands, including selection commands, guide time-control and guide channel-control commands, and transmitting signals in response thereto;

data processing means for receiving said signals in response to said user control commands; and a video display generator adapted to receive video control commands from said data processing means and program schedule information from said memory means for displaying interactively-selected successive portions of said program schedule information in overlaying relationship with another display signal currently appearing on a currently tuned channel;

said data processing means controlling said video display generator to display each said portion of program schedule information in partial overlaying relationship with said currently appearing display signal, each said portion comprising listing information for each successive one of said television programs scheduled to appear on a channel different from said currently tuned channel and being consecutively displayed in response to corresponding consecutive ones of said guide control commands for successively navigating through listing information for sequential time periods or programs for which program schedule information is stored in said memory means;

said data processing means controlling said video display generator to also selectively display reminder selection messages in at least one mode of operation of said programming guide, for allowing said user to choose selection commands in response to said reminder selection messages for selecting a reminder associated with a chosen future program, each said selected reminder message also to be displayed on said television receiver at a predetermined time prior to the time of occurrence of each chosen future one of said television programs, said reminder message being displayed in overlaying relationship with another display signal being displayed at said time said reminder message is displayed.

44. The electronic programming guide according to claim 41, 42, or 43 wherein said data processing means is further adapted to control said video display generator to selectively display second reminder selection messages, in at least one further mode of operation of said programming guide, for allowing said user to choose selection commands in response to said second reminder selection messages for selecting said predetermined amount of time prior to said time of occurrence of each said chosen future television program each said reminder message is to be displayed.

45. The electronic programming guide according to claim 41, 42, or 43 wherein said video display generator displays each said reminder message in a partial overlaying relationship with said another display signal.

46. The electronic programming guide according to claim 41, 42, or 43 wherein said another display signal is an advertisement.

47. The electronic programming guide according to claim 41, 42, or 43 wherein said another display signal is a promotional video clip.

48. The electronic programming guide according to claim 41, 42, or 43 wherein said program schedule information is displayed for a display period and wherein said display period is a user-selectable variable time period chosen in response to a user control command.

* * * * *

UNITED STATES PATENT AND TRADEMARK OFFICE
CERTIFICATE OF CORRECTION

PATENT NO. : 6,418,556 B1  
APPLICATION NO. : 08/119367  
DATED : July 9, 2002  
INVENTOR(S) : Bennington et al.

Page 1 of 1

It is certified that error appears in the above-identified patent and that said Letters Patent is hereby corrected as shown below:

On the Title Page:

Item (75) Inventors, please remove "Gerard E. Bennington, Englewood; George Backer, Highlands Ranch; Shawn Green; Bill Cooper, both of Littleton; Dave Spell, Denver; Rosetta Rogers, Aurora; Bruce Davis, Greenwood Village, all of CO (US)" and replace with -- Gerard E. Bennington, Englewood, CO (US); George Backer, Highlands Ranch, CO (US); Shawn Green, Littleton, CO (US); Bill Cooper, Littleton, CO (US); Dave Spell, Denver, CO (US); Bruce Davis, Greenwood Village, CO (US); Michael Morris, Downington, PA (US) --.

Signed and Sealed this  
Twelfth Day of April, 2016

Michelle K. Lee  
*Director of the United States Patent and Trademark Office*